US00RE39341E

(19) United States
(12) Reissued Patent
Kataoka et al.

(10) Patent Number: US RE39,341 E
(45) Date of Reissued Patent: Oct. 17, 2006

(54) APPARATUS FOR LIGHTING FLUORESCENT LAMP

(75) Inventors: Shinichiro Kataoka, Ibaraki (JP); Yo Nakagawa, Suita (JP); Masanori Yamanaka, Takatsuki (JP); Hiroki Matsunaga, Takatsuki (JP)

(73) Assignee: Matsushita Electric Industrial Co., Ltd., Osaka (JP)

(21) Appl. No.: 10/654,857

(22) Filed: Sep. 3, 2003

Related U.S. Patent Documents

Reissue of:
(64) Patent No.: 6,285,138
Issued: Sep. 4, 2001
Appl. No.: 09/454,135
Filed: Dec. 3, 1999

(30) Foreign Application Priority Data

Dec. 9, 1998 (JP) ..... 10-374974

(51) Int. Cl.
*G05F 1/00* (2006.01)
*H02M 3/335* (2006.01)

(52) U.S. Cl. ..... 315/291; 315/307; 315/209 R; 363/21.03; 363/21.08

(58) Field of Classification Search ..... 315/291, 315/307, 224, 209 R, DIG. 5, DIG. 7, 360, 315/225; 363/21.03, 21.08, 21.04, 21.02
See application file for complete search history.

(56) References Cited

U.S. PATENT DOCUMENTS 5,434,479 A * 7/1995 Ohnishi et al. ..... 315/209 R
5,563,473 A * 10/1996 Mattas et al. ..... 315/240
5,581,158 A * 12/1996 Quazi ..... 315/149
5,612,597 A * 3/1997 Wood ..... 315/293
5,781,418 A * 7/1998 Chang et al. ..... 363/16
5,828,184 A * 10/1998 Nadd ..... 315/209 R
5,977,723 A * 11/1999 Yoon ..... 315/247
6,031,342 A * 2/2000 Ribarich et al. ..... 315/291
6,087,782 A * 7/2000 Majid et al. ..... 315/224

* cited by examiner

*Primary Examiner*—Tuyet Thi Vo
(74) *Attorney, Agent, or Firm*—Sheridan Ross P.C.

(57) ABSTRACT

A fluorescent lamp lighting apparatus in accordance with the present invention has first switching means (M1) driven by a high-voltage-side pulse signal input from a drive-signal generation circuit and second switching means (M2) driven by a low-voltage-side pulse signal input from the drive-signal generation circuit, wherein the first switching means (M1) is connected in series with the second switching means (M2), and a first capacity (C5) and an inductance element (L1) and the above-mentioned second switching means (M2) are provided between the high-voltage-side terminals of a pair of filament electrodes of a light-emitting tube (4), whereby a constant luminous flux can be maintained immediately after lighting.

33 Claims, 46 Drawing Sheets

(a) 100 V AC, VOLTAGE BETWEEN 300 AND 301

(b) VOLTAGE BETWEEN 100 AND 101 (WITHOUT C2)

(c) VOLTAGE BETWEEN 100 AND 101 (WITH C2)

FIG. 22
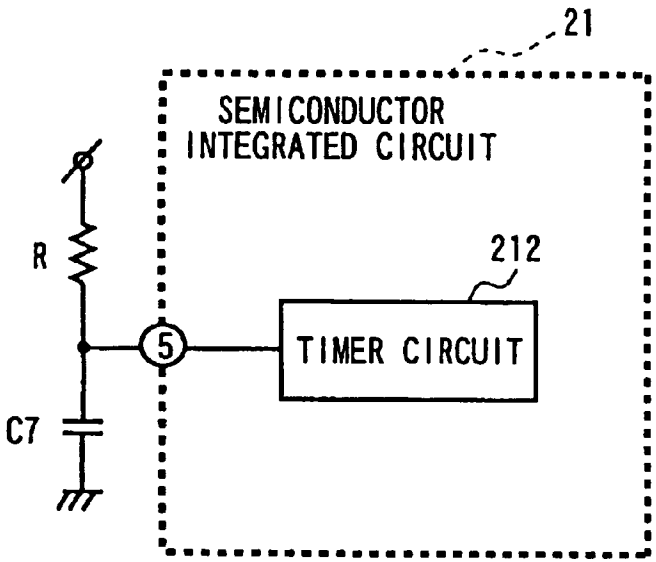
FIG. 22(a)
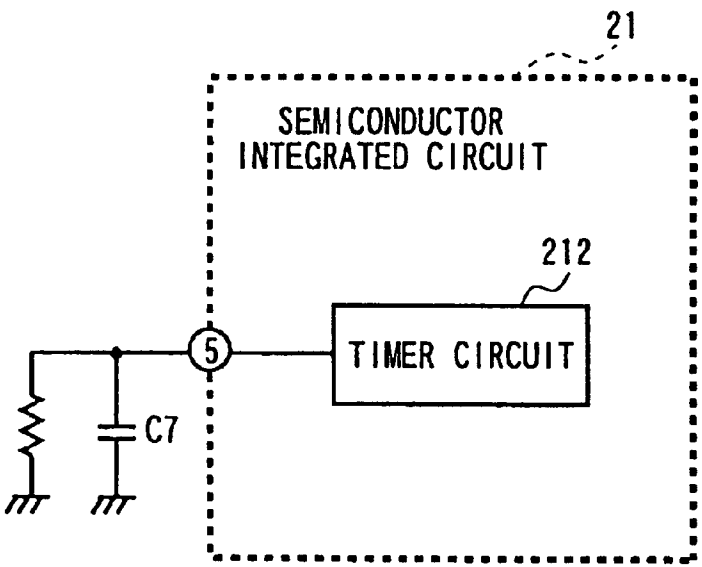
FIG. 22(b)

FREQUENCY CHARACTERISTIC AT LIGHTING

FREQUENCY CHARACTERISTIC BEFORE LIGHTING

APPARATUS FOR LIGHTING FLUORESCENT LAMP

Matter enclosed in heavy brackets [ ] appears in the original patent but forms no part of this reissue specification; matter printed in italics indicates the additions made by reissue.

BACKGROUND OF THE INVENTION

The present invention relates to an apparatus for lighting fluorescent lamp, particularly to a bulb-type fluorescent lamp, that is, a fluorescent lamp having a shape of electric bulb.

In recent years, in view of energy conservation and the like, bulb-type fluorescent lamps have been used instead of incandescent lamps. In a conventional bulb-type fluorescent lamp, a light-emitting tube, a starter and a stabilizer are integrated and accommodated in the screw base portion thereof, making the base portion large and heavy.

FIG. 47 is a circuit diagram of a conventional bulb-type fluorescent lamp. The circuit configuration of the bulb-type fluorescent lamp will be described below referring to FIG. 47.

An AC power source 101 is connected to the AC input terminals of a full-wave rectifier 104 via a filter circuit comprising an inductor 103 and a capacitor 102. A smoothing capacitor 105 is connected across the DC output terminals of the full-wave rectifier 104. To the smoothing capacitor 105, two switching devices 111 and 112 are connected in a half-bridge configuration. A transformer 114 for generating a resonance voltage has inductors 115, 116 and 117. One of the terminals of the inductor 115 of the transformer 114 is connected to the connection point (hereinafter simply referred to as the connection point between the switching devices) of the first switching devices 111 and the second switching device 112. A starting resistor 200 and a capacitor 201 are connected in parallel between the connection point between the switching devices and the smoothing capacitor 105. The parallel arrangement of a capacitor 204 and zener diodes 206 and 207 is connected between the gate terminal of the first switching device 111 and the connection point between the switching devices. The cathodes of the two zener diodes 206 and 207 are connected to each other in series. An inductor 202 is connected between the other terminal of the inductor 115 of the transformer 114 and the gate terminal of the first switching device 111.

An inductor 203 is connected between one of the terminals of the inductor 116 of the transformer 114 and the gate terminal of the second switching device 112. In addition, a smoothing capacitor 205 is connected between the other terminal of the inductor 116 and the gate terminal of the second switching device 112. Furthermore, two zener diodes 208 and 209 are directly connected between the other terminal of the inductor 116 and the gate terminal of the second switching terminal 112 in parallel with the smoothing capacitor 205. The cathodes of these two zener diodes 208 and 209 are connected to each other. A resistor 210 is connected between the connection point of the two zener diodes 208 and 209 and the other terminal of the second switching device 112. Moreover, the other terminal of the second switching terminal 112 is connected to the smoothing capacitor 205 via a capacitor 213.

One of the terminals of the inductor 117 of the transformer 114 is connected to the connection point between the switching devices, and a pair of filament terminals in a light-emitting tube 135 and a capacitor 134 are connected in series between the other terminal of this inductor 117 and a capacitor 133.

Next, the operation of the conventional bulb-type fluorescent lamp configured as described above will be described.

The starter of the conventional bulb-type fluorescent lamp shown in FIG. 47 includes the two switching devices 111 and 112, the inductor 117 used as the secondary winding of the transformer 114 and the capacitors 133 and 134 connected to the light-emitting tube 135. The two switching devices 111 and 112 turn on and off alternatively at high speed, thereby converting the DC voltage across the smoothing capacitor 105 into a high-frequency signal. As a result, the light-emitting tube 135 is set in a lighting state by the high-frequency signal. The capacitor 134 inserted and connected across the pair of filament electrodes of the light-emitting tube 135 forms the current path of the preheating current for filaments of the light-emitting tube 135, and is also used as a resonance capacitor in combination with the inductor 117.

The capacitor 133 is a coupling capacitor used to cut DC components in the power source. To alternatively switch the two switching devices 111 and 112, the inductors 115 and 116 of the transformer 114 detect the timing of on/off operation, and the inductors 202 and 203 carry out driving.

The starting resistor 200 turns on the first switching device 111 at the time of power-on to start the starter. In this way, until the starter is started by power-on and the light-emitting tube 135 is lit, resonance is caused at the inductor 117 and the capacitor 134 constituting a resonance circuit by the two switching devices 111 and 112, thereby generating a high voltage and lighting the light-emitting tube 135.

After the light-emitting tube 135 is lit, the impedance across the light-emitting tube 135 becomes low. As a result, the resonance capacitor 134 becomes nearly short-circuited. For this reason, self-oscillation occurs at the low resonance frequency determined by the capacitor 133 and the inductor 117, whereby the light-emitting tube 135 can continue high-frequency lighting operation at high efficiency.

However, in the above-mentioned conventional bulb-type fluorescent lamp, a high voltage is generated for lighting at the resonance frequency determined by the inductor 117 and the capacitor 134, immediately when and after the power is turned on. Therefore, at the time of lighting, the above-mentioned lighting operation is carried out while the external tube of the light-emitting tube is still cool, without sufficiently heating the filaments. Therefore, stress is applied to the filaments of the light-emitting tube, thereby causing a problem of shortening the service life of the light-emitting tube.

Furthermore, in the conventional bulb-type fluorescent lamp, the preheating time for the filaments cannot be taken sufficiently, thereby causing a problem of making the luminous flux small because the temperature of the external tube is low immediately after lighting, and making the luminous flux larger as the temperature of the external tube rises.

BRIEF SUMMARY OF THE INVENTION

In order to solve the above-mentioned problems, the present invention provides an apparatus for lighting fluorescent lamp, that is a fluorescent lamp lighting apparatus, configured to sufficiently provide a preheating time at the time of lighting and capable of carrying out control at a level not applying stress to the filaments of the light-emitting tube thereof. In addition, the present invention is intended to provide a fluorescent lamp lighting apparatus having a smaller mounting area by significantly reducing the number of components by using a one-chip monolithic IC accommodating an oscillator, and capable of maintaining a constant luminous flux immediately after lighting.

In order to attain the above-mentioned objects, a fluorescent lamp lighting apparatus in accordance with the present invention comprises:

a DC-voltage generation circuit for generating a DC voltage, a drive-signal generation circuit for generating and outputting desired high-voltage-side and low-voltage-side pulse signals by using the DC voltage from the above-mentioned DC-voltage generation circuit, and a drive control circuit having switching means driven by the pulse signals input from the above-mentioned drive-signal generation circuit to output a drive signal across the output terminals thereof, wherein a resonance circuit and the filament electrodes of a fluorescent lamp light-emitting tube are connected across the output terminals of the above-mentioned switching means.

In accordance with the present invention configured as described above, the power source circuit portion has the DC-voltage generation circuit, the drive-signal generation circuit and the drive control circuit, and the need for a transformer coil is eliminated; therefore, the mounting area of the power source circuit portion is decreased significantly, and the number of components is reduced.

A fluorescent lamp lighting apparatus in accordance with the present invention from another aspect comprises:

a DC-voltage generation circuit for generating a DC voltage, a drive-signal generation circuit for generating and outputting desired high-voltage-side and low-voltage-side pulse signals by using the DC voltage from the above-mentioned DC-voltage generation circuit, and a drive control circuit having first switching means driven by the high-voltage-side pulse signal input from the above-mentioned drive-signal generation circuit, and second switching means connected in series therewith and driven by the low-voltage-side pulse signal input from the above-mentioned drive-signal generation circuit, wherein an inductance device, the pair of filament electrodes of the fluorescent lamp light-emitting tube and a first capacitor are connected across both ends of the above-mentioned second switching means.

In the present invention configured as described above, the power source circuit portion has the DC-voltage generation circuit, the drive-signal generation circuit and the drive control circuit, and the need for a transformer coil is eliminated by providing a semiconductor integrated circuit; therefore, the mounting area of the power source circuit portion is decreased significantly, and the number of components is reduced.

A fluorescent lamp lighting apparatus in accordance with the present invention from another aspect comprises a light-emitting portion having a light-emitting tube excited by a pair of filament electrodes and a power source circuit portion for outputting a signal for driving the above-mentioned pair of filament electrodes, wherein the above-mentioned power source circuit portion comprises:

a DC-voltage generation circuit for outputting a smoothened DC voltage from an externally supplied AC power source, a drive-signal generation circuit operated by the application of the DC voltage of the above-mentioned DC-voltage generation circuit to output a signal, and a drive control circuit, having a resonance circuit network connected across the terminals for outputting a signal driven by the signal from the above-mentioned drive-signal generation circuit, for detecting the signal of this resonance circuit network and outputting the signal to a signal detection terminal, wherein the above-mentioned drive-signal generation circuit is configured to output a signal having a frequency, which is determined inside the above-mentioned drive-signal generation circuit, changes with the passage of time, and at least passes through the resonance frequency of the above-mentioned resonance circuit network in the non-lighting state of the above-mentioned light-emitting tube within a predetermined time from the application of the above-mentioned DC voltage, and to output a signal having the phase corresponding to the signal of the above-mentioned signal detection terminal after the above-mentioned predetermined time has passed.

In accordance with the present invention configured as described above, a signal having a frequency different from the resonance frequency of the resonance circuit network can be generated at the time of power on, whereby a desired voltage can be applied to the filament electrodes without abruptly applying a high voltage caused by resonance. Furthermore, the frequency to be supplied to the resonance circuit network is changed with the passage of time and passed through the resonance frequency band, whereby the light-emitting tube can be lit securely in the vicinity of the resonance frequency. Moreover, the signal having the phase corresponding to the signal of the signal detection terminal is supplied to the resonance circuit network after the predetermined time has passed from power on, thereby to form a closed loop for driving the resonance circuit network, whereby the resonance state can be maintained, and the light emission of the light-emitting tube can be continued. In this way, abrupt stress is not applied to the filament electrodes and the light-emitting tube, whereby the service life of the light-emitting tube can be extended; in addition, the temperature of the light-emitting tube is raised and light is emitted, whereby the change in the luminous flux immediately after light emission can be suppressed.

A fluorescent lamp lighting apparatus in accordance with the present invention from another aspect comprises a light-emitting portion having a light-emitting tube excited by a pair of filament electrodes and a power source circuit portion for outputting a signal for driving the above-mentioned pair of filament electrodes, wherein the above-mentioned power source circuit portion comprises:

a DC-voltage generation circuit for outputting a smoothened DC voltage from an externally supplied AC power source, a drive-signal generation circuit operated by the application of the above-mentioned DC-voltage to output first and second drive signals individually, first switching means wherein the conduction between two terminals, that is, between one terminal and one of the pair of output terminals of the above-mentioned DC-voltage generation circuit, is turned on and off by the above-mentioned first drive signal, second switching means wherein the conduction between two terminals, that is, between one terminal and the other of the pair of output terminals of the above-mentioned DC-voltage generation circuit, is turned on and off by the above-mentioned second drive signal, and a resonance circuit network connected between the common connection portion of the above-mentioned first and second switching means and at least one of the pair of output terminals of the above-mentioned DC-voltage generation circuit, wherein the above-mentioned first and second drive signals are each configured to output a signal having a frequency, which is determined inside the above-mentioned drive-signal generation circuit, changes with the passage of time, and at least passes through the resonance frequency of the above-mentioned resonance circuit network in the non-lighting state of the above-mentioned light-emitting tube within a predetermined time from the application of the above-mentioned DC voltage, and to output a signal having the phase corresponding to the signal of the above-mentioned signal detection terminal after the above-mentioned predetermined time has passed.

In accordance with the present invention configured as described above, the power source circuit portion has the DC-voltage generation circuit, the drive-signal generation circuit and the drive control circuit, and the need for a transformer coil is eliminated; therefore, the mounting area of the power source circuit portion is decreased significantly, and the number of components is reduced.

In accordance with the present invention configured as described above, a signal having a frequency different from the resonance frequency of the resonance circuit network can be generated at the time of power on, whereby a desired voltage can be applied to the filament electrodes without abruptly applying a high voltage caused by resonance. Furthermore, the frequency to be supplied to the resonance circuit network is changed with the passage of time and passed through the resonance frequency band, whereby the light-emitting tube can be lit securely in the vicinity of the resonance frequency. Moreover, the signal having the phase corresponding to the signal of the signal detection terminal is supplied to the resonance circuit network after the predetermined time has passed from power on, thereby to form a closed loop for driving the resonance circuit network, whereby the resonance state can be maintained, and the light emission of the light-emitting tube can be continued. In the fluorescent lamp lighting apparatus of the present invention, the resonance connection portion of the first and second switching means can be driven by the voltage across the output terminals of the DC-voltage generation circuit, whereby it is possible to generate a voltage required to drive the filament electrodes. In this way, abrupt stress is not applied to the filament electrodes and the light-emitting tube, whereby the service life of the light-emitting tube can be extended; in addition, the temperature of the light-emitting tube is raised and light is emitted, whereby the change in the luminous flux immediately after light emission can be suppressed.

While the novel features of the invention are set forth particularly in the appended claims of the invention, both as to organization and content, will be better understood and appreciated, along with other objects and features thereof, from the following detailed descriptions taken in conjunction with the drawings.

BRIEF DESCRIPTION OF THE SEVERAL VIEWS OF THE DRAWING

FIG. 22 is a configuration view showing concrete circuits for sweeping frequency in a bulb-type fluorescent lamp of Embodiment 3;

It will be recognized that some or all of the Figures are schematic representations for purposes of illustration and do not necessarily depict the actual relative sizes or locations of the elements shown.

DETAILED DESCRIPTION OF THE INVENTION

A bulb-type fluorescent lamp in accordance with Embodiment 1, an embodiment of a fluorescent lamp lighting apparatus in accordance with the present invention, will be described below referring to the accompanying drawings.

EMBODIMENT 1

Figure 1:
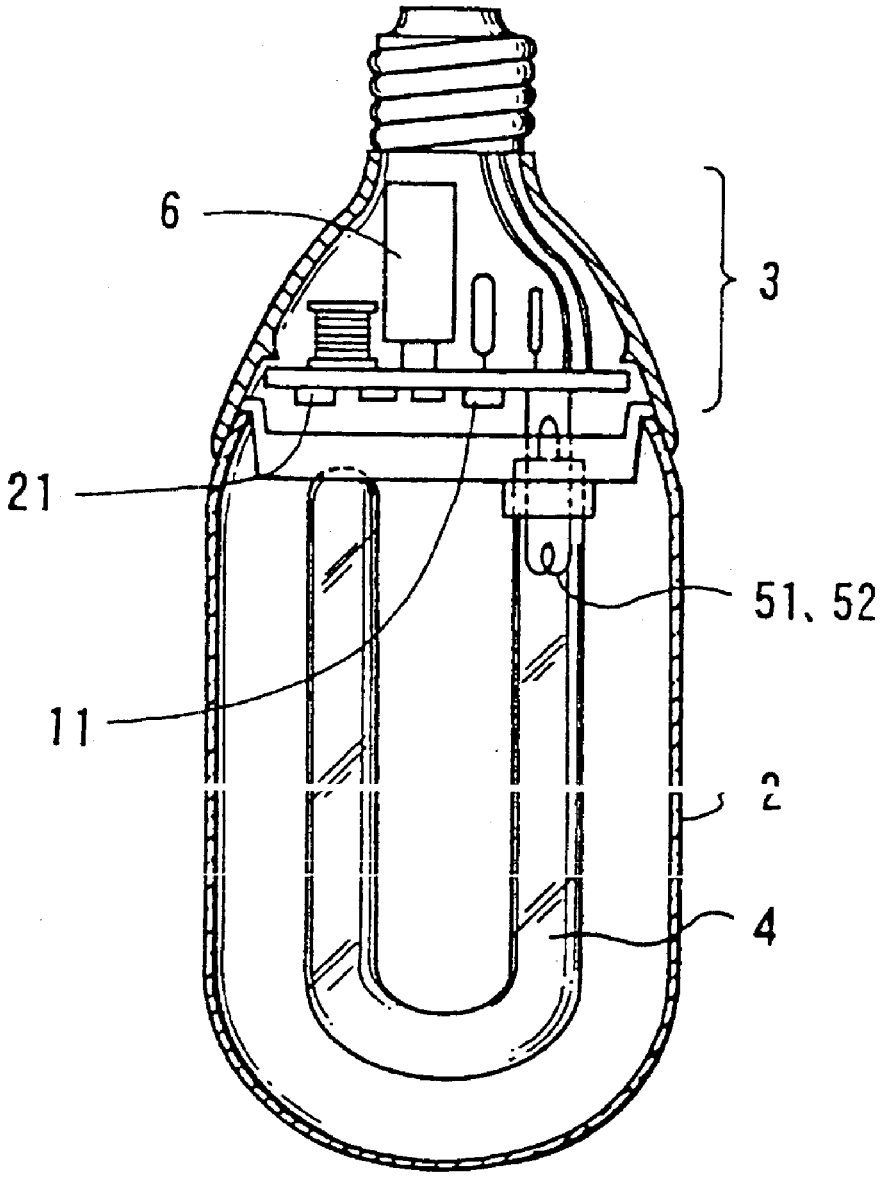
FIG. 1 is a perspective view showing an appearance of a bulb-type fluorescent lamp of Embodiment 1 in accordance with the present invention.
Figure 2:
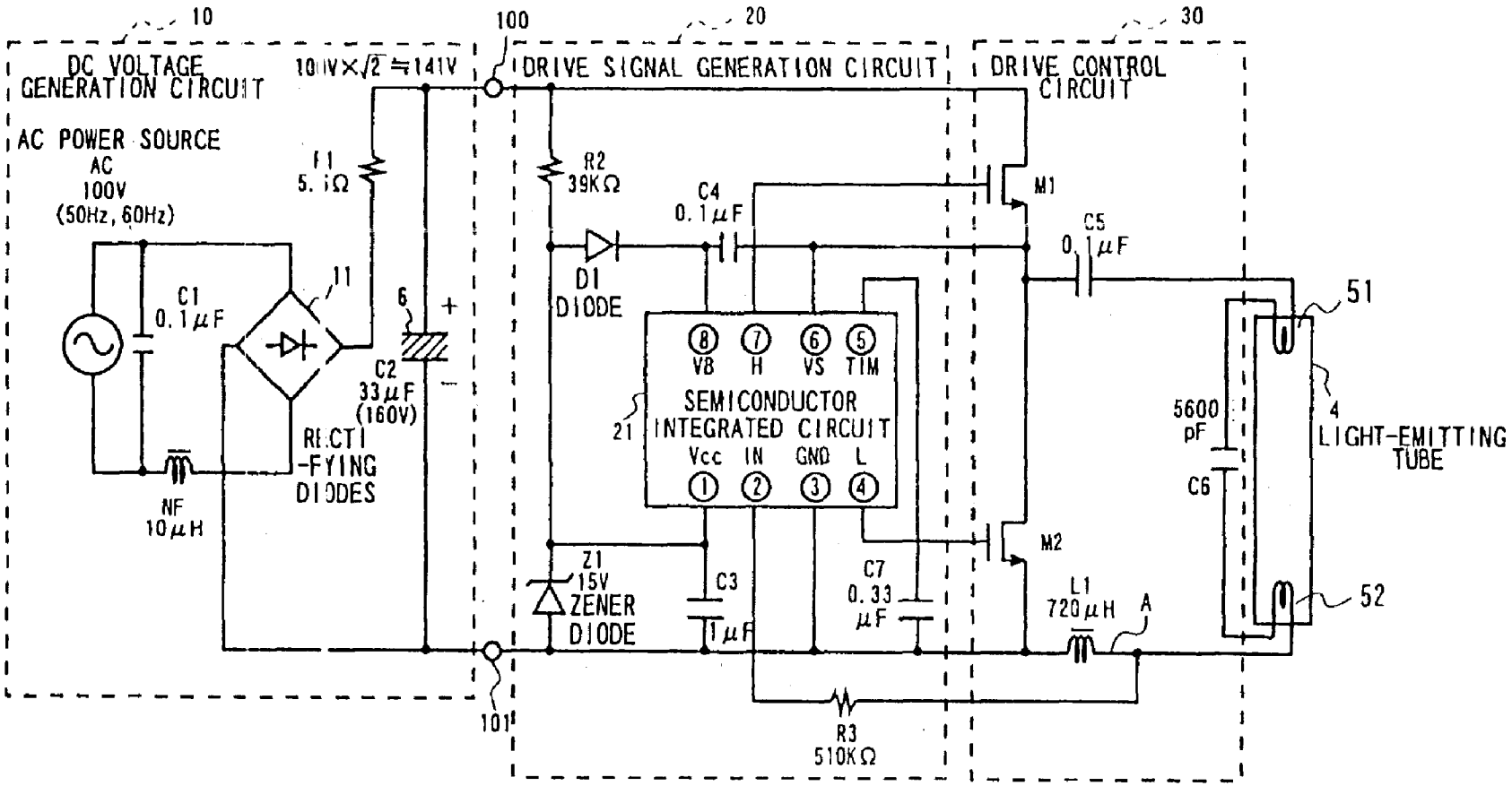
FIG. 2 is a circuit diagram showing a configuration of the bulb-type fluorescent lamp of Embodiment 1 shown in FIG. 1.

FIG. 1 is a perspective view showing the appearance of a bulb-type fluorescent lamp of Embodiment 1 in accordance with the present invention, and FIG. 2 is a circuit diagram showing the configuration of the bulb-type fluorescent lamp of Embodiment 1 shown in FIG. 1.

As shown in FIG. 1, a bulb-type fluorescent lamp 1 of Embodiment 1 has a light-emitting portion 2 having a diameter substantially similar to the shape of a conventional electric bulb and a power source circuit portion 3. The power source circuit portion 3 is made smaller and lighter than a conventional bulb-type fluorescent lamp, and has a shape replaceable with the conventional electric bulb. As shown in FIG. 1, in the bulb-type fluorescent lamp of Embodiment 1, the power source circuit portion 3 is accommodated in the bottom portion near the base portion, and large components, such as an electrolytic capacitor 6, are disposed at the central portion of the bulb-type fluorescent lamp to raise mounting efficiency.

FIG. 2 is a circuit diagram showing the circuit configuration of the power source circuit portion 3 in the bulb-type fluorescent lamp 1 of Embodiment 1. As shown in FIG. 2, the power source circuit portion 3 comprises a DC-voltage generation circuit 10, a drive-signal generation circuit 20 and a drive control circuit 30.

The DC-voltage generation circuit 10 of Embodiment 1 is a circuit for forming a DC voltage (about 141 V) across terminals 100 and 101 from an AC power source (100 V AC, 50 Hz/60 Hz). In FIG. 2, a resistor R1 is a circuit protection resistor against overcurrent, an electronic capacitor C2 is a smoothing capacitor and represented by the numeral 6. As the DC-voltage generation circuit 10 in the bulb-type fluorescent lamp 1, a conventionally-used, general AC/DC converter can be used. In overseas, the voltage of the AC power source is in the range of 200 V to 240 V depending on regions; in this case, the output voltage (the voltage across the terminals of C2) of the DC-voltage generation circuit 10 differs depending on the input voltage of the AC power source.

Figure 3:
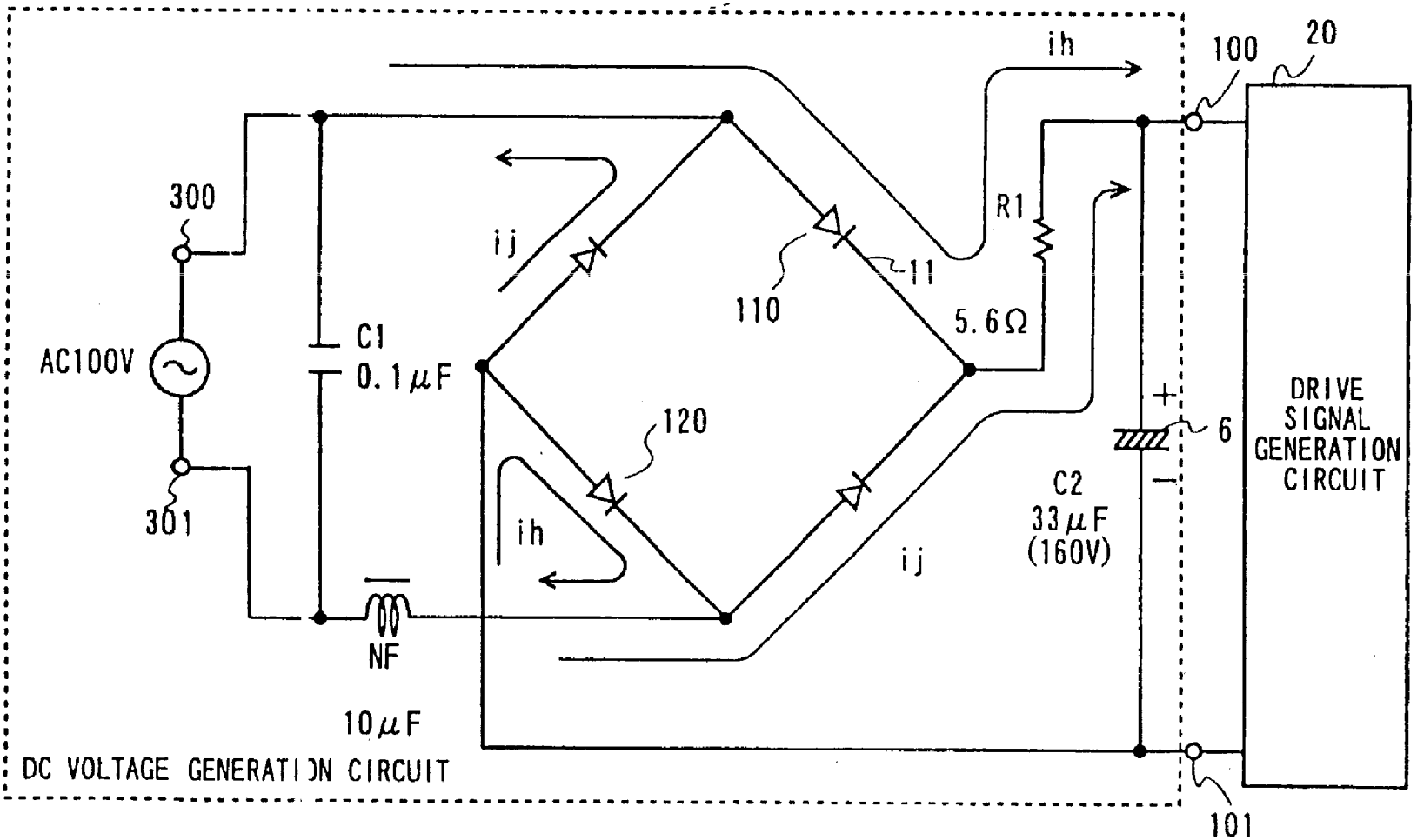
FIG. 3 is a circuit configuration diagram showing an operation of a DC-voltage generation circuit 10 in Embodiment 1.
Figure 4:
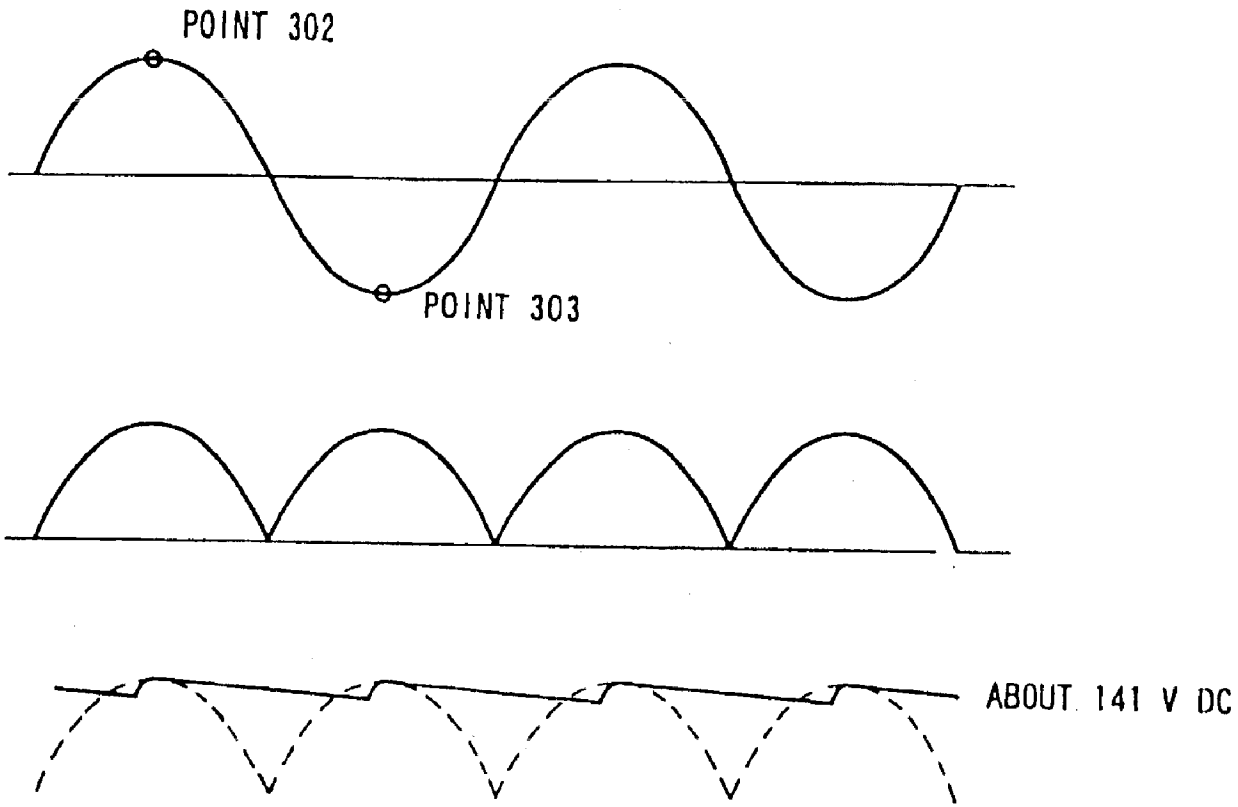
FIG. 4 is waveform diagrams showing voltage waveforms at each portion in the DC-voltage generation circuit 10 in Embodiment 1.

FIG. 3 is a circuit configuration diagram showing the operation of the DC-voltage generation circuit 10 in Embodiment 1. FIG. 4 is waveform diagrams showing voltage waveform at each portion in the DC-voltage generation circuit 10. A part (a) of FIG. 4 is a waveform of a voltage applied across the input terminals 300 and 301 of the DC-voltage generation circuit 10. A part (b) of FIG. 4 is a voltage waveform across the output terminals 100 and 101 in the case where the electrolytic capacitor 6 (C2) is not provided for the DC-voltage generation circuit. In addition, a part (c) of FIG. 4 is a voltage waveform output from the DC-voltage generation circuit 10 in the case where the electrolytic capacitor 6 (C2) is provided for the DC-voltage generation circuit 10.

At point 302 of the voltage waveform shown in the part (a) of FIG. 4, a current flows along the path indicated by arrows ih in FIG. 3, and the electrolytic capacitor 6 (C2) is charged up to about 141 V. Hereafter, when the input voltage applied across the input terminals 300 and 301 drops, the rectifying diodes 110 and 120 of a rectifying portion 11 are turned off. Furthermore, the charge charged in the electrolytic capacitor 6 (C2) is input to the drive-signal generation circuit 20 and the drive control circuit 30 through the output terminals 100 and 101.

At point 303 of the voltage waveform shown in the part (a) of FIG. 4, a current flows along the path indicated by arrows ij in FIG. 3, and the electrolytic capacitor 6 (C2) is charged up to about 141 V. In other words, its regarded that the voltage waveform shown in the part (b) of FIG. 4 is the voltage waveform applied to the electrolytic capacitor 6 (C2). As a result, the voltage indicated in the solid line in the part (c) of FIG. 4 is output across the output terminals 100 and 101. The magnitude of the ripple in the voltage waveform output across the output terminals 100 and 101 becomes smaller as the capacitance of the electrolytic capacitor 6 (C2) is larger. In Embodiment 1, the voltage (Vcc) applied to the pin terminal No. 1 of the semiconductor integrated circuit 21 shown in FIG. 2 is 15 V DC.

Figure 5:
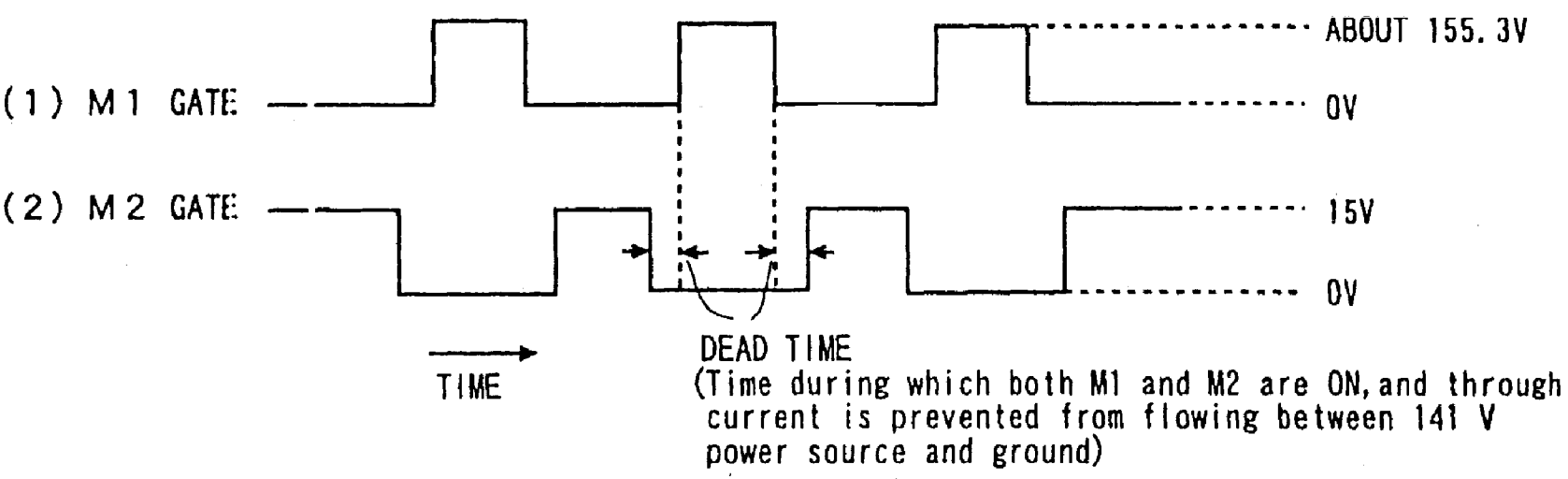
FIG. 5 shows pulse signal waveforms input to gates of power MOS transistors M1 and M2 in Embodiment 1, a part (1) shows a pulse signal waveform (the pulse signal on the high-voltage side) to be input to the gate of the first power MOS transistor M1, and a part (2) shows a pulse signal waveform (the pulse signal on the low-voltage side) to be input to the gate of the second power MOS transistor M2.

The drive-signal generation circuit 20 is a circuit for generating pulse signals to be input to the gates of the two power MOS transistors M1 and M2 of the drive control circuit 30. The voltage output across the terminals 100 and 101 from the DC-voltage generation circuit 10 is applied to a series connection arrangement comprising a resistor (R2) and a zener diode (Z1). The voltage generated across both ends of the zener diode (Z1) is applied between the power source (Vcc) terminal of the pin terminal No. 1 and the ground (GND) terminal of the pin terminal 3 of the semiconductor integrated circuit 21. FIG. 5 is an explanatory view showing the timing of the pulse signals formed in the semiconductor integrated circuit 21 of the drive-signal generation circuit 20. In FIG. 5, a part (1) shows the pulse signal waveform (the pulse signal on the high-voltage side) to be input to the gate of the first power MOS transistor M1. Furthermore, a part (2) shows the pulse signal waveform (the pulsed signal on the low-voltage side) to be input to the gate of the second power MOS transistor M2.

Figure 6:
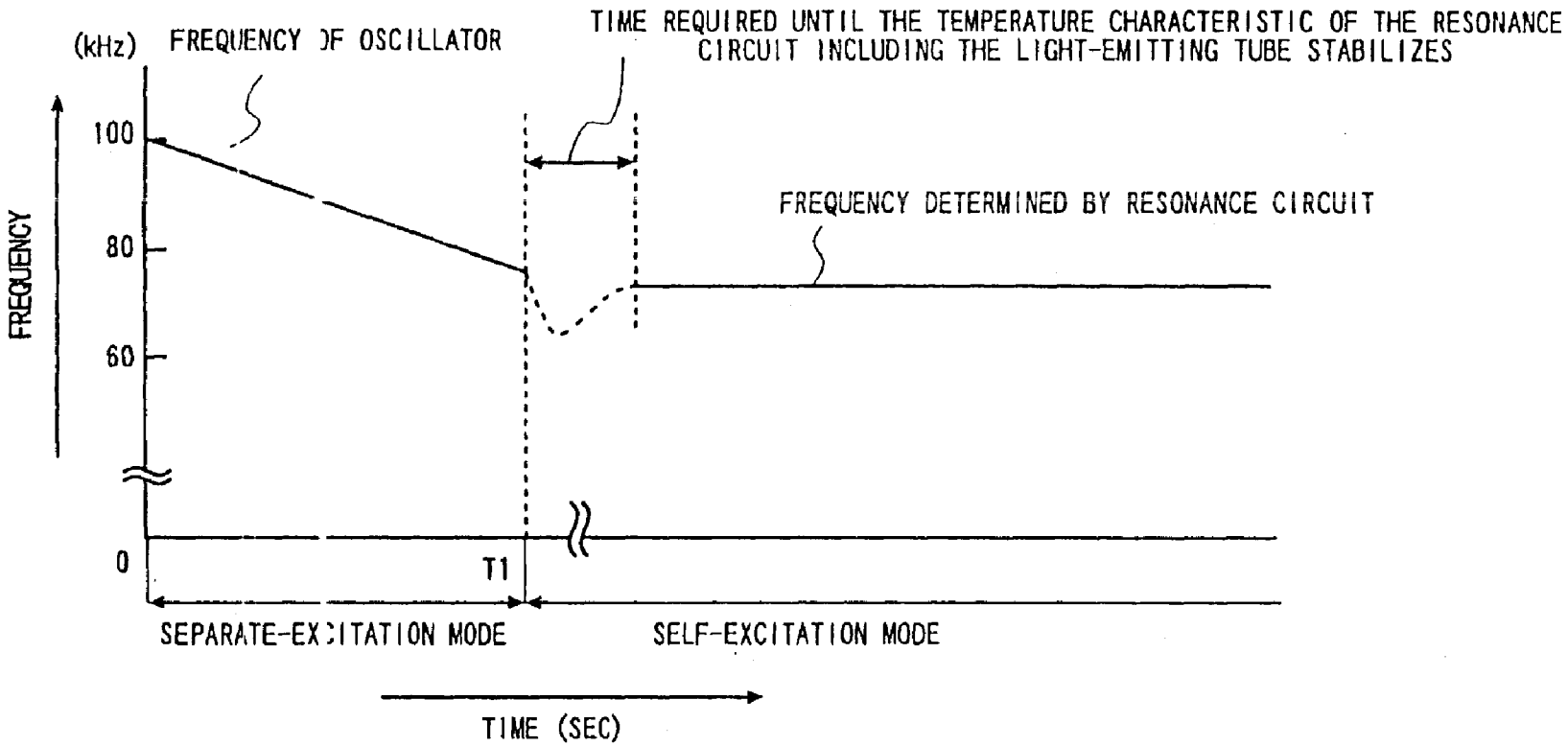
FIG. 6 is a graph showing a progress of an output frequency in a drive control circuit 30 in Embodiment 1.

FIG. 6 is an example of a graph showing the progress of the output frequency in the drive control circuit 30. As shown in FIG. 6, in a constant period up to time T1 after power on (ON state), a pulse signal having a frequency formed by an oscillator in the semiconductor integrated circuit 21 is output. This period is referred to as a separate-excitation mode in the following descriptions. After the constant period from power on (ON state), in other words, after time T1, that is, after the separate-excitation mode, the signal from the oscillator in the semiconductor integrated circuit 21 stops. And the signal from the filament-side terminal (the terminal indicated by code A in FIG. 2) at both terminals of a coil L1 in the drive control circuit 30 is fed back via a current control resistor R3 to the IN terminal (the trigger input terminal indicated by the terminal No. 2 of the terminals of the semiconductor integrated circuit 21 of FIG. 2) of the semiconductor integrated circuit 21. In the semiconductor integrated circuit 21, the LC resonance frequency of the drive control circuit 30 is detected on the basis of the signal output from the filament-side terminal of the coil L1. Then, the pulse signals are input from the light-voltage side output terminal H and the low-voltage side output terminal L of the semiconductor integrated circuit 21 to the gates of the two power MOS transistors M1 and M2 in the drive control circuit 30, respectively. The period during which the pulse signals based on the signal from the filament-side terminal (the terminal indicated by code A in FIG. 2) of the above-mentioned coil L1 are input to the power MOS transistors M1 and M2, that is, the period after the above-mentioned time T1, is hereinafter referred to as a self-excitation mode. In the self-excitation mode, a loop for continuing LC resonance is formed in the drive control circuit 30 and the filaments 51 and 52 of the light-emitting tube 4. Therefore, the resonance state continues until power is turned off (OFF state).

The resistor R2, the zener diode Z1 and the capacitor C3 of the drive-signal generation circuit 20 form a circuit wherein a DC power source voltage of 15 V to be supplied to the pin terminal No. 1 (Vcc) of the semiconductor integrated circuit 21 is generated from a DC voltage of about 141 V, i.e., the output of the DC-voltage generation circuit 10. After power on, a current always flows through the zener diode Z1, and the resistor R2 is set to maintain the voltage on the zener diode at 15V. Therefore, the resistance value of the resistor R2 is set depending on the currents flowing at the terminal of the pin terminal No. 1 and at the terminal of the pin terminal No. 8 of the semiconductor integrated circuit 21.

The terminals of the pin terminal Nos. 6, 7 and 8 in the semiconductor integrated circuit 21 of the drive-signal generation circuit 20 are the terminal group of the high-pressure-pulse generation circuit portion, and a high-voltage pulse signal is output from the terminal (the high-voltage side) of the pin terminal No. 7.

Figure 7:
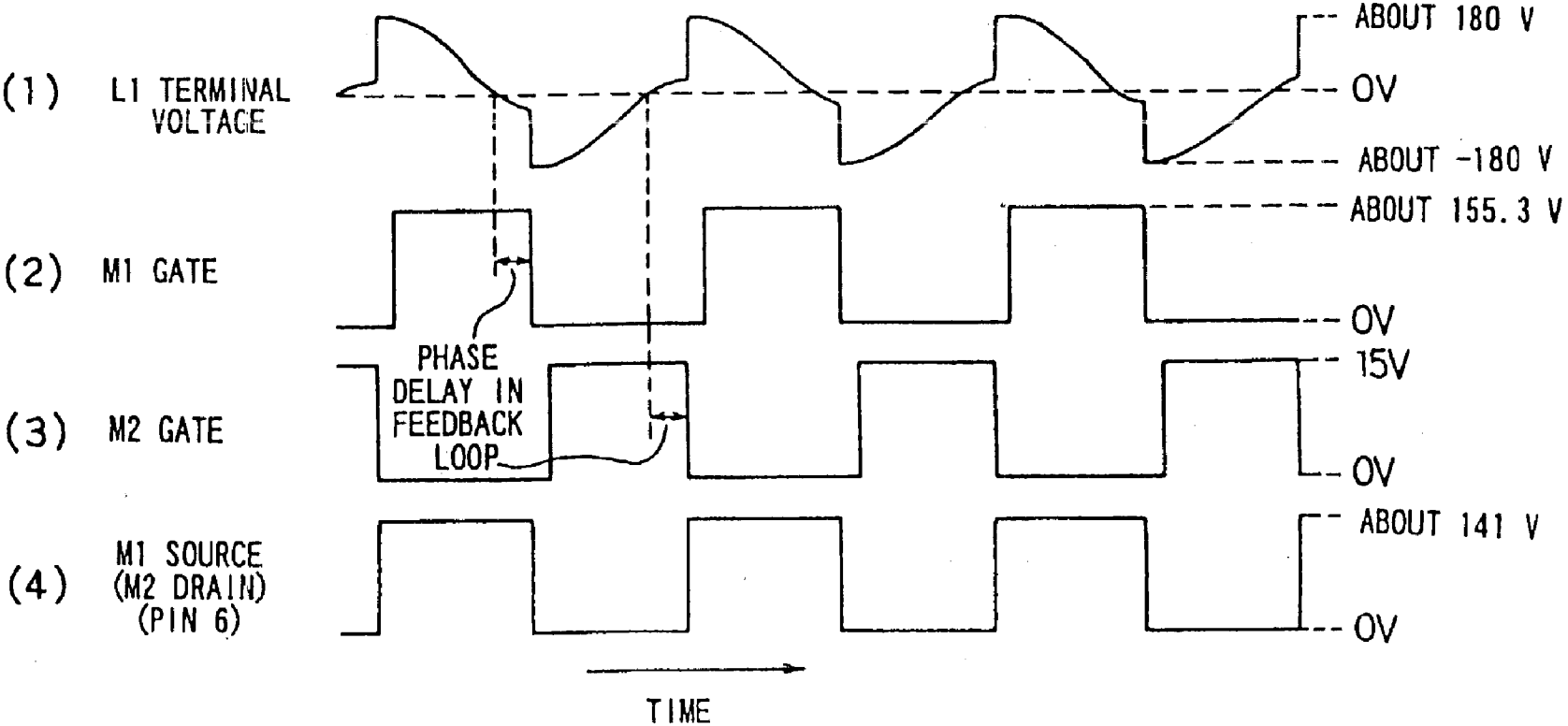
FIG. 7 is a waveform diagram showing various signals in the drive control circuit 30.

FIG. 7 shows various signals in the drive control circuit 30. A part (1) of FIG. 7 shows the voltage signal across the terminals of the coil L1, a part (2) shows a signal input to be gate of the first power MOS transistor M1, a part (3) shows a signal input to the gate of the second power MOS transistor M2, and a part (4) shows a signal input into the terminal of the pin terminal No. 6. The pulse signal shown in the part (4) of FIG. 7 is the output signal of the half bridge, and is the signal at the source (the drain of the second power MOS transistor M2) of the fist power MOS transistor M1. The terminal of the pin terminal No. 6 is connected to the common connection portion of the power MOS transistors M1 and M2 of the drive control circuit 30. The pulse signal shown in the part (4) of FIG. 7 is input to the terminal of the pin terminal No. 6.

When the terminal of the pin terminal No. 6 is 0 V, a voltage of about 14.3 V, obtained by subtracting the forward voltage of a diode D1, about 0.7 V, from the application voltage of 15 V at the zener diode Z2 of the drive-signal generation circuit 20, is applied across the terminals of the capacitor C4, that is, to the terminal of the pin terminal No. 8. On the other hand, when the terminal of the pin terminal No. 6 is 141 V, the voltage across the terminals of the capacitor C4 is maintained at 14.3 V. Therefore, the terminal of the pin terminal No. 8 has a potential of about 155.3 V. Since the voltage across the terminals of the zener diode Z1 is 15 V at this time, the diode D1 is in the OFF state.

The capacitor C7 of the drive-signal generation circuit 20 is a capacitor for setting the time of the separate-excitation mode immediately after power on. When power is turned on, a constant current of 6 μA, for example, is output from the terminal of the pin terminal No. 5 of the semiconductor integrated circuit 21, and the capacitor C7 is charged with the current. As a result, the voltage across the terminals of the capacitor C7 rises from 0 V; when the capacitor C7 reaches a predetermined voltage, the semiconductor integrated circuit 21 is switched from the separate-excitation mode to the self-excitation mode.

The detailed configuration and operation of the semiconductor integrated circuit 21 will be described later.

[Filament preheating function]

The light-emitting tube 4 connected to the drive control circuit 30 and driven and controlled thereby becomes high impedance (open state) across the filaments (across both terminals of the capacitor C6) at the time of non-lighting; when the voltage across the filaments reaches a certain value, the lighting state is obtained. At the time of lighting, the impedance across the filaments (across both terminals of the capacitor C6) becomes low (about 100 Ω).

It is usually known with respect to a fluorescent lamp that its service life is extended by flowing a current (preheating current) to the filaments 51 and 52 before lighting. Therefore, the bulb-type fluorescent lamp of Embodiment 1 of the present invention has a filament preheating function described next.

In the separate-excitation mode immediately after lighting, the pulse signal having the frequency shown in the part (4) of FIG. 7 is input to the connection portion of the source of the first power MOS transistor M1 and the drain of the second power MOS transistor M2, i.e., the terminal of the pin number No. 6 of the semiconductor integrated circuit 21. When the bulb-type fluorescent lamp is not lit (the impedance across the filaments is sufficiently high), the resonance frequency f0 of the capacitor C5, the capacitor C6 and the coil L1 of the drive control circuit 30 is represented by the following equation (1). At this time, it is assumed that the resistor R3 of the drive-signal generation circuit 20 is sufficiently large.

$$f_0 = \frac{1}{2\pi\sqrt{\frac{C5 \times C6}{C5 + C6} \times L1}} \quad (1)$$

In the above-mentioned equation (1), C5 and C6 represent the capacitances of the capacitors C5 and C6, and L1 represents the inductance of the coil L1.

Figure 8:
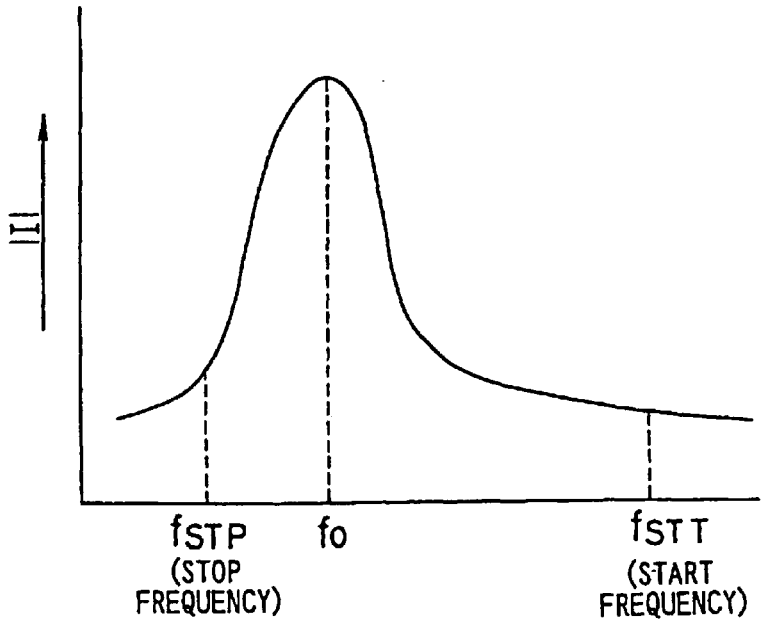
FIG. 8 is a graph showing a relationship between a current |I| flowing in a resonance circuit and a frequency in a separate-excitation mode in Embodiment 1.

FIG. 8 is a graph showing the relationship between the current |I| flowing in the resonance circuit comprising the capacitor C5, the capacitor C6, the coil L1, the filaments of the light-emitting tube 4 and the like and the frequency in the separate-excitation mode. As shown in FIG. 8, at the resonance frequency f0, the current flow |I| flowing in the resonance circuit becomes maximum, and the voltage across the filaments becomes maximum. As the frequency becomes higher than the resonance frequency f0, or lower than the resonance frequency f0, the current |I| becomes smaller, and the voltage across the filaments (across both terminals of the capacitor C6) becomes smaller.

As described above, the resonance circuit has such a resonance curve as shown in FIG. 8. Therefore, the start frequency (lighting frequency) at the time of power on in the separate-excitation mode is set at frequency fstt wherein the light-emitting tube 4 it not lit securely, and this frequency is lowered gradually. The stop frequency fstp wherein the separate-excitation mode is switched to the self-excitation mode is set at a frequency lower than the resonance frequency f0. By sweeping the frequency from a high value to a low value, the light-emitting tube 4 lights surely at least in the vicinity of the resonance frequency f0. By setting the constants of the capacitor C5, the capacitor C6 and the coil L1 as described above, a current flows through the filaments 51 and 52 during the period from immediately after power on until the voltage across the filaments reaches a lighting voltage. Therefore, the filaments 51 and 52 are preheated sufficiently.

As described above, in the bulb-type fluorescent lamp of Embodiment 1, after the preheating current flowing through the filaments 51 and 52 after power on, the lighting voltage is applied across the filaments. As and result, when the lamp is lit, the impedance across the filaments becomes low (about 100 Ω). Then, after the frequency is swept to the stop frequency in the separate-excitation mode for a while, the separate-excitation mode is switched to the self-excitation mode.

The resonance frequency in the self-excitation mode is determined by the resonance circuit of the capacitor C5, the capacitor C6 and the coil L1, the impedance of the light-emitting tube 4 at the time of lighting and the phase of the feedback loop from the resonance circuit.

[Configuration of the semiconductor integrated circuit 21]

Figure 9:
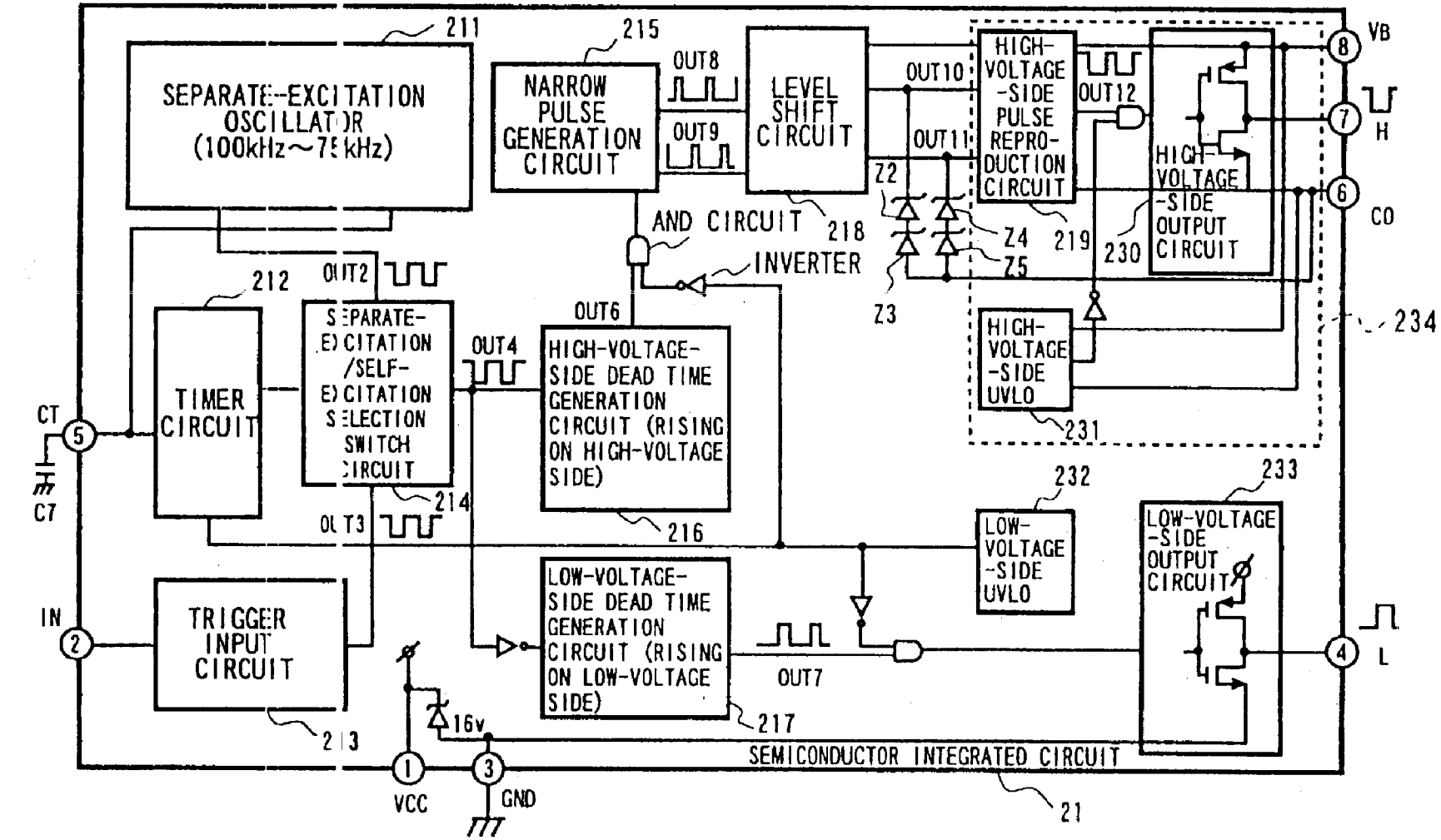
FIG. 9 is a block diagram showing a configuration of the semiconductor integrated circuit 21 in Embodiment 1.

Next, the configuration of the semiconductor integrated circuit 21 in the bulb-type fluorescent lamp of Embodiment 1 will be described. FIG. 9 is a block diagram showing the semiconductor integrated circuit in the bulb-type fluorescent lamp of Embodiment 1.

In FIG. 9, a low-voltage-side and under-voltage lockout circuit (written as a low-voltage-side UVLO in FIG. 9; UVLO is an acronym of Under-Voltage Lockout) 232 is configured so that no signal is output from the terminal of the pin terminal No. 4 when the power voltage is a setting voltage (10 V for example) or less. On the other hand, a high-voltage-side under-voltage lockout circuit (written as a high-voltage-side UVLO in FIG. 9) 231 is configured so that no signal is output from the terminal of the pin terminal No. 7 when the voltage across the terminals of the pin terminal No. 8 and the pin terminal No. 6 is the setting voltage or less.

The low-voltage-side under-voltage lockout circuit 232 and the high-voltage-side under-voltage lockout circuit 231 are provided for the bulb-type fluorescent lamp of Embodiment 1 as described above, thereby preventing abnormal operation at the time of power on/off. Furthermore, the low-voltage-side and under-voltage lockout circuit 232 has a function of resetting a timer circuit 212 at the time of power on/off, and a function of stopping the operation of a separate-excitation oscillator 211 operating usually at a frequency of 75 kHz to 100 kHz, for example. The setting voltage in the low-voltage-side under-voltage lockout circuit 232 and the setting voltage at the high-voltage-side under-voltage lockout circuit 231 are provided with hysteresis between the value at the time of voltage rising and the value at the time of voltage lowering, thereby being set to have different voltages.

Figure 10:
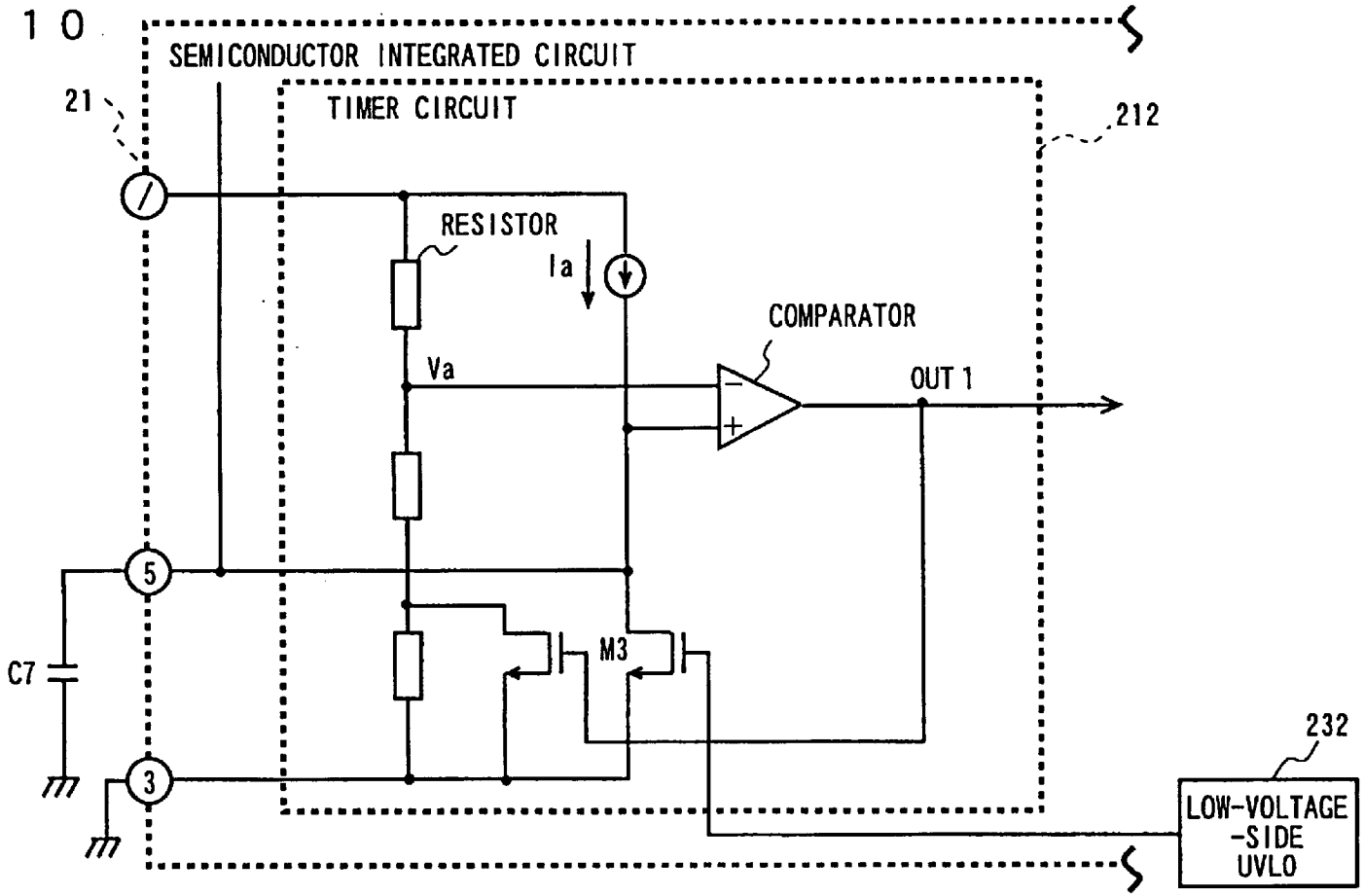
FIG. 10 is a circuit diagram showing a configuration of a timer circuit 212 in the semiconductor integrated circuit 21 of Embodiment 1.

FIG. 10 is a circuit diagram showing a preferred configuration of the timer circuit 212 in the semiconductor integrated circuit 21. The timer circuit 212 is a circuit for setting the time of switching from the separate-excitation mode to the self-excitation mode after power on. At the time of power on, the voltage across the terminals of the capacitor C7 is initialized to 0 V by the MOS transistor M3 of the timer circuit 212. When the lockout is released at the low-voltage-side under-voltage lockout circuit 232, the capacitor C7 is charged with a constant current Ia. When the voltage across the terminals of the capacitor C7 reaches a predetermined setting voltage Va, the output (OUT1) of the timer circuit 212 is switched from LOW to HIGH. The setting voltage of the timer circuit 212 is provided with hysteresis between the value at the time when the voltage across the terminals of the capacitor C7 rises and the value at the time when the voltage lowers, thereby being set to have different voltages.

Furthermore, at the time of power off, the voltage across the terminals of the capacitor C7 is also initialized to 0 V by the low-voltage-side under-voltage lockout circuit 232.

[Under-voltage lockout circuits (UVLO) 231 and 232]

Next, the operation sequence about the low-voltage-side under-voltage lockout circuit (hereinafter simply referred to as low-voltage-side UVLO) 231 and the high-voltage-side under-voltage lockout circuit (hereinafter simply referred to as high-voltage-side UVLO) 232 will be described below.

When the high-voltage-side UVLO 231 operates (carries out reset output) earlier than the low-voltage side UVLO 232 at the time of power off, only the power MOS transistor M1 becomes open at the time when the high-voltage-side UVLO 231 operates. Then, the resonance state of the LC resonance circuit of the drive control circuit 30 stops. As a result, the charge of the 141 V power source from the DC-voltage generation circuit 10 loses all means of escape, and the voltage drop of the 141 power source stops. Then, the 15 V power source of the semiconductor integrated circuit 21 also stops. By this operation of the high-voltage-side UVLO 231, the non-operating state of the low-voltage-side UVLO 232 is maintained. At this time, the timer terminal voltage at the pin terminal No. 5 is not reset to 0 V by the low-voltage-side UVLO 232, but is maintained at a certain voltage. When commercial power is turned on again in this state, start is carried out in the self-excitation mode, instead of the separate-excitation mode, thereby causing a malfunction of no lighting.

To prevent the above-mentioned malfunction, the setting voltages thereof are adjusted so that the low-voltage side UVLO 232 operates earlier than the high-voltage-side UVLO 21 at the time of power off. For example, the operation voltage of the low-voltage side UVLO 232 is set at 10 V, and the operation voltage of the high-voltage-side UVLO 231 is set at 9 V. Thus, the low-voltage side UVLO 232 operates earlier than the high-voltage-side UVLO 231 at the time of power off.

Therefore, the bulb-type fluorescent lamp of Embodiment 1 lights securely even at the time of the re-lighting operation.

When the power source voltage on the low-voltage side is 15 V, the power source voltage on the high-voltage side is 14.3 V. Since noise is apt to mix into the signal on the high-voltage side at this time, a filter is provided to prevent the mixture of noise.

[Separate-excitation/self-excitation selection switch circuit 214]

Figure 11:
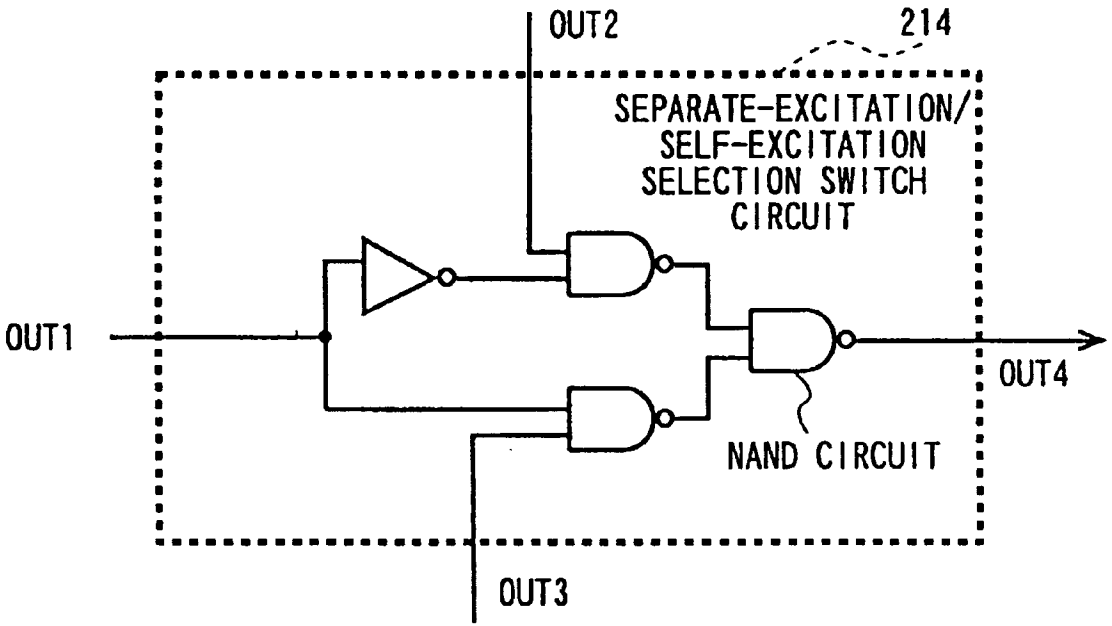
FIG. 11 is a circuit diagram showing a configuration of a separate-excitation/self-excitation selection switch circuit 214 in the semiconductor integrated circuit 21 of Embodiment 1.

FIG. 11 is a circuit diagram of the separate-excitation/self-excitation selection switch circuit 214 in the semiconductor integrated circuit 21. The separate-excitation/self-excitation selection switch circuit 214 is a circuit for outputting either the output (OUT2) from the separate-excitation oscillator 211 or the output (OUT3) from a trigger input circuit 213 as OUT4 depending on the output (OUT1) of the timer circuit 212. The separate-excitation/self-excitation selection switch circuit 214 outputs the signal (OUT2) from the separate-excitation oscillator 211 in the separate-excitation mode immediately after power. In the subsequent self-excitation mode, the signal (OUT3) from the trigger input circuit 213 is output as OUT4 to a high-voltage-side dead time generation circuit 216 and a low-voltage-side dead time generation circuit 217.

[Separate-excitation oscillator 211]

Figure 12:
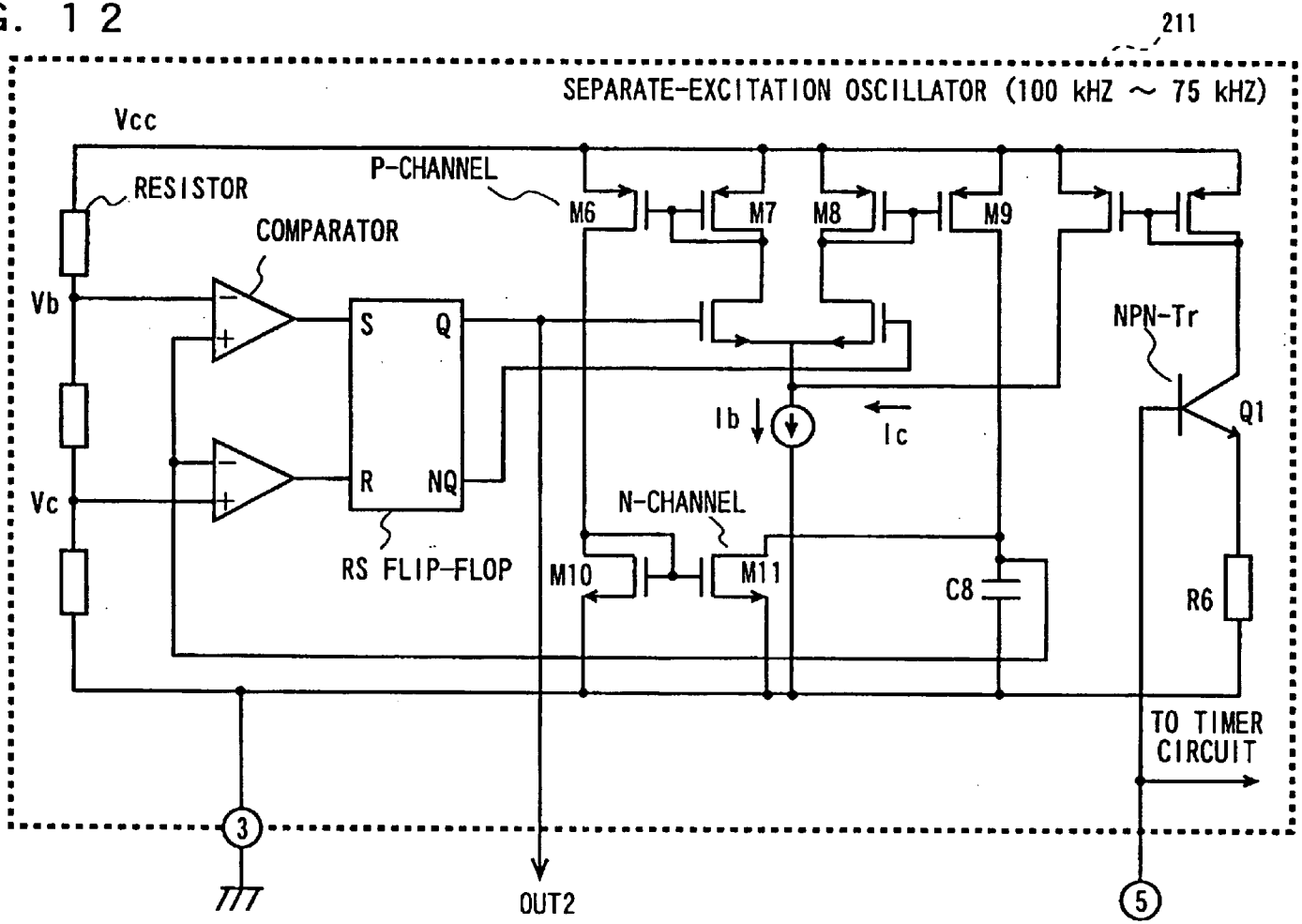
FIG. 12 is a circuit diagram showing a configuration of a separate-excitation oscillator in the semiconductor integrated circuit 21 of Embodiment 1.

The separate-excitation oscillator 211 is a circuit for generating a pulse signal having a preset frequency in the period of the separate-excitation mode after power on. As the terminal voltage at the pin terminal No. 5 connected to a timer circuit 212 rises, the frequency of the separate-excitation oscillator 211 lowers. FIG. 12 is a circuit diagram showing the configuration of the separate-excitation oscillator 211 in the semiconductor integrated circuit 21 of Embodiment 1.

In the separate-excitation oscillator 211 shown in FIG. 12, C8 is a charging/discharging capacitor, Ib is a constant current source current, Ic is a constant current to be subtracted from the charging or discharging current supplied to the charging/discharging capacitor C8 depending on the terminal voltage at the pin terminal No. 5, Vb is an upper-side reference voltage for repeating charging/discharging to the charging/discharging capacitor C8, and Vc is a lower-side reference voltage.

Figure 13:
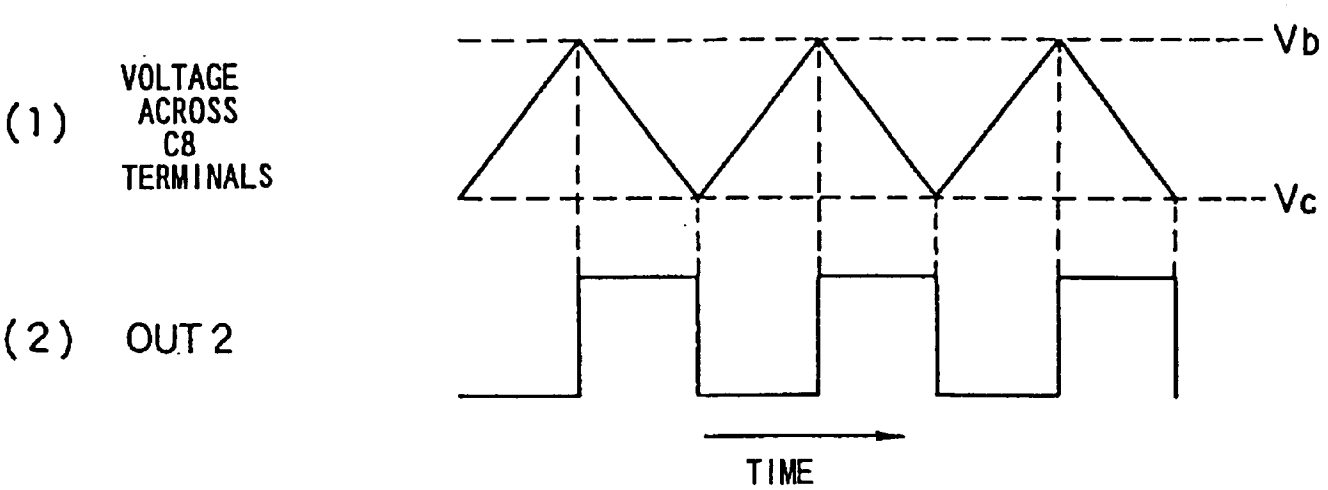
FIG. 13 is a waveform diagram showing signal states in the separate-excitation oscillator of Embodiment 1.

FIG. 13 shows the voltage (1) across the terminals of the charging/discharging capacitor C8 in the separate-excitation oscillator 211 and the output signal (OUT2) of the separate-excitation oscillator 211. The relationship between the constant current Ic determined by the terminal voltage Ic at pin terminal No. 5 in the separate-excitation oscillator 211 and the oscillator frequency f (Ic) of the separate-excitation oscillator 211 is represented by the following equation (2).

$$f(Ic) = \frac{Ib - Ic}{2 \times (C8) \times (Vb - Vc)} \quad (2)$$

In the equation (2), the constant current Ic changes depending on the terminal voltage at the pin terminal No. 5, and the constant current source current Ib and the constant current Ic has a relationship of Ib>Ic.

Next, a configuration wherein the duty ratio in the separate-excitation mode is set at a desired value will be described.

As the duty ratio of the pulse signal (high-voltage-side output) from the terminal of the pin terminal No. 7 of the semiconductor integrated circuit 21 is larger, the preheating current flowing through the filaments 51 and 52 before the lighting of the light-emitting diode 4 becomes larger. To increase the duty ratio in this way, it is necessary to set the duty ratio in the separate-excitation oscillator 211 depending on the frequency of the resonance circuit of the capacitors C5, C6, the coil L1 and the like and the frequency set in the separate-excitation mode.

When the gate width W and the gate length L of the P-channel MOS transistors M6, M7, M8 and M9 of the separate-excitation oscillator 211 shown in FIG. 12 are made identical with the gate width W and the gate length L of the N-channel MOS transistors M10 and M11, the charging/discharging current to the capacitor C8 becomes [Ib−Ic]. In this case, the duty ratio becomes 50%. When the gate width of the N-channel MOS transistor M1 is 0.5 times of that of the MOS transistor M10, and when the gate width of the MOS transistor M9 is 2 times of that of the MOS transistor M8, the charging current becomes [2(Ib−Ic)], and the discharging current becomes [1/2(Ib−Ic)]. In this case, the duty ratio becomes 20%.

In the separate-excitation oscillator 211, the duty ratio can be set by adjusting the ratio of the gate width of the MOS transistor M8 and that of the MOS transistor M9 and the ratio of the gate width of the MOS transistor M10 and that of the MOS transistor M11 as described above.

[Trigger input circuit 213]

The signal from the high-voltage-side terminal A (the terminal on the opposite side of the ground) of the coil L1 shown in the above-mentioned FIG. 2 is input to the trigger input circuit 213 via a high-resistance resistor R3 (510 kΩ).

Figure 14:
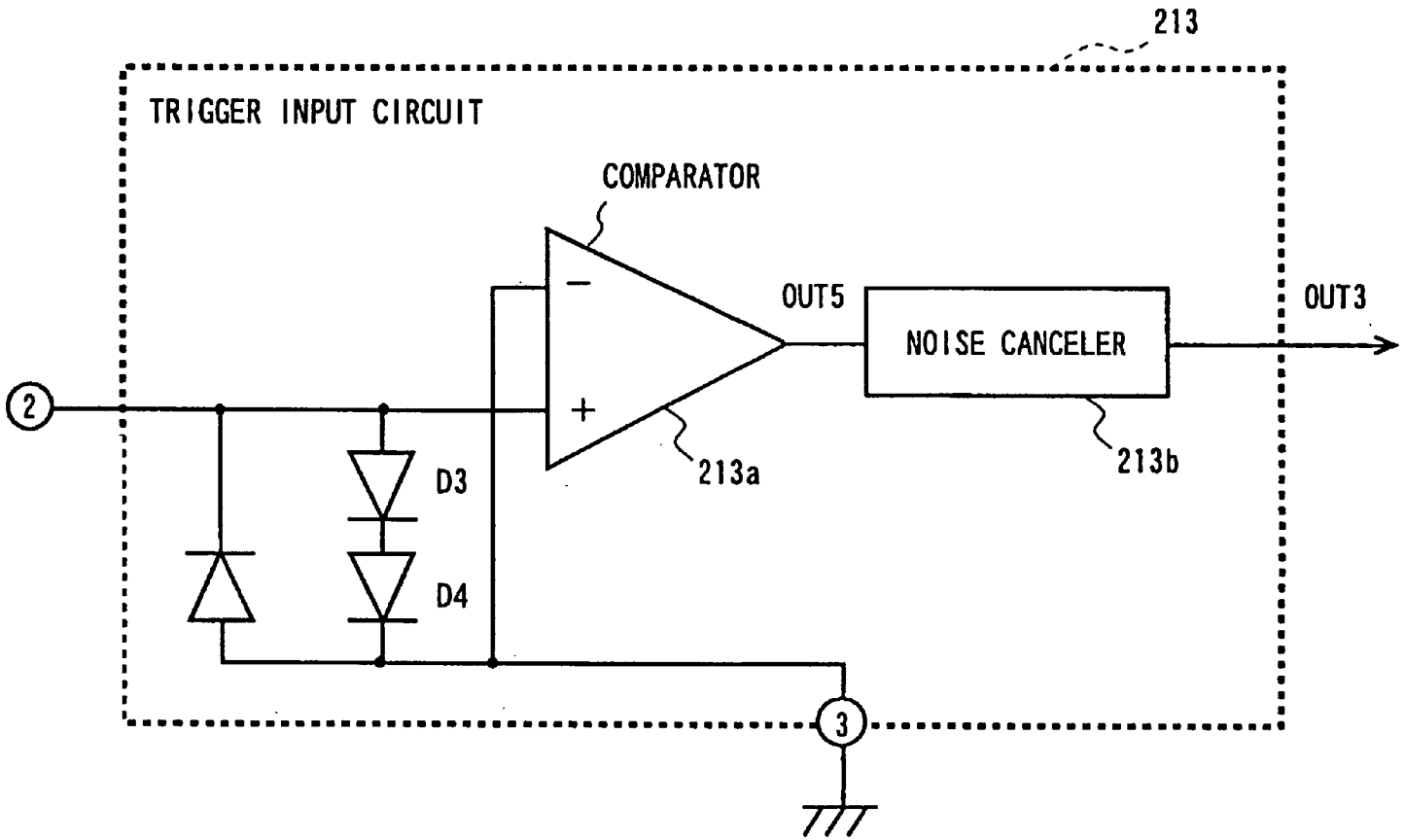
FIG. 14 is a circuit diagram showing a configuration of a trigger input circuit in the semiconductor integrated circuit 21 of Embodiment 1.

FIG. 14 is a circuit diagram showing the configuration of the trigger input circuit 213. A part (1) Of FIG 15 shows the signal at the high-voltage-side terminal of the coil L1 (FIG. 2) to be input to the trigger input circuit 213 and a part (2) shows the signal to be output.

Figure 15:
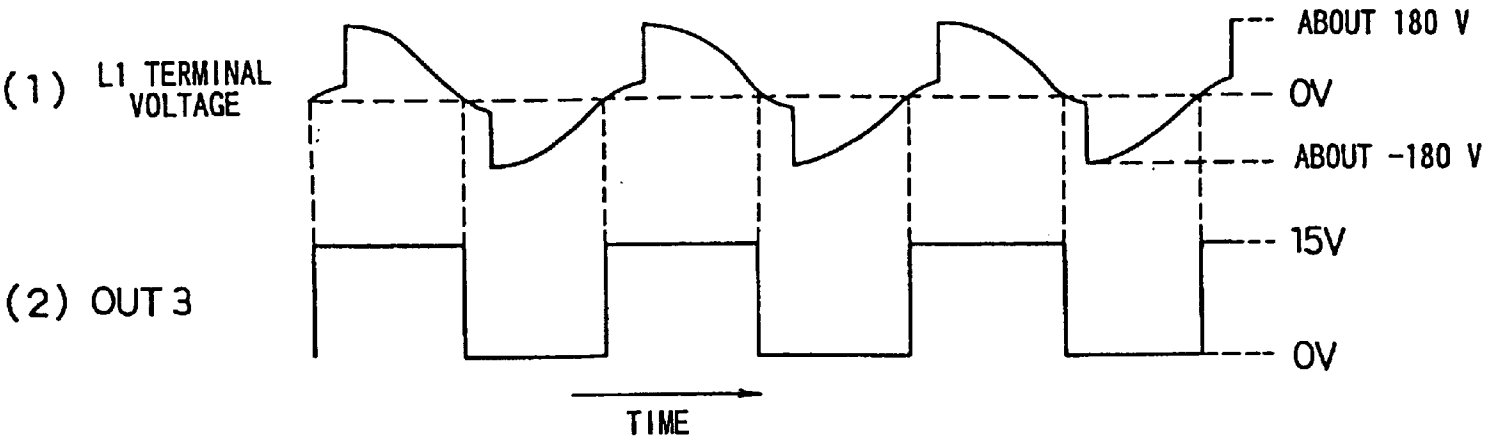
FIG. 15 is a waveform diagram showing a signal states of the trigger input circuit in the semiconductor integrated circuit 21 of Embodiment 1.

As shown in FIG. 15, in the trigger input circuit 213, the input signal shown in the part (1) is converted into a pulse waveform with its 0 V as the threshold level. The trigger input circuit 213 of Embodiment 1 is set to have hysteresis. For this reason, at the rising time of the input signal, conversion is carried out into a pulse waveform, with 0.2 V, slightly higher than 0 V, used as the threshold level. However, in reality, the phase of the output signal (OUT3) is slightly shifted from that of the input signal by the delay operation of the circuit in the trigger input circuit 213.

A noise canceler 213b is provided at the output of the comparator 213a of the trigger input circuit 213, thereby having a configuration wherein when noise is included in the input signal, the noise can be canceled.

Figure 16:
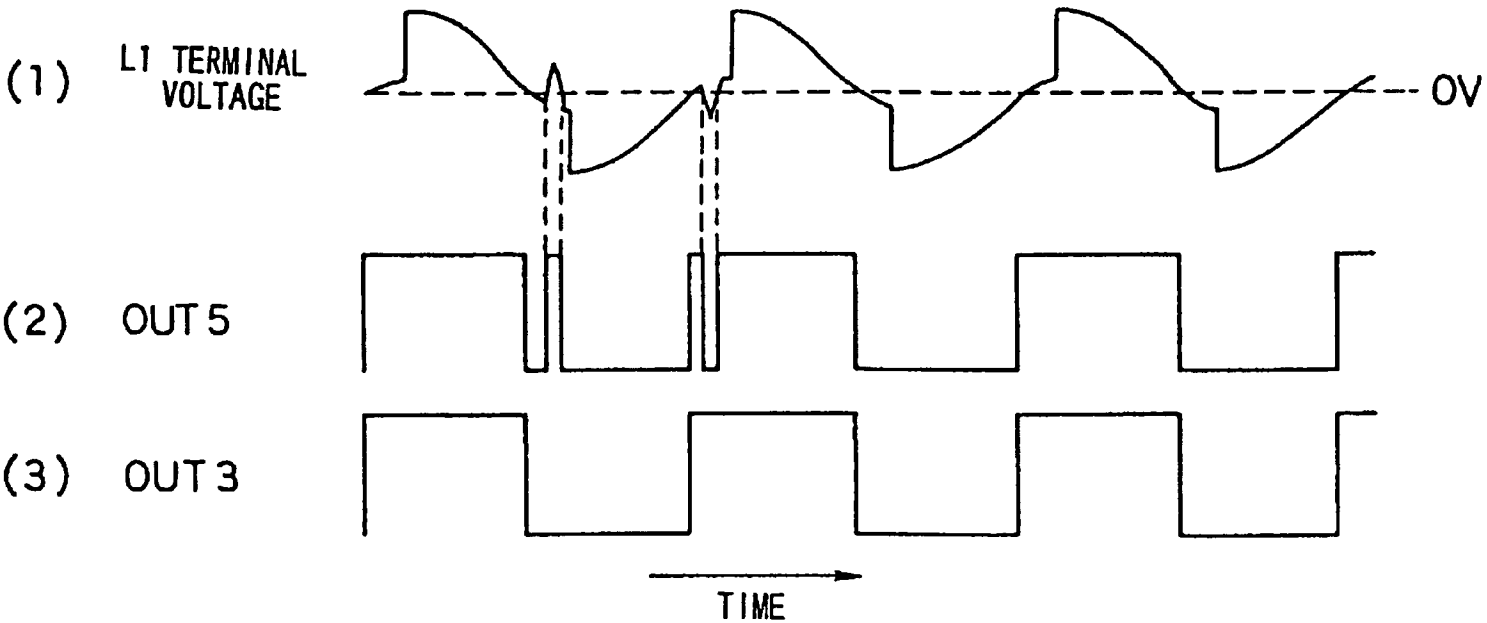
FIG. 16 is a waveform diagram showing the signal states in the semiconductor integrated circuit 21 of Embodiment 1.

A part (1) of FIG. 16 shows an example of the input signal, including noise, from the high-voltage-side terminal A of the coil L1 (FIG. 2), a part (2) shows the signal output from the comparator 213a in that case, and a part (3) shows the signal output from the noise canceler 213b. As shown in FIG. 16, after the terminal voltage of the coil L1 reaches the threshold level and after the output signal (OUT3) is switched, and even when the terminal voltage of the coil L1 exceeds the threshold level again because of the noise or the like in a constant period (about 1 μS), the signal is canceled. As a result, the output signal (OUT3) becomes a signal with no noise.

[High-voltage-side dead time generation circuit 216 and low-voltage-side dead time generation circuit 217]

The signal (OUT4) from the separate-excitation/self-excitation selection switch circuit 214 is input to the high-voltage-side dead time generation circuit 216 and the low-voltage-side dead time generation circuit 217. The high-voltage-side dead time generation circuit 216 and the low-voltage-side dead time generation circuit 217 form and output signals wherein a one-side edge (rising or falling) of the input signal waveform is delayed (750 ns).

Figure 17:
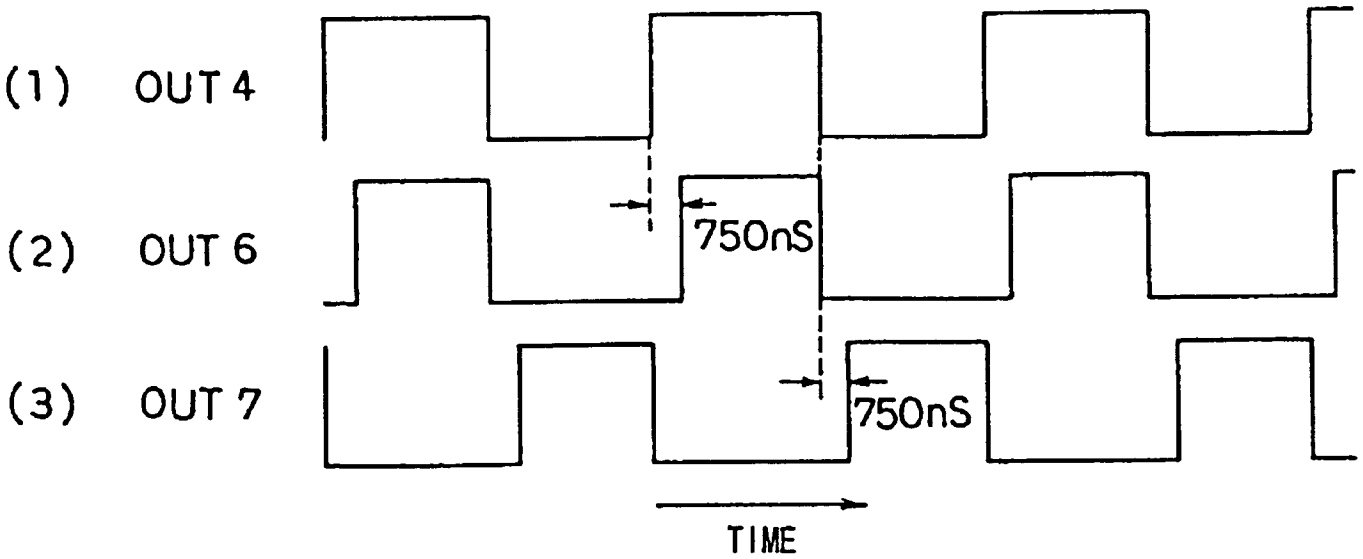
FIG. 17 is a waveform diagram showing a signal states in the semiconductor integrated circuit 21 of Embodiment 1.

A part (1) of FIG. 17 shows the signal (OUT4) from the separate-excitation/self-excitation selection circuit 214. A part (2) of FIG. 17 shows the output signal (OUT6) of the high-voltage-side dead time generation circuit 216. A part (3) of FIG. 17 shows the output signal (OUT7) of the low-voltage-side dead time generation circuit 217. As shown in the part (2) of FIG. 17, the output signal (OUT6) of the high-voltage-side dead time generation circuit 216 is formed to rise 750 ns laster than the rising of the signal (OUT4) from the separate-excitation/self-excitation selection circuit 214.

On the other hand, the output signal (OUT7) of the low-voltage-side dead time generation circuit 217 is an inversion of the signal (OUT4) from the separate-excitation/self-excitation selection circuit 214 as shown in the part (3) of FIG. 17. Furthermore, the output signal (OUT7) is generated to rise 750 ns later than the falling of the signal of OUT4.

[Narrow pulse generation circuit 215]

Figure 18:
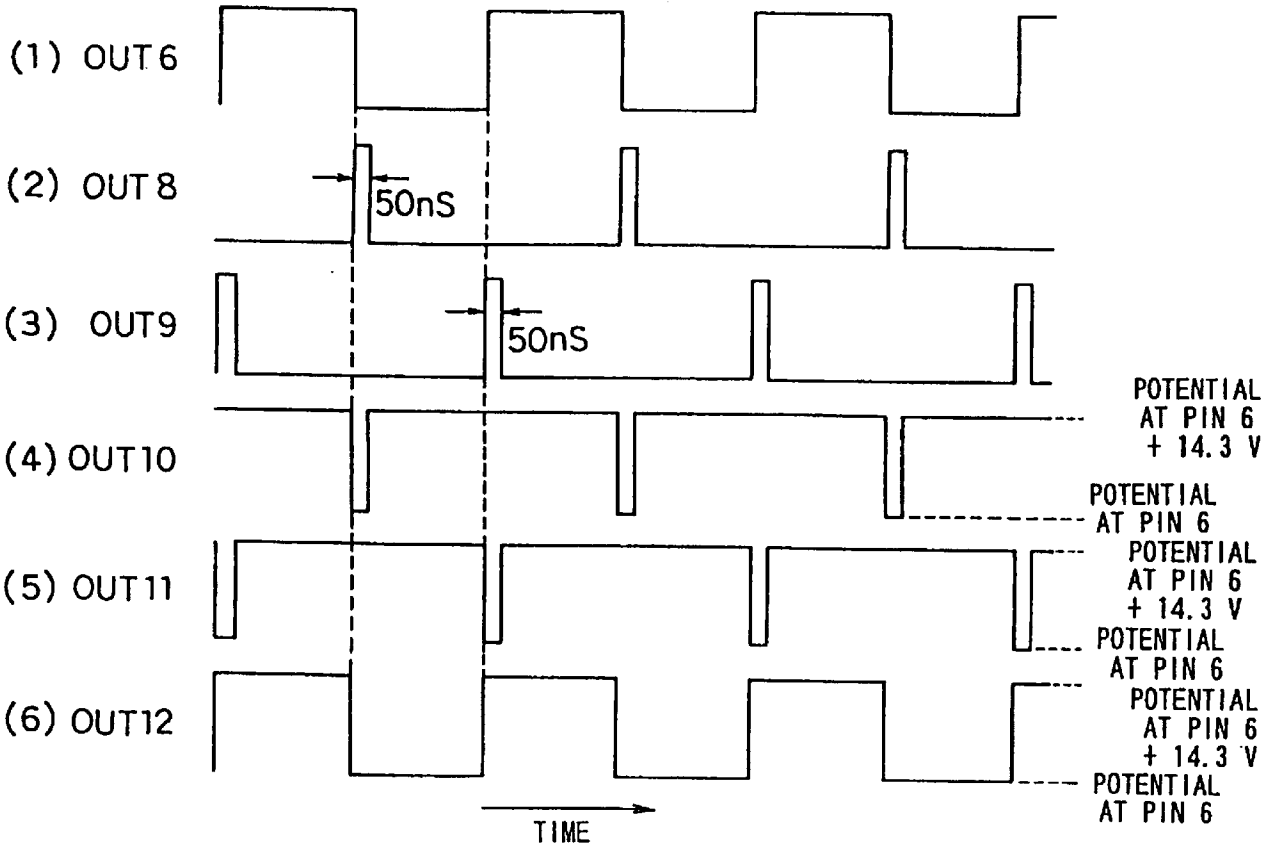
FIG. 18 is a waveform diagram showing the signal states in the semiconductor integrated circuit 21 of Embodiment 1.

A narrow pulse generation circuit 215 is a circuit wherein when the output signal (OUT6) of the high-voltage-side dead time generation circuit 216 is input, a pulse signal having a narrow pulse width is formed in response to the rising and falling of the output signal (OUT6). FIG. 18 shows an example of the output signal from each circuit.

In FIG. 18, a part (1) shows the output signal of the high-voltage-side dead time generation circuit 216, and a part (2) shows a pulse signal having a width of about 50 ns formed by the narrow pulse generation circuit 215 in response to the falling of the output signal (OUT6). A part of FIG. 18 shows a pulse signal having a width of about 50 ns formed by the narrow pulse generation circuit 215 in response to the rising of the output signal (OUT6) of the high-voltage-side dead time generation circuit 216.

[Level shift circuit 218]

A level shift circuit 218 is a circuit wherein the signals (OUT8 and OUT9) from the narrow pulse generation circuit 215 are converted into the signals (OUT10 and OUT11) of the high-voltage circuit by the 15 V power source (the terminal voltage as the pin terminal No. 1 of the semiconductor integrated circuit 21 shown in FIG. 9). Parts (4) and (5) of FIGS. 18 show the output signals (OUT10 and OUT11) from the level shift circuit 218. The signal (OUT10) of the part (4) of FIG. 18 is formed by the signal (OUT8) shown in the part (2) from the narrow pulse generation circuit 215. The signal (OUT11) shown in the part (5) of FIG. 18 is formed by the signal (OUT9) shown in the part (3) from the narrow pulse generation circuit 215.

The signals (OUT10 and OUT11) from the level shift circuit 218 are input to the high-voltage circuit, that is, a high-voltage circuit 234 comprising a high-voltage-side pulse reproduction circuit 219, a high-voltage-side output circuit 230 and the high-voltage-side under-voltage lockout circuit (high-voltage-side UVLO) 231. The minimum potential thereof is determined when the pulse signal shown in the above-mentioned part (4) of FIG. 7 is applied from the terminal of the pin terminal No. 6. On the other hand, the maximum potential (power source voltage) of the high-voltage-side pulse reproduction circuit 219, the high-voltage-side output circuit 230 and the high-voltage-side under-voltage lockout circuit (high-voltage-side UVLO) 231 and the level shift circuit 218 is applied from the terminal of the pin terminal No. 8. The terminal voltage at the pin terminal No. 8 is set at a voltage about 14.3 V higher than the terminal voltage at the pin terminal No. 6.

Figure 19:
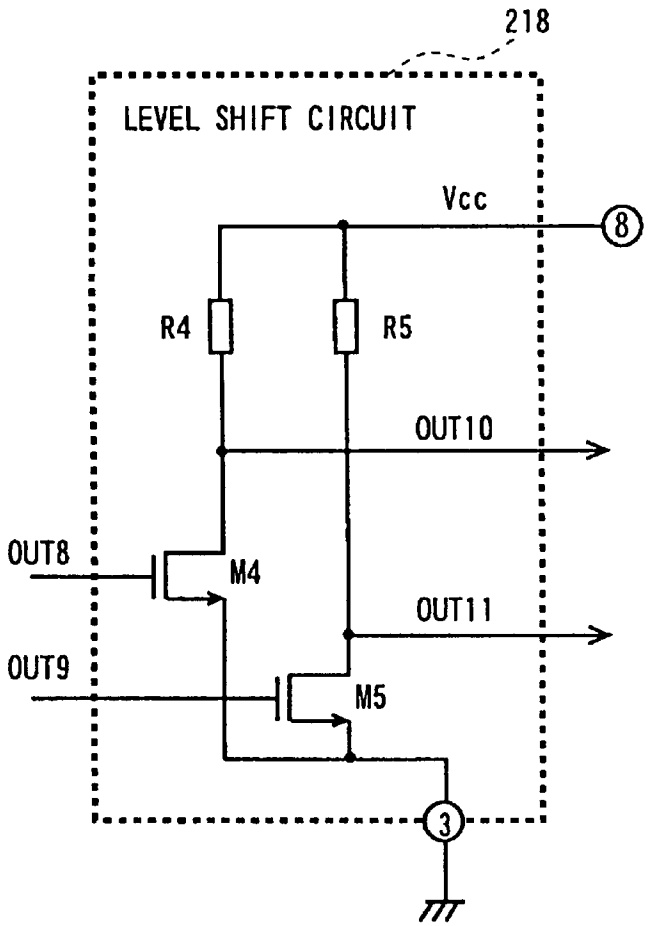
FIG. 19 is a circuit diagram showing a configuration of a level shift circuit 218 in the semiconductor integrated circuit 21 of Embodiment 1.

FIG. 19 is a circuit diagram showing the configuration of the level shift circuit 218. The level shift circuit 218 has two N-channel MOS transistors M4 and M5. The signal OUT8 is input to the gate of one of the N-channel MOS transistor, M4, and the signal OUT9 is input to the gate of the other N-channel MOS transistor M5. Although the sources of the N-channel MOS transistors M4 and M5 of Embodiment 1 are configured so as to be grounded, it may be possible to use a source follower configuration wherein a resistor is inserted between the source and GND to limit current.

In the level shift circuit 218, resistors R4 and R5 are inserted between each of the drains of the N-channel MOS transistors M4 and M5 and the terminal of the pin terminal No. 8, respectively. The signals from the drains of the MOS transistors M4 and M5 are output as OUT10 and OUT11. When the terminal of the pin terminal No. 8 is 14.3 V at the time when the terminal voltage at the pin terminal No. 6 is 0 V, or when the terminal of the pin terminal No. 8 is 155.3 V at the time when the terminal voltage at the pin terminal No. 6 is 141 V, and when the gates of the MOS transistors M4 and M5 become the H level (15 V), the resistor R4 and the resistor R5 are set at desired values so that the drain voltages of the MOS transistors M4 and M5 can activate the high-voltage-side pulse reproduction circuit 219 of the next stage.

When the terminal of the pin terminal No. 8 is 155.3 V, and when the gates of the MOS transistors M4 and M5 become the H level, the drain currents of the MOS transistors M4 and M5 increase. Therefore, the drain voltages lower significantly. If the current capacities of the MOS transistors M4 and M5 vary on the high side at this time, the voltages lower to nearly 0 V. When a voltage significantly lower than the terminal voltage (141 V) at the pin terminal No. 6, the minimum voltage of the high-voltage-side pulse reproduction circuit 219, is applied to the input terminal of the high-voltage-side pulse reproduction circuit 219 as described above, a large negative voltage is applied to the input circuit of the high-voltage-side pulse reproduction circuit 219. Therefore, in Embodiment 1, as shown in the above-mentioned FIG. 9, zener diodes Z2 and Z3 are inserted between the drain of the MOS transistor M4 and the terminal of the pin terminal No. 6. Furthermore, zener diodes Z4 and Z5 are inserted between the drain of the MOS transistor M5 and the terminal of the pin terminal No. 6. It is desired that the inserted zener diodes Z2, Z3, Z4 and Z5 have large current capacities in the forward direction, and that the zener diodes, wherein the zener voltage for the two (zener voltage×2) is higher than the voltage between the pin terminal No. 8 and the pin terminal No. 6 so that when the gate levels of the MOS transistors M4 and M5 become the L level, the drain voltage can rise to the voltage at the pin terminal No. 8 of the semiconductor integrated circuit 21 of FIG. 9, are selected.

[High-voltage-side pulse reproduction circuit 219]

The high-voltage-side pulse reproduction circuit 219 is a circuit wherein a pulse signal (OUT12) having the same timing as that of the output signal (OUT6) of the high-voltage-side dead time generation circuit 216 is reproduced from the signals (OUT10 and OUT11) from the level shift circuit 218. However, the pulse signal (OUT12) generated by the light-voltage-side pulse reproduction circuit 219 differs from the output signal (OUT6) of the high-voltage-side dead time generation circuit 216 in the potential thereof.

The object of the series of operations in the range from the narrow pulse generation circuit 215 to the high-voltage-side pulse reproduction circuit 219 is to reduce a time-average current flowing through the level shift circuit 218 to which a high voltage is applied, thereby to reduce power consumption.

In the high-voltage-side output circuit 230, the output current at the terminal of the pin terminal No. 7 is increased, and in a low-voltage-side output circuit 233, the output current at the terminal of the pin terminal No. 4 is increased.

A 16 V zener diode is connected between the terminal (Vcc) of the pin terminal No. 1 and the terminal of the pin terminal No. 3 (GND), and its purpose is to prevent a voltage of 16 V or more from applying to the terminal of the pin terminal No. 1. When the terminal voltage at the terminal of pin terminal No. 1 is used as 16 V, the zener diode Z1 of the drive-signal generation circuit 20 of FIG. 2 can be eliminated. Instead of the zener diode Z1, the pin terminal No. 1 can be used, whereby the number of components can be reduced.

As described above, in the fluorescent lamp lighting apparatus of Embodiment 1 in accordance with the present invention, the power source circuit portion 3 thereof comprises the DC-voltage generation circuit 10, the drive-signal generation circuit 20 an the drive control circuit 30. Therefore, the power source circuit portion of the fluorescent lamp lighting apparatus of Embodiment 1 has a significantly smaller mounting area and is made lighter than that of the conventional bulb-type fluorescent lamp. For this reason, the bulb-type fluorescent lamp, that is, Embodiment 1 of the fluorescent lamp lighting apparatus in accordance with the present invention, can be used in place with incandescent lamps used at various locations as lighting fixtures, without limitations in size and weight, whereby the present invention can provide a lighting fixture that can be used at various locations and can require less power consumption.

The fluorescent lamp lighting apparatus of Embodiment 1 in accordance with the present invention eliminates the need for a transformer coil that has been used for the conventional bulb-type fluorescent lamp. Therefore, the mounting space for the power source circuit portion can be reduced significantly, and the fluorescent lamp lighting apparatus can be made smaller significantly.

As described above, the fluorescent lamp lighting apparatus of Embodiment 1 in accordance with the present invention comprises fewer number of components by using the semiconductor integrated circuit. Therefore, the device is excellent in the rising characteristic, takes shorter time from power on to lighting, thereby having an effect of becoming bright instantaneously.

The fluorescent lamp lighting apparatus of Embodiment 1 in accordance with the present invention is configured so as to be highly resistant against power source fluctuation. In the fluorescent lamp lighting apparatus of Embodiment 1, the power source is connected only to the resistor (R2) and the drain of the power MOS transistor (M1), whereby when the resistor (R2) is small to a certain extent, the zener diode Z1 and the capacitor C1 operate stably. Therefore, no fluctuation occurs at the terminal voltage (Vcc) at the pin terminal No. 1 of the semiconductor integrated circuit. Although the power source voltage in the above-mentioned Embodiment 1 is 14 V, even in the case where the power source voltage is 100 V AC, it is obvious that the configuration is also highly resistivity against power source fluctuation.

EMBODIMENT 2

Embodiment 2, an embodiment of a fluorescent lamp lighting apparatus in accordance with the present invention, will be described below referring to the accompanying drawings. Embodiment 2 is configured so that the temperature characteristic of the timer circuit 212 in the bulb-type fluorescent lamp of the above-mentioned Embodiment 1 can be changed. Therefore, the configuration of the bulb-type fluorescent lamp of Embodiment 2 is substantially the same as that of the above-mentioned Embodiment 1 except for the timer circuit; thus, the descriptions and numeral codes of Embodiment 1 are also applied to the configurations other than the timer circuit, and their descriptions are omitted.

In a generally-used bulb-type fluorescent lamp, the preheating time for the filaments 51 and 52 is required to be made longer as the outside-air temperature lowers. In the bulb-type fluorescent lamp of Embodiment 2, the separate-excitation time becomes longer as the temperature lowers in order to extend the preheating time for the filaments 51 and 52.

Figure 20:
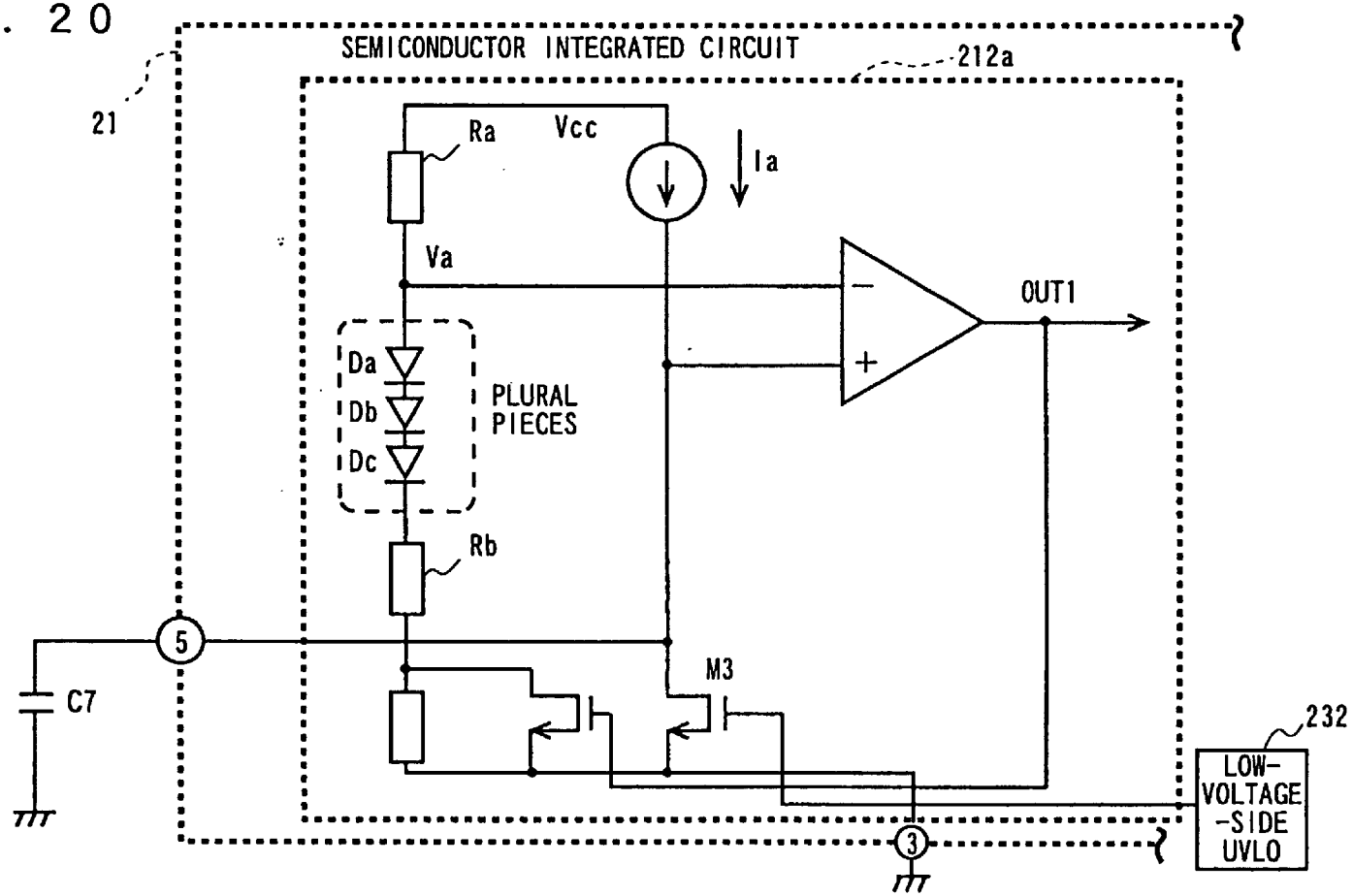
FIG. 20 is a circuit diagram showing a configuration of a timer circuit of a semiconductor integrated circuit in a bulb-type fluorescent lamp of Embodiment 2 in accordance with the present invention.

FIG. 20 is a circuit diagram showing the configuration of the timer circuit of the semiconductor integrated circuit in the bulb-type fluorescent lamp of Embodiment 2.

The timer circuit 212a of Embodiment 2 is a circuit for setting the time of switching from the separate-excitation mode to the self-excitation mode after power is on, just as in the case of the above-mentioned Embodiment 1. At the time of power on, the voltage across the terminals of the capacitor C7 is initialized to 0 V by the MOS transistor M3 of the timer circuit 212a. When the lockout is released at the low-voltage-side under-voltage lockout circuit 232, the capacitor C7 is charged with a constant current 1a. When the voltage across the terminals of the capacitor C7 reaches a predetermined setting voltage Va, the output (OUT1) of the timer circuit 212a is switched from the L level (LOW) to the H level (HIGH).

As shown in FIG. 20, in the timer circuit 212a in Embodiment 2, a plurality (3 pieces in Embodiment 2) of diodes, Da, Db and Dc, are connected in series between resistors Ra and Rb for determining the setting voltage Va. The voltage across the terminals of the diodes usually has a characteristic of becoming larger at low temperature. Therefore, in the timer circuit 212a of Embodiment 2, the setting voltage Va becomes higher at low temperature, whereby the separate-excitation time becomes longer.

The timer circuit 212a of Example 2 uses the plural diodes Da, Db and Dc to form the setting voltage Va, whereby the fluctuation in the setting voltage Va depending on the power source voltage fluctuation of the semiconductor integrated circuit can be reduced. As a result, the fluctuation in the timer time set by the timer circuit 212a can also be suppressed small. However, in this case, it is affected by the fluctuation portion of the constant current Ia; therefore,, the above is applicable when the fluctuation in this portion has been suppressed sufficiently.

As the insertion points of the diodes Da, Db and Dc, when the constant current Ia increases at low temperature, the plural diodes are connected in series between the resistors Ra and Rb for determining the setting voltage Va as described above, whereby the fluctuation in the timer time because of the fluctuation in the temperature characteristic of the constant current Ia can be canceled.

On the other hand, when the constant current Ia decreases at low temperature, a countermeasure can be taken by connecting plural diodes in series between the power source side with respect to the setting voltage Va and the resistor Ra.

The setting voltage of the timer circuit 212a of Embodiment 2 is provided with hysteresis between the value at the time when the voltage across the terminals of the capacitor C7 rises and the value at the time when the voltage lowers, thereby being set to have different voltages.

EMBODIMENT 3

Embodiment 3, an embodiment of a fluorescent lamp lighting apparatus in accordance with the present invention, will be described below referring to the accompanying drawings. Embodiment 3 is obtained by changing the method of frequency sweeping in the separate-excitation oscillator 211 in the bulb-type fluorescent lamp of the above-mentioned Embodiment 1. Therefore, the configuration of the bulb-type fluorescent lamp, an example of the fluorescent lamp lighting apparatus of Embodiment 3, is substantially the same as that of the bulb-type fluorescent lamp of the above-mentioned Embodiment 1; thus, the descriptions of the bulb-type fluorescent lamp of Embodiment 1 are also applied, and the same numeral codes are used in the following description.

Figure 21:
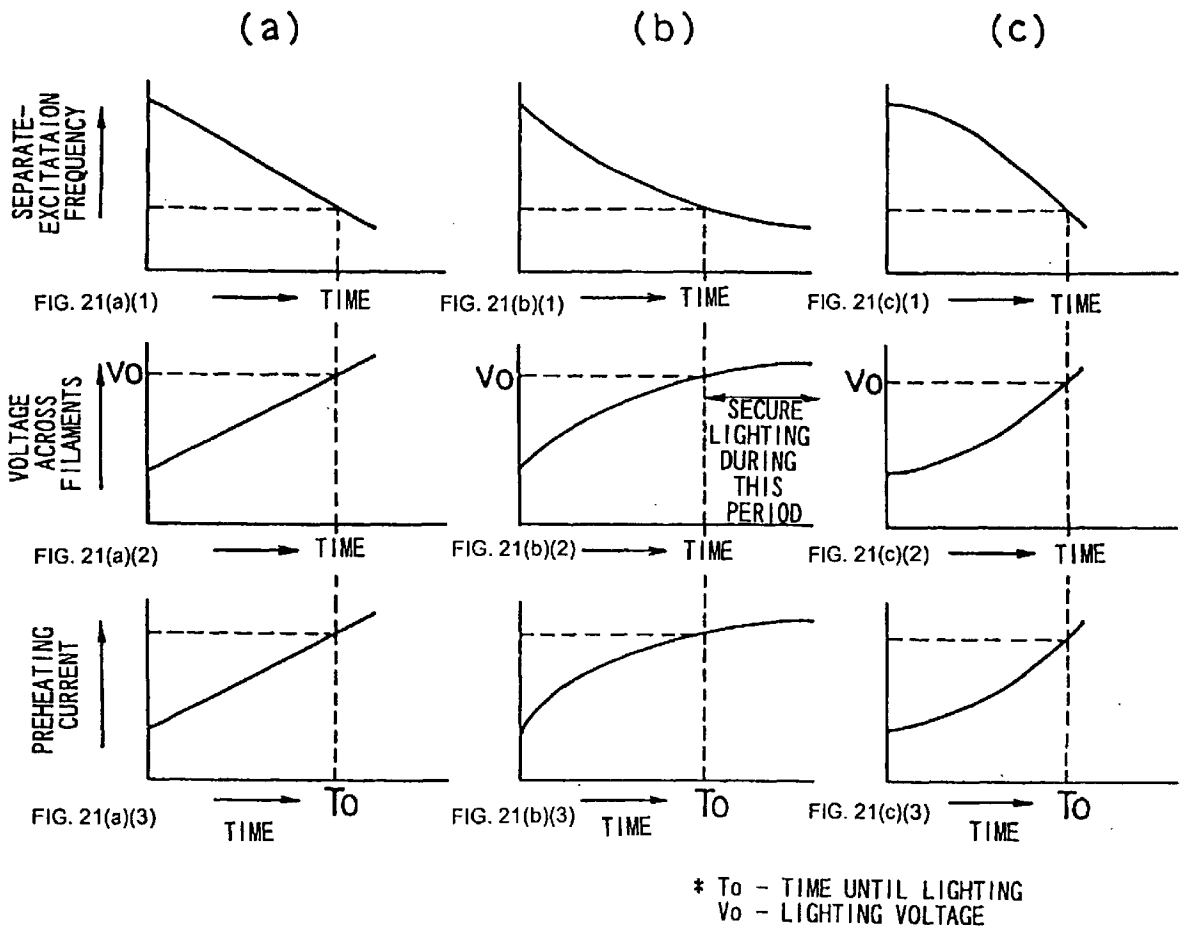
FIG. 21 is a view for illustrating methods of sweeping a frequency in a separate-excitation oscillator 211 of Embodiment 3 in accordance with the present invention.

FIG. 21 is a view for illustrating methods of sweeping the frequency in the separate-excitation oscillator 21 of Embodiment 3. The upper graph of a part (a) in FIG. 21 shows a case wherein the frequency of the separate-excitation oscillator 211 is lowered linearly with the passage of time, and illustrates a method of sweeping the frequency of the separate-excitation oscillator 211 of the above-mentioned Embodiment 1. The middle graph of the part (a) in FIG. 21 shows the progress of the voltage across the filaments at the time when sweeping is carried out as shown in the upper graph of the part (a) in FIG. 21, and the lower graph of the part (a) in FIG. 21 shows the increasing state of the preheating current of the filaments.

The upper graph of a part of FIG. 21 shows a case wherein the frequency of the separate-excitation oscillator 211 is lowered gradually so that the frequency curve with respect to time becomes concave downward. The middle graph of the part in FIG. 21 shows the progress of the voltage across the filaments when sweeping is carried out as shown in the upper graph of the upper part (b). By sweeping the frequency as shown by the curve of the upper graph of the part (b) in FIG. 21, the preheating current of the filaments increases as shown in the lower graph of the part in FIG. 21, and lighting can be carried out securely within the sealing time in the separate-excitation mode. And the lighting time can be shortened.

The preheating current until the time of lighting can be increased in the case where the changing width of the frequency is decreased as the frequency becomes lower with the passage of time as shown in the part (b) of FIG. 21 in comparison with the case when the frequency in the separate-excitation mode is swept at a constant ratio as shown in the part (a) of FIG. 21. Furthermore, since the voltage across the filaments can be maintained for a longer time in the period while the voltage is high, the light-emitting tube can be lit securely.

A part (a) of FIG. 22 is an example of a circuit configuration of the bulb-type fluorescent lamp of Embodiment 3 wherein the frequency is swept as shown in part (b) of FIG. 21 (b). As shown in the part (a) of FIG. 22, a resistor R is provided between the terminal of the pin terminal No. 5 of the semiconductor integrated circuit 21 and the power source. With this configuration, the rising of the terminal voltage at the pin terminal No. 5 to which the timer circuit 212 is connected is delayed with the passage of time. And the sweep of the frequency of the separate-excitation oscillator 211 is delayed with the passage of time.

Next, another sweeping method in the separate-excitation mode will be described. This example is a configuration wherein a preheating current is flown securely for a long time at a filament voltage not lighting the light-emitting tube so that the lighting time from the power on to lighting is almost unchanged and substantially constant. A method of sweeping the frequency in the sequence-excitation mode in this example is shown in a part (c) of FIG. 21.

The upper graph of the part (c) of FIG. 21 shows a case wherein the frequency of the separate-excitation oscillator 211 is lowered gradually so that the frequency curve with respect to time becomes convex upward. The middle graph of the part (c) in FIG. 21 shows the progress of the voltage across the filaments when the frequency curve is set as shown in the upper graph of the part (c). By sweeping the frequency as shown in the upper graph of the part (c) in FIG. 21, the preheating current of the filaments is suppressed low as shown in the lower graph of the part (c) in FIG. 21 until the lighting time To so that lighting does not occur within the preset lighting time. By sweeping the frequency as described above, the change in the lighting time from power on to lighting is suppressed.

A part (b) of FIG. 22 is an example of a circuit configuration ration of the bulb-type fluorescent lamp wherein the frequency is swept as shown in the part (c) of FIG. 21. In the circuit shown in the part (b) of FIG. 22, a resistor R is provided between the terminal of the pin terminal No. 5 for the timer circuit 212 of the semiconductor integrated circuit 21 and ground in parallel with a capacitor C7. With this configuration, the rising of the terminal voltage at the pin terminal No. 5 is hastened with the passage of time. As a result, the rising is hastened with the passage of time, and the sweep of the frequency of the separate-excitation oscillator is hastened.

Figure 23:
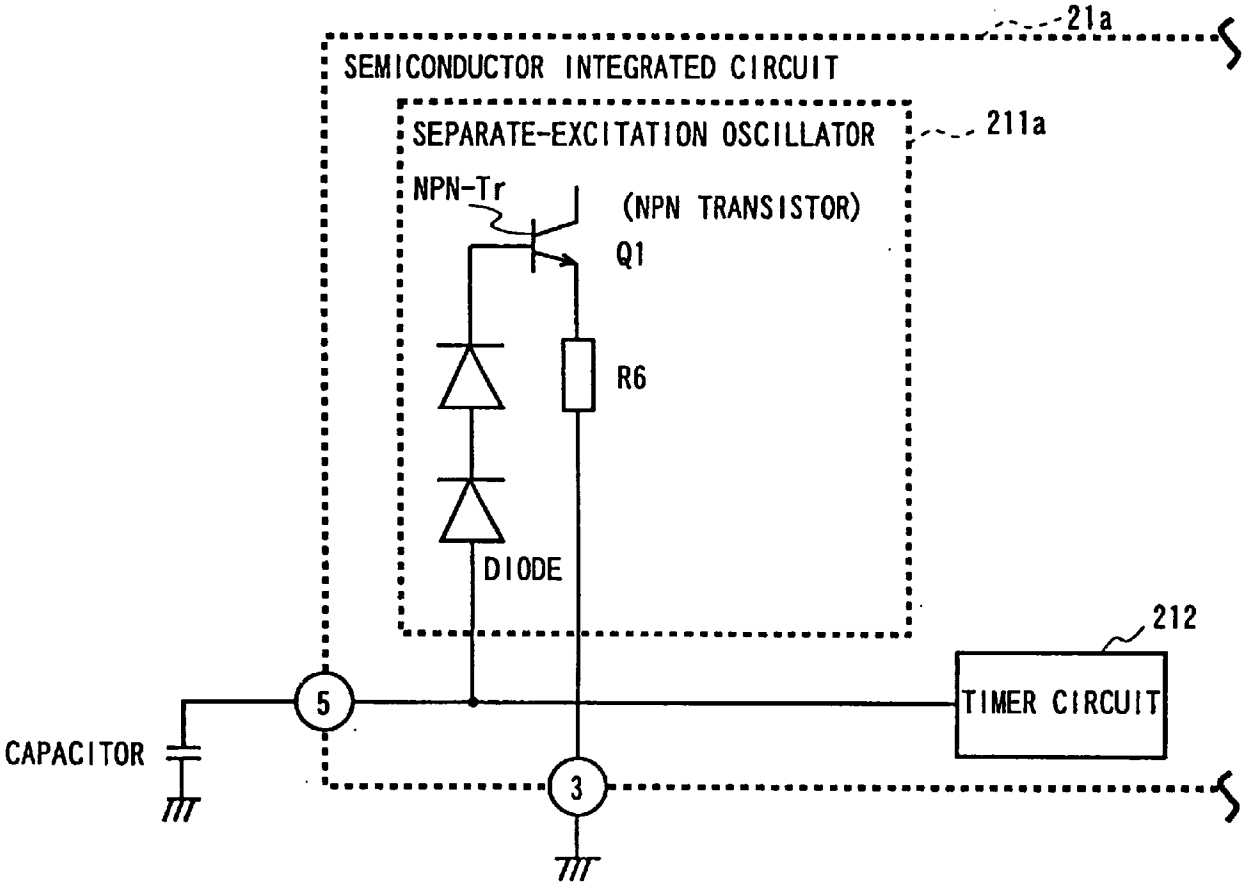
FIG. 23 is a circuit diagram showing a concrete configuration for sweeping frequency in the bulb-type fluorescent lamp of Embodiment 3.
Figure 24:
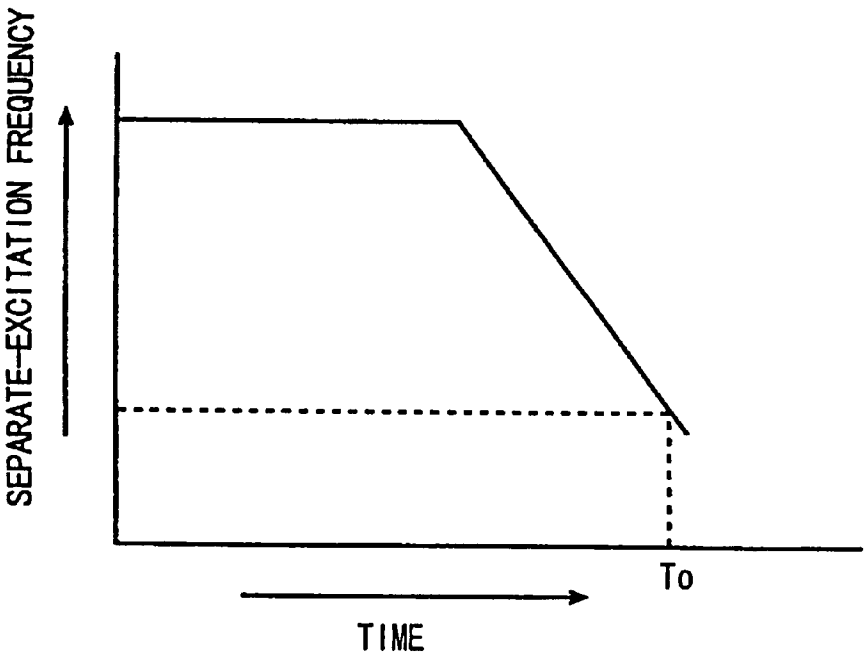
FIG. 24 is a frequency curve showing method of sweeping a frequency in a separate-excitation mode in the bulb-type fluorescent lamp of Embodiment 3.

Next, still another sweeping method in the separate-excitation mode will be described. This example is shown by a concrete circuit configuration in FIG. 23. FIG. 24 is a frequency curve showing a method of sweeping the frequency in the separate-excitation mode. As shown in FIG. 23, in the bulb-type fluorescent lamp of this example, plural diodes are provided between the timer terminal of the pin terminal No. 5 of a semiconductor integrated circuit 21a and the base of the NPN transistor Q1 of the separate-excitation oscillator 211.

In the bulb-type fluorescent lamp having the semiconductor integrated circuit 21a shown in FIG. 23, the frequency is changed as shown in FIG. 24, whereby a preheating current is flown at such a voltage across the filaments as not causing lighting for a constant period after power on. Then, a low constant frequency is output linearly. This low frequency is set at the resonance frequency of the resonance circuit in the drive control circuit. With this configuration, the preheating current can be securely flown through the filaments. FIG. 24 shows an example wherein the frequency is reduced linearly; however, it may be possible to use a configuration wherein the frequency is reduced in a curve as shown in the above-mentioned parts (b) and (c) of FIG. 21.

EMBODIMENT 4

Figure 25:
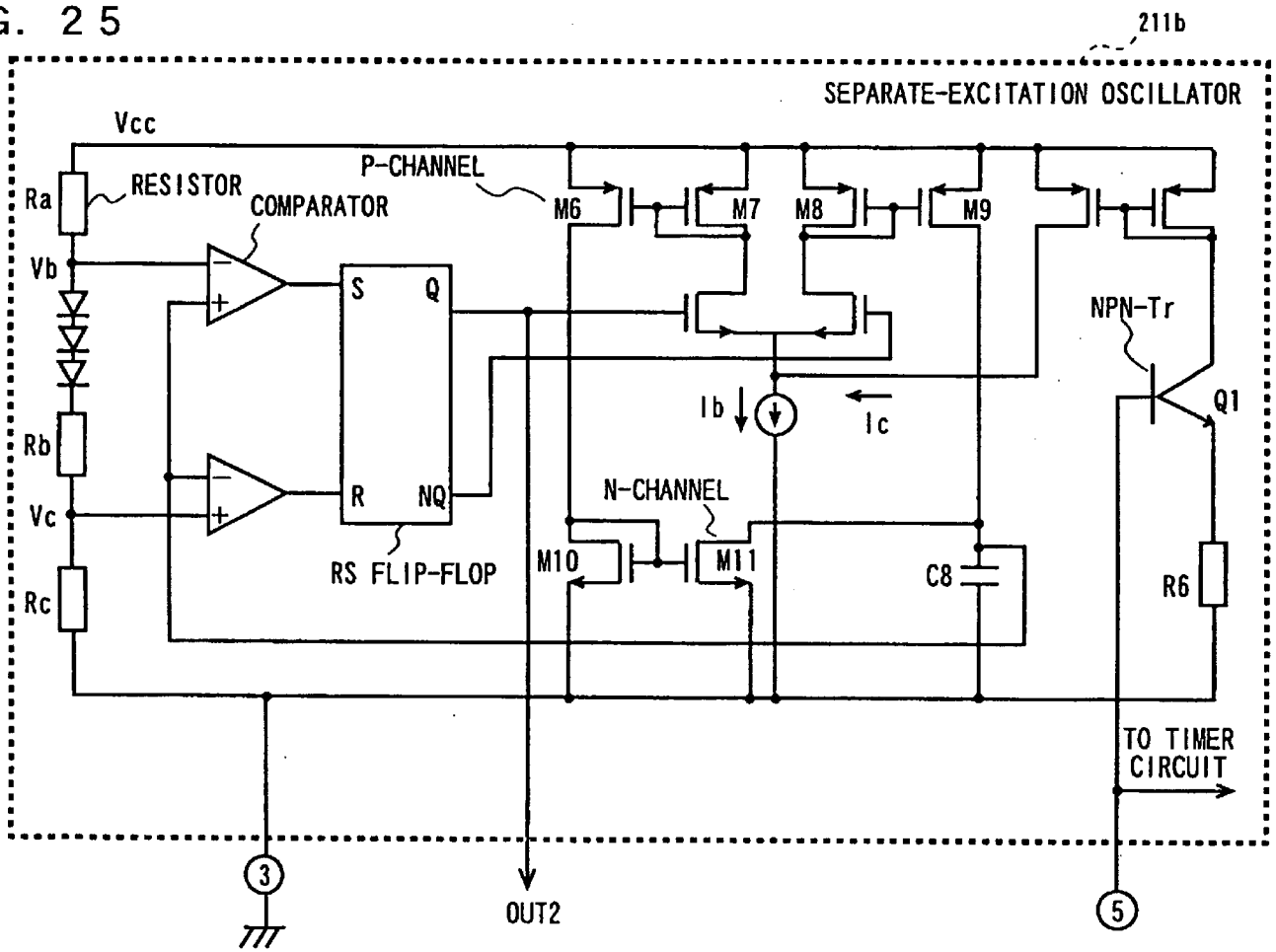
FIG. 25 is a circuit diagram showing a configuration of a separate-excitation oscillator 211b of Embodiment 4 in accordance with the present invention.

Embodiment 4, an embodiment of a fluorescent lamp lighting apparatus in accordance with the present invention, will be described below referring to the accompanying drawings. Embodiment 4 is configured so that the setting of the temperature characteristic of the frequency in the separate-excitation mode of the separate-excitation oscillator 211 in the bulb-type fluorescent lamp of the above-mentioned Example 1 can be changed. The separate-excitation oscillator of Embodiment 4 is used to set the temperature characteristic of the frequency in the separate-excitation mode at a proper condition, thereby to configure a fluorescent lamp lighting apparatus capable of securely carrying out lighting regardless of ambient temperature. FIG. 25 shows the configuration of a separate-excitation oscillator 211b of Embodiment 4, and the other configurations are the same as those of the separate-excitation oscillator (FIG. 12) of the above-mentioned Embodiment 1; therefore, these descriptions are omitted.

As shown in FIG. 25, in the separate-excitation oscillator 211b, diodes are connected in series with a resistor Rb and provided between a point at which an upper reference voltage Vb is specified and a point at which a lower reference voltage Vc is specified. By providing the diodes in this way, the frequency to be output at low ambient temperature is shifted downward. The start frequency (lighting frequency) exerts an effect on the temperature characteristic of the constant current Ib. Furthermore, the stop frequency exerts effects on the temperature characteristics of the constant current Ib, the voltage between the base and emitter of the NPN transistor Q1 and the emitter resistor R6 (see FIG. 12) of the NPN transistor Q1. However, basically, by using the configuration wherein the diodes are inserted between the point at which the upper reference voltage Vb is specified and the point at which the lower reference voltage Vc is specified, the output frequency is shifted downward at low ambient temperature. With this configuration, in the separate-excitation oscillator 211b of Embodiment 4, the fluctuation in the voltage [Vb−Vc] becomes small with respect to the fluctuation in the power source voltage of the semiconductor integrated circuit 21, whereby the fluctuation in the output frequency becomes small.

On the other hand, when the frequency is shifted upward at low temperature, the diodes are connected between the point at which the lower reference voltage Vc is specified and ground, or between the power source and the point at which the upper reference voltage Vb is specified.

With the above-mentioned configuration, in the separate-excitation oscillator in the bulb-type fluorescent lamp, the temperature characteristic of the frequency in the separate-excitation mode can be adjusted to a desired proper condition.

EMBODIMENT 5

Embodiment 5, an embodiment of a fluorescent lamp lighting apparatus in accordance with the present invention, will be described below referring to the accompanying drawings. A bulb-type fluorescent lamp in accordance with Embodiment 5 is configured so that when fluorescent lamp lighting in the separate-excitation mode ended in failure, the voltage applied across the filaments of the fluorescent lamp in the self-excitation mode is made larger to facilitate lighting in a short time. Furthermore, the bulb-type fluorescent lamp of Embodiment 5 is configured so that the resonance frequency and the power configuration in the self-excitation mode can be adjusted. Since the configuration of the bulb-type fluorescent lamp, an example of the fluorescent lamp lighting apparatus of Embodiment 5, is substantially the same as the that of the bulb-type fluorescent lamp of the above-mentioned Embodiment 1 except for the separate-excitation oscillator, the descriptions of the bulb-type fluorescent lamp of Embodiment 1 are also applied, and the same numeral codes are used in the following descriptions.

[Phase setting of feedback loop in self-excitation mode]

In the self-excitation mode, the filament voltage of the light-emitting tube is input from the high-voltage-side terminal (the terminal opposite to ground) of the terminals of the coil L1 to the terminal (IN terminal) of the pin terminal No. 2 of the semiconductor integrated circuit 21 via the resistor R3 as shown in FIG. 2. In this way, the filament voltage is input to the drive-signal generation circuit 20 to carry out feedback control in the drive control circuit 30. The phase of the voltage across the terminals of the coil L1 advances ahead of that of the current flowing through the coil L1 by 90°. The phase of the voltage across the terminals of the coil L1 advances in the feedback loop from the terminal of the coil L1 to the source (the terminal of the pin terminal No. 6) of the power MOS transistor M1 by the amount obtained by subtracting the amount of delay in the semiconductor integrated circuit 21 (the amount of delay from the terminal of the pin terminal No. 2 to the terminal of the pin terminal No. 4, or the amount of delay from the terminal of the pin terminal No. 2 to the terminal of the pin terminal No. 7).

Figure 26:
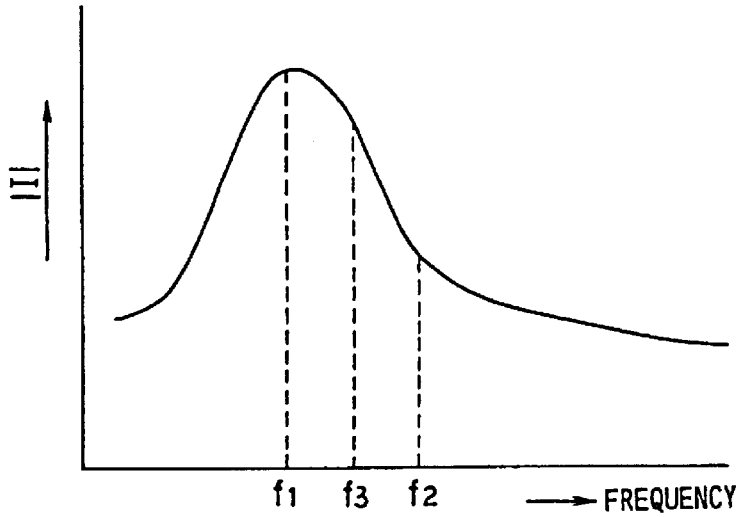
FIG. 26 is a graph showing a relationship between a resonance frequency at the time of lighting and the current |I| flowing through a resonance circuit in Embodiment 5 in accordance with the present invention.

FIG. 26 is a graph showing the relationship between the resonance frequency, which is determined by the capacitors C5, C6 and the coil L1 of the drive control circuit 30 shown in the above-mentioned FIG. 1 and the impedance of the fluorescent lamp at the time of lighting, and the current [I] flowing through the resonance circuit. In FIG. 26, the phase advances in the feedback loop from the terminal of the coil L1 to the source of the power MOS transistor M1. Therefore, stabilization is attained at a frequency f2 higher than the original resonance frequency f1 (the frequency determined by C5, C6, L1 and the impedance of the fluorescent lamp at the time of lighting). Thus, by inserting a capacitor between the terminal of the pin terminal No. 2 and ground, or by increasing the amount of delay in the semiconductor integrated circuit 21, stabilization can be attained at a frequency f3 lower than the above-mentioned frequency f2. Therefore, the current |I| can be increased at the stabilization point of this frequency f3, the voltage to be applied across the filaments can be increased, and the resonance frequency and power consumption in the self-excitation mode can be adjusted.

Figure 27:
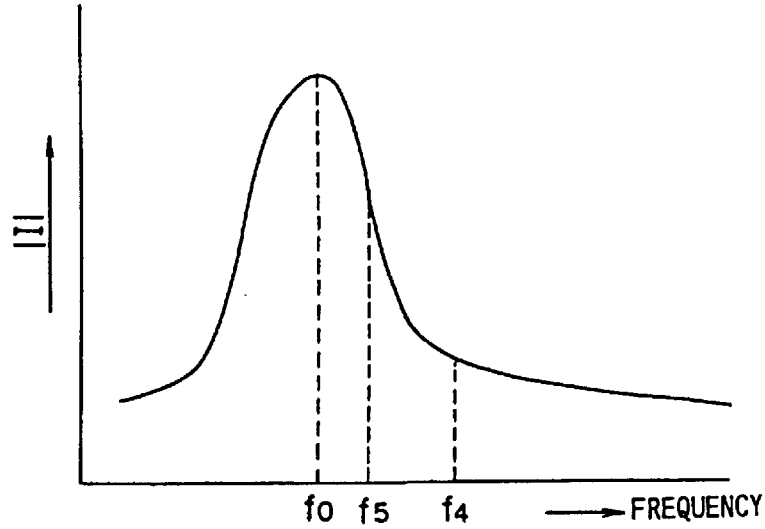
FIG. 27 is a graph showing a relationship between the resonance frequency before lighting and current |I| flowing through the resonance circuit in Embodiment 5 in accordance with the present invention.

Next, the case when lighting ended in failure in the separate-excitation mode in the bulb-type fluorescent lamp of Embodiment 5 will be described. FIG. 27 is a graph showing a frequency characteristic before lighting in the self-excitation mode in the case where lighting in the self-excitation mode ended in failure. The frequency characteristic shown in FIG. 27 shows the relationship between the resonance frequency determined by the capacitors C5, C6 and the coil L1 before lighting and the current |I| in the self-excitation mode. In FIG. 27, in the case where lighting in the separate-excitation mode ended in failure, stabilization can be attained at a frequency f4 higher than the original resonance frequency f0 (the frequency determined by C5, C6 and L1). In this case, by inserting a capacitor between the terminal of the pin terminal No. 2 and ground, or by increasing the amount of delay in the semiconductor integrated circuit 21, stabilization can be attained at a frequency f5 lower than the above-mentioned frequency f4 until lighting. By attaining stabilization at the frequency f5 with this configuration, the current |I| flowing across the filaments can be increased, and a large voltage is applied across the terminals of the filaments (across the terminals C6) until lighting. As a result, the bulb-type flowchart lamp of Embodiment 5 has a configuration wherein lighting is attained securely in a short time in the self-excitation mode.

[Phase temperature characteristic setting of feedback loop in self-excitation mode]

Next, the phase temperature characteristic setting of the feedback loop in the self-excitation mode will be described.

In a fluorescent lamp, the voltage across the filaments required for lighting becomes larger as the temperature lowers. For this reason, in preparation for the case when the lighting of the fluorescent lamp in the separate-excitation mode ends in failure, it is necessary to use a configuration wherein a larger voltage is applied across the filaments (across the terminals of C6) in the self-excitation mode as the temperature lowers.

The bulb-type fluorescent lamp of Embodiment 5 is configured so that the current |I| is increased by increasing the amount of delay in the semiconductor integrated circuit 21 as the temperature lowers, and so that a large voltage is applied across the terminals of the filaments (across the terminals of C6) until lighting is attained.

As described in the above-mentioned Embodiment 2, the voltage across the terminals of a diode is characterized to usually become larger as the temperature lowers. Therefore, by using a diode, the rate of phase advance in the feedback loop is decreased (the amount of delay in the semiconductor integrated circuit is increased) as the temperature lowers, thereby to apply a large voltage across the filaments (across the terminals of C6).

Figure 28:
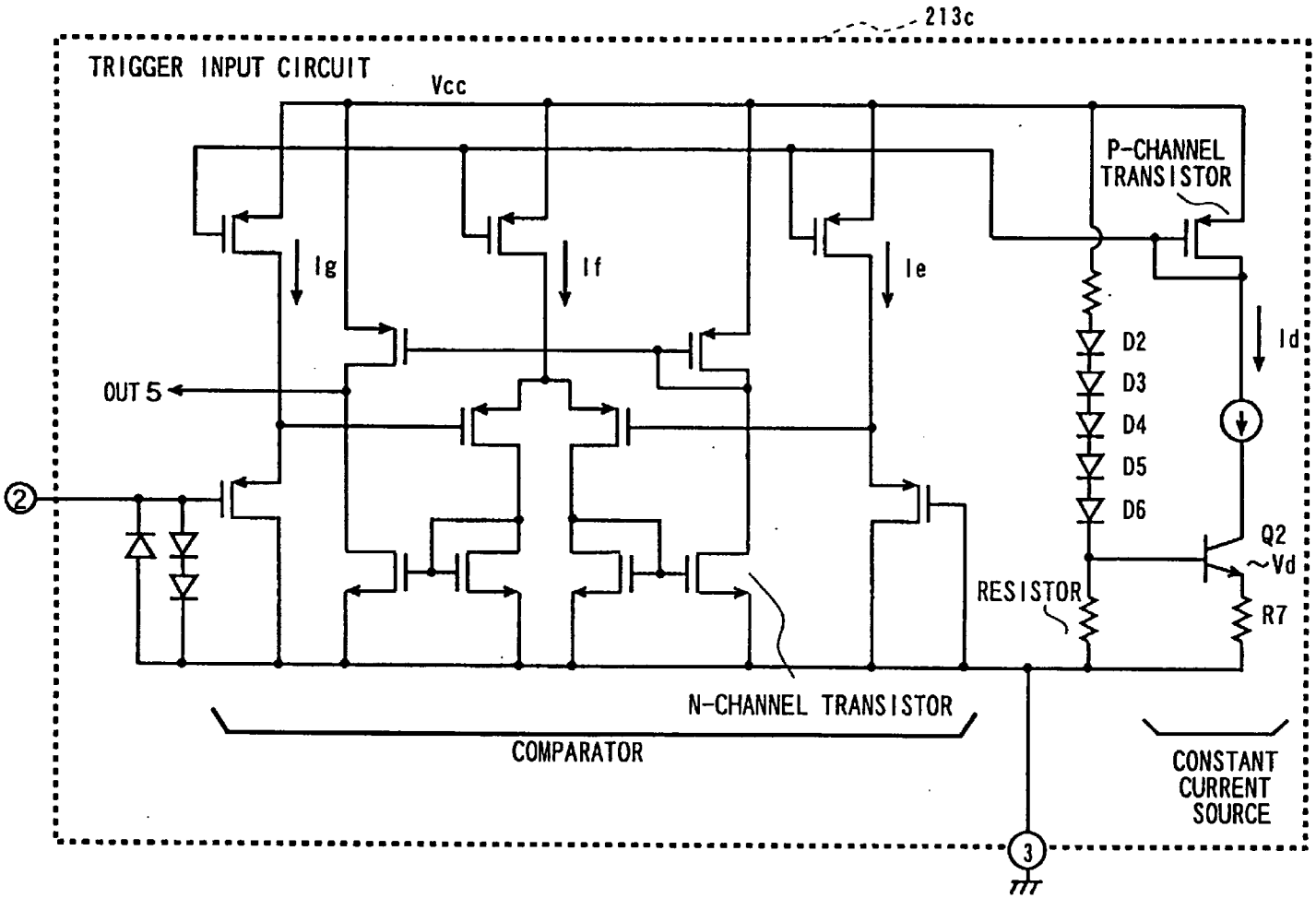
FIG. 28 is a circuit diagram of a trigger input circuit as an example wherein diodes are used to delay the operation speed of the comparator of the trigger input circuit in Embodiment 5 at low temperature.

FIG. 28 is a circuit diagram of a trigger input circuit as an example wherein diodes are used to delay the operation speed of the comparator of the trigger input circuit at low temperature. As shown in FIG. 28, by providing plural diodes to determine the base voltage of the transistor Q2, the emitter voltage Vd of the transistor Q2 is lowered at low temperature. Furthermore, by using a resistor having a small temperature characteristic coefficient (a resistor having a small resistance change ratio between normal temperature and low temperature) as the resistor R7 connected to the emitter, the current source current Id becomes smaller at low temperature.

As the current source current Id becomes smaller at low temperature, the currents Ie, If and Ig in FIG. 28 also become smaller. As a result, the bias current of the comparator in the trigger input circuit 213c is reduced, and the operation speed is lowered. Furthermore, the phase of the signal input from the terminal of the pin terminal No. 2 is more delayed than that of the output signal (OUT5) of the trigger input circuit.

Therefore, in the bulb-type fluorescent lamp of Embodiment 5, the rate of phase advance in the feedback loop is decreased as the temperature lowers, and a large voltage is applied across the filaments (across the terminals of C6), whereby lighting is securely attained in a short time in the self-excitation mode even at low temperature.

Figure 29:
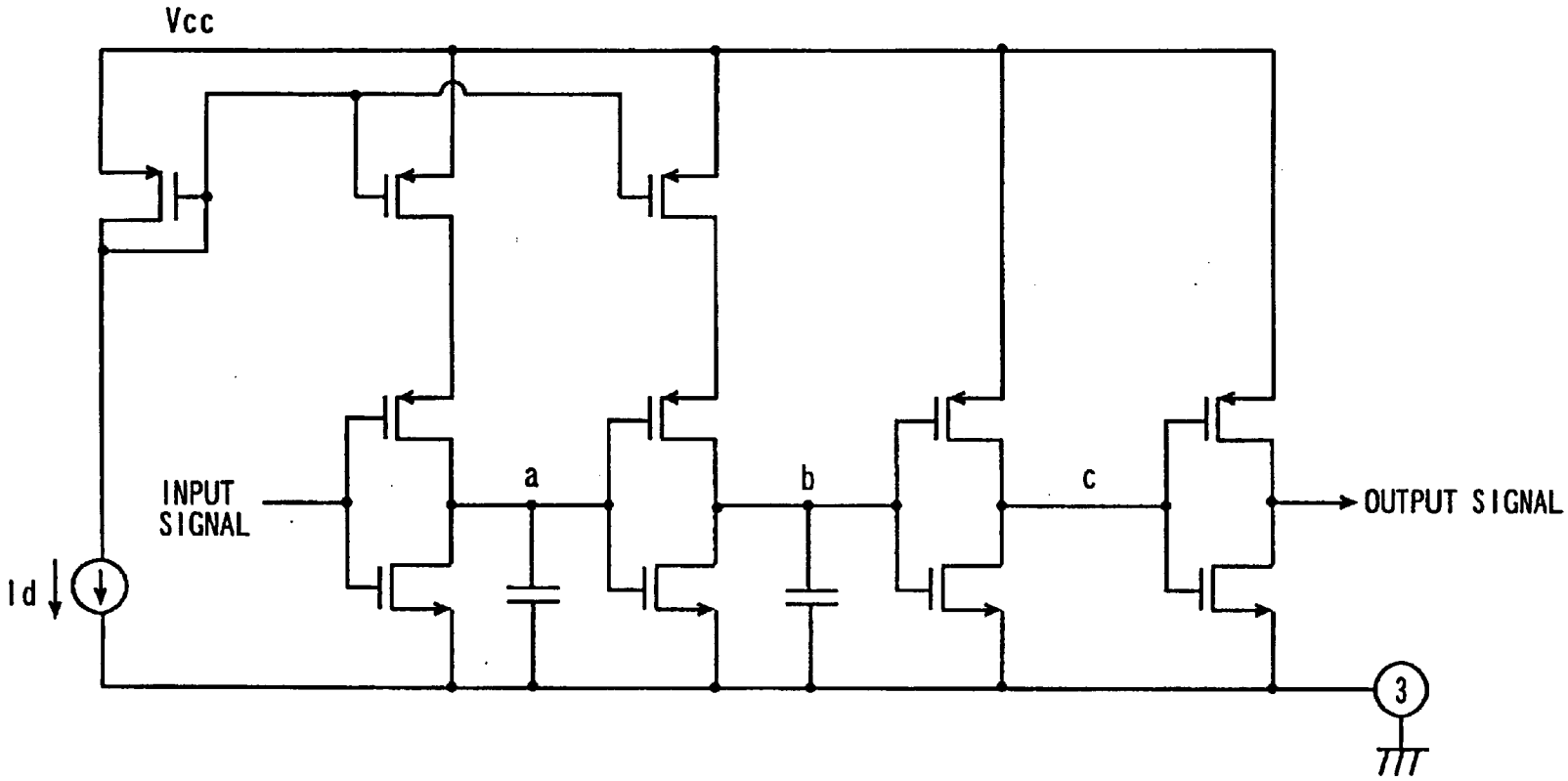
FIG. 29 is a circuit diagram showing an example of a delay circuit in Embodiment 5.
Figure 30:
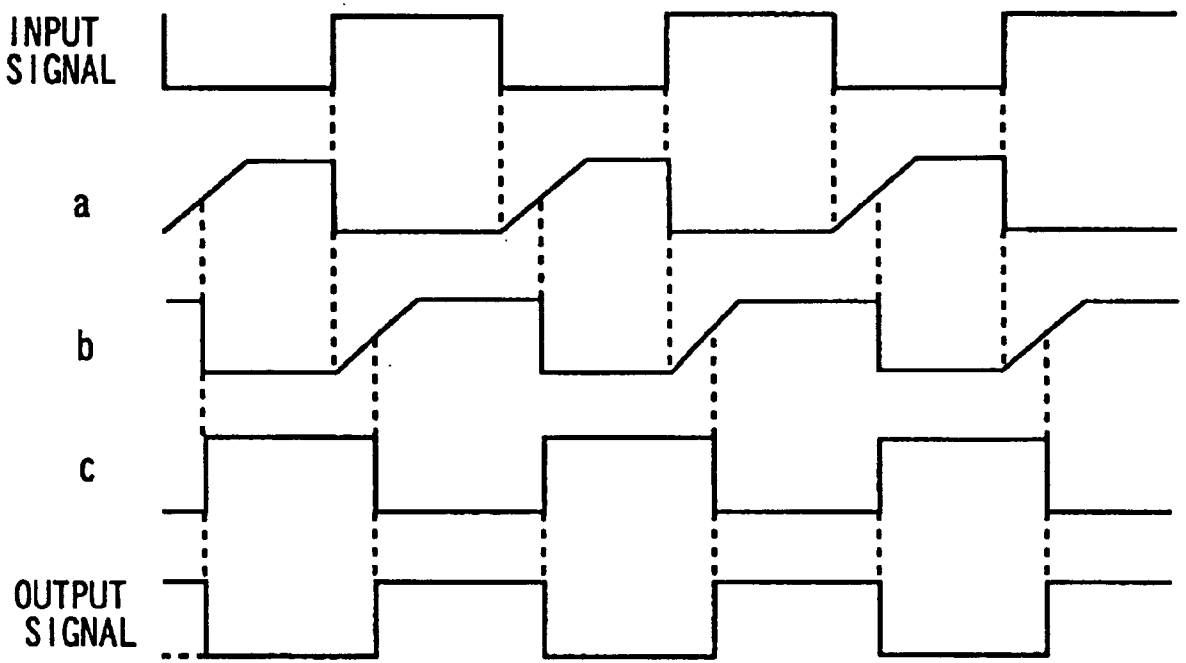
FIG. 30 is a waveform diagram showing an input signal, a signal at point a, a signal at point b, a signal at point c and an output signal in the circuit shown in FIG. 29.

FIG. 29 is a circuit diagram showing an example of a delay circuit wherein the rate of phase advance in the feedback loop is decreased as the temperature lowers. FIG. 30 is a waveform diagram showing the input signal, the signal at point a, the signal at point b, the signal at point c and the output signal in the circuit shown in FIG. 29.

By providing the delay circuit shown in FIG. 29 at the output of the trigger input circuit or the output of the separate-excitation/self-excitation selection switch circuit, the rate of phase advance in the feedback loop can be decreased as the temperature lowers.

EMBODIMENT 6

Figure 31:
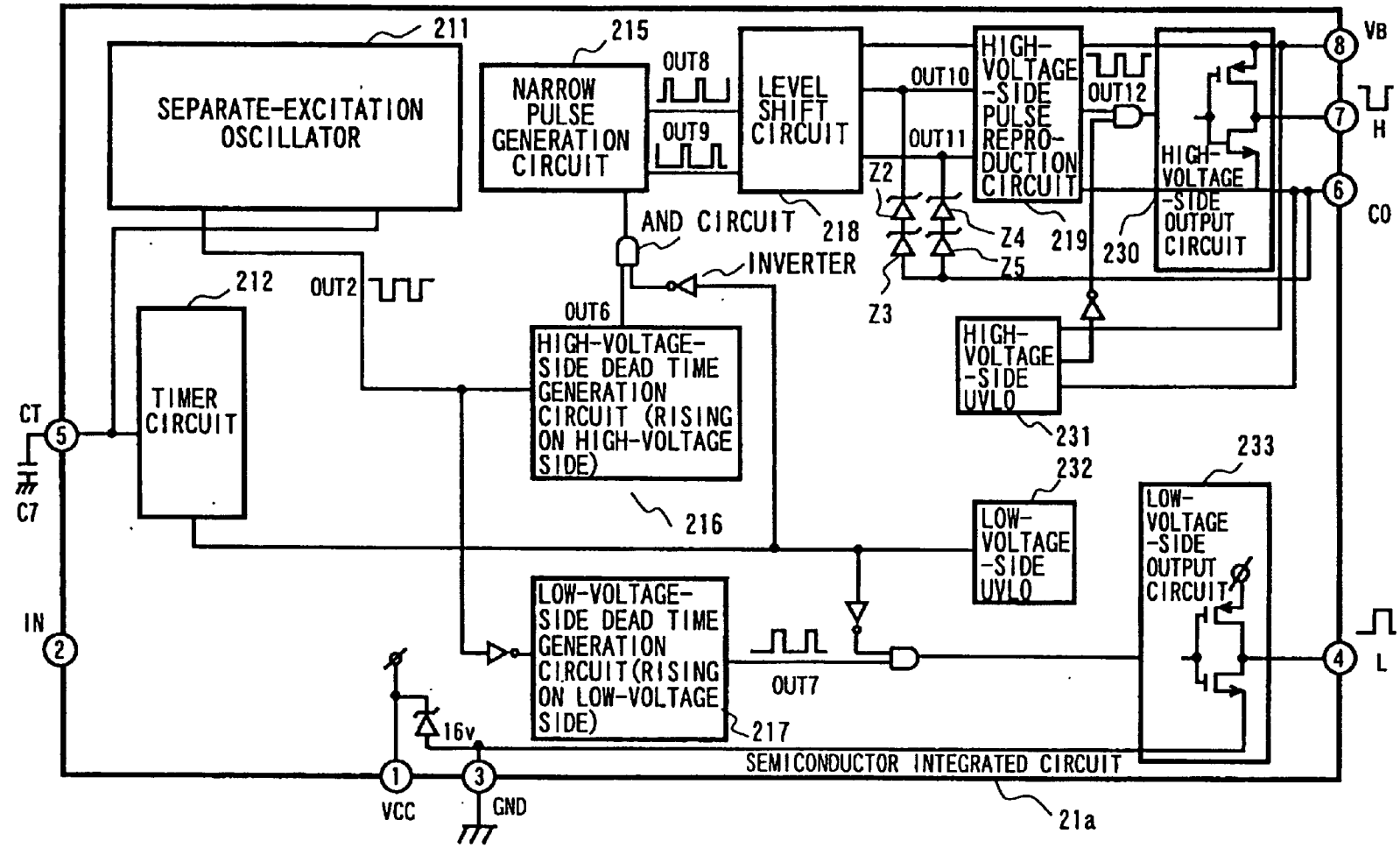
FIG. 31 is a block diagram showing a configuration of a semiconductor integrated circuit in Embodiment 6 in accordance with the present invention.

Embodiment 6, an embodiment of a fluorescent lamp lighting apparatus in accordance with the present invention, will be described below. The bulb-type fluorescent lamp of Embodiment 6 is not provided with the trigger input circuit 213 (FIG. 9) and the separate-excitation/self-excitation selection switch circuit 214 (FIG. 9) in the above-mentioned Embodiment 1. And in Embodiment 6, the output signal (OUT2) from the separate-excitation oscillator is output to the high-voltage-side dead time generation circuit and the low-voltage-side dead time generation circuit. In FIG. 31 is a block diagram showing the configuration of the semiconductor integrated circuit 21 in the bulb-type fluorescent lamp of Embodiment 6. The configuration of the bulb-type fluorescent lamp of Embodiment 6 is the same as that of bulb-type fluorescent lamp of Embodiment 1 shown in the above-mentioned FIG. 9, except that the trigger input circuit 213 and the separate-excitation/self-excitation selection switch circuit 214 are omitted. Therefore, FIG. 31 and the drawings and numeral codes used for the description of the above-mentioned Embodiment 1 are also applied in the following description.

In Embodiment 6, the resonance frequency determined by the capacitors C5, C6 and the coil L1 of the drive control circuit 30 before lighting is assumed to be f0, and the resonance frequency determined by the capacitors C5, C6 and the coil L1 of the drive control circuit 30 and the impedance across the filaments of the fluorescent lamp after lighting is assumed to be f1 (f1<f0). The relationship between the frequency and the current |I| flowing through the filaments has such a convex characteristic curve as shown in the above-mentioned FIG. 8, at the resonance frequency, the maximum current flows, and the voltage across the filaments becomes maximum.

Figure 32:
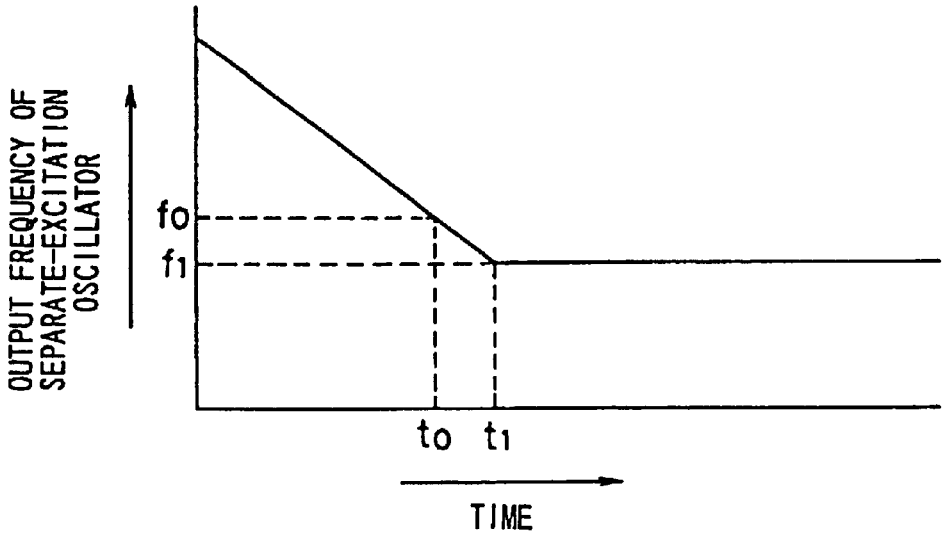
FIG. 32 is a graph showing a progress of a frequency output from a separate-excitation oscillator in Embodiment 6 in accordance with the present invention.

FIG. 32 shows the progress of the frequency output from the separate-excitation oscillator. As shown in FIG. 32, in the sweeping method in Embodiment 6, the frequency is reduced linearly to the resonance frequency f1 (until time t1), and the resonance frequency f1 is output continuously after time t1. Therefore, the voltage applied across the filaments becomes maximum at time t0 when the frequency output from the separate-excitation oscillator becomes the resonance frequency f0; and the fluorescent lamp lights at least until this voltage is reached. After time t1, a pulse signal having the same frequency as the resonance frequency f1 at the time of lighting is output from the separate-excitation oscillator, whereby the fluorescent lamp emits light efficiently.

The bulb-type fluorescent lamp of Embodiment 6 is configured so that the accurate resonance frequency f1 is output continuously from the separate-excitation oscillator. Therefore, even when lighting is not attained at the time of the frequency sweep operation in the above-mentioned separate-excitation mode, a large voltage is continuously applied across the filaments even after time t1, whereby the fluorescent lamp lights securely.

EMBODIMENT 7

Embodiment 7, an embodiment of a fluorescent lamp lighting apparatus in accordance with the present invention, will be described below. The bulb-type fluorescent lamp of Embodiment 7 is not provided with the trigger input circuit 213 (FIG. 9) and the separate-excitation/self-excitation selection switch circuit 214 (FIG. 9) in the above-mentioned Embodiment 1. And in Embodiment 7, the output signal (OUT2) from the separate-excitation oscillator is output to the high-voltage-side dead time generation circuit and the low-voltage-side dead time generation circuit. Furthermore, the separate-excitation oscillator of Embodiment 7 is configured to output a signal having a fixed frequency.

The configuration of the bulb-type fluorescent lamp of Embodiment 7 is the same as that of bulb-type fluorescent lamp of Embodiment 1 shown in the above-mentioned FIG. 9, except that the trigger input circuit 213 and the separate-excitation/self-excitation selection switch circuit 214 are omitted. Therefore, the drawings and numeral codes used for the description of Embodiment 1 are also applied in the following descriptions.

The frequencies output from the separate-excitation oscillator of Embodiment 7 are the fixed frequency f1 and the resonance frequency determined by the capacitors C5, C6, the coil L1 and the impedance across the filaments of the fluorescent lamp after lighting.

Figure 33:
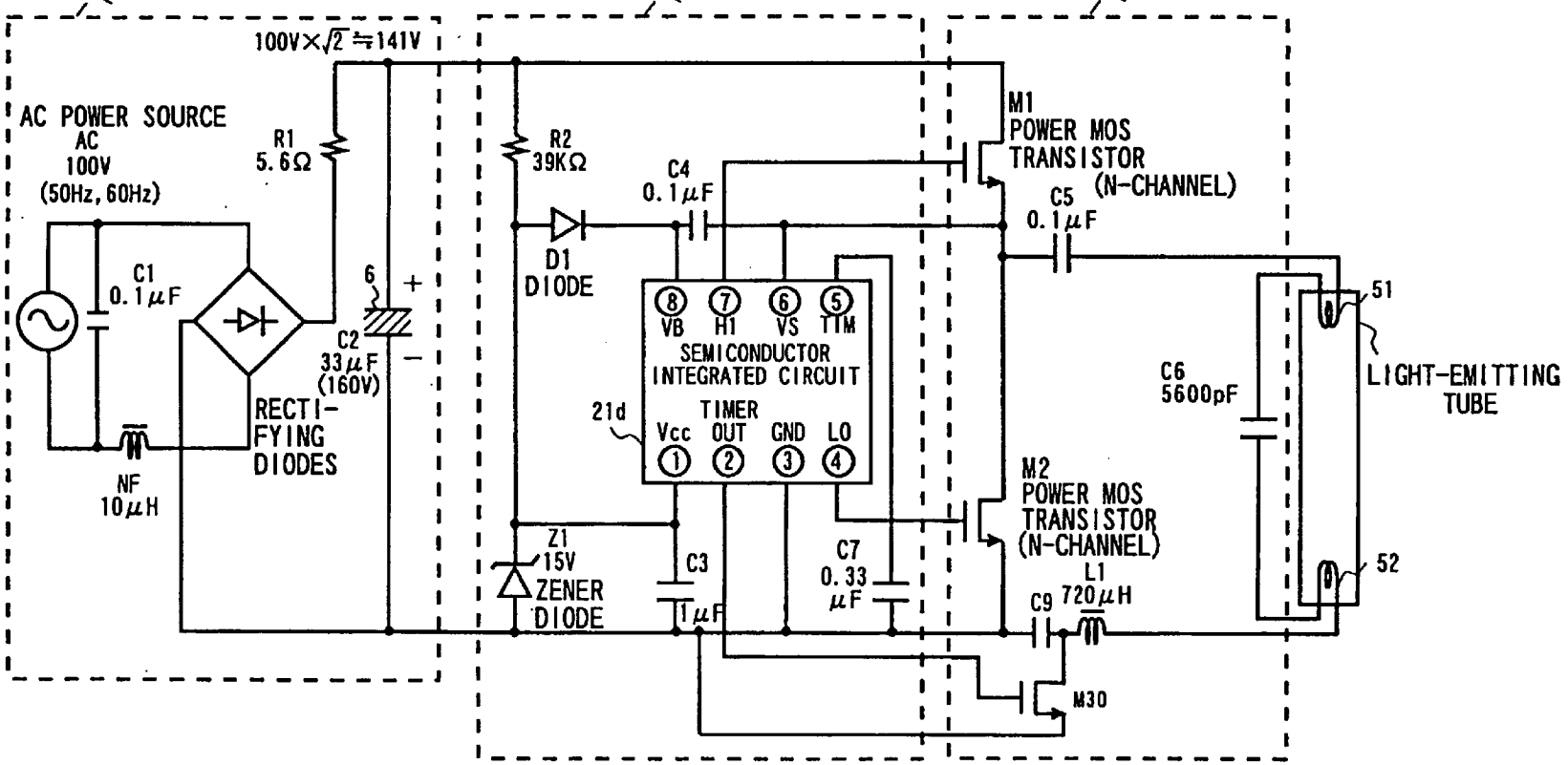
FIG. 33 is a circuit diagram showing a configuration in a bulb-type fluorescent lamp of Embodiment 7 in accordance with the present invention.
Figure 34:
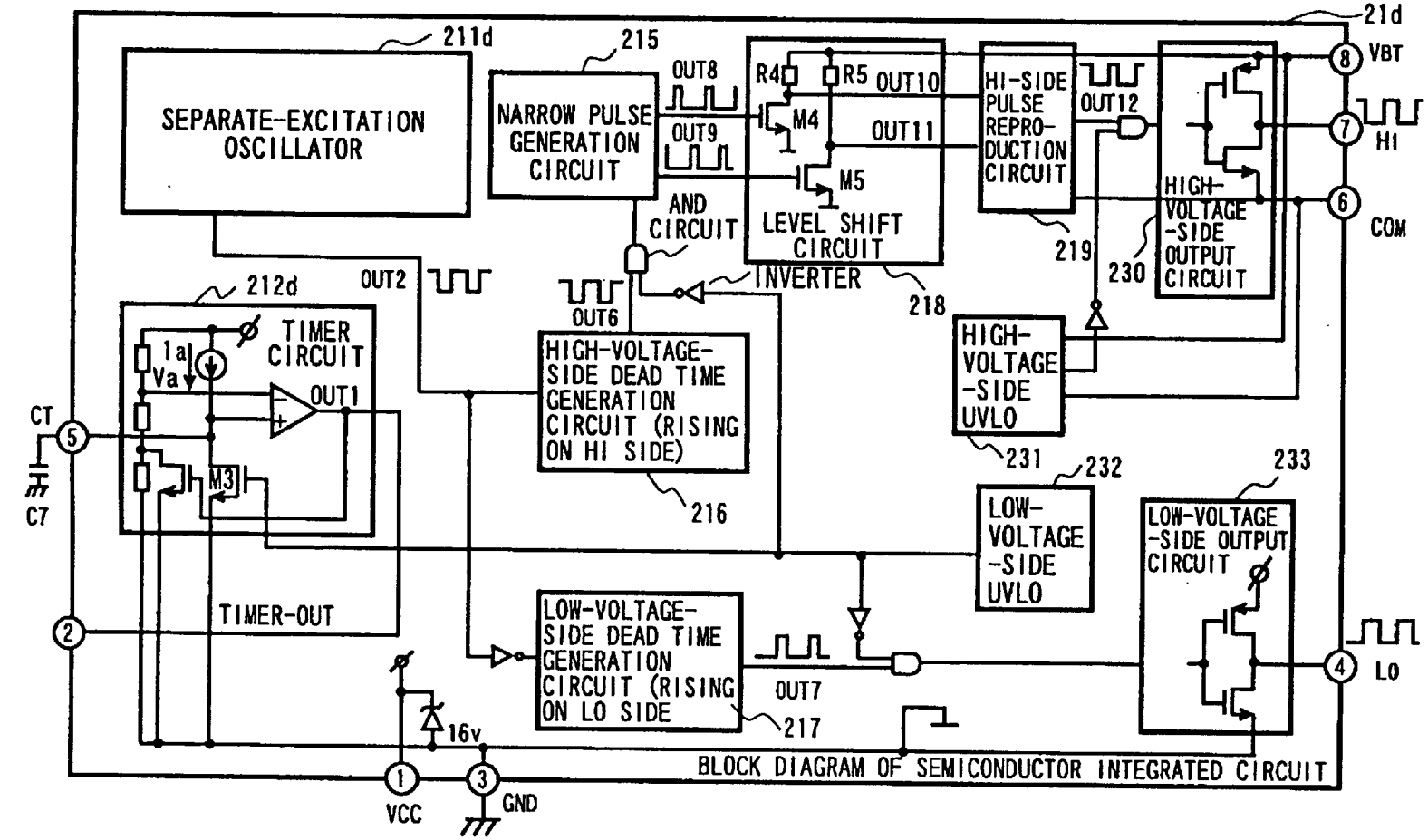
FIG. 34 is a block diagram showing a configuration of a semiconductor integrated circuit in Embodiment 7.
Figure 35:
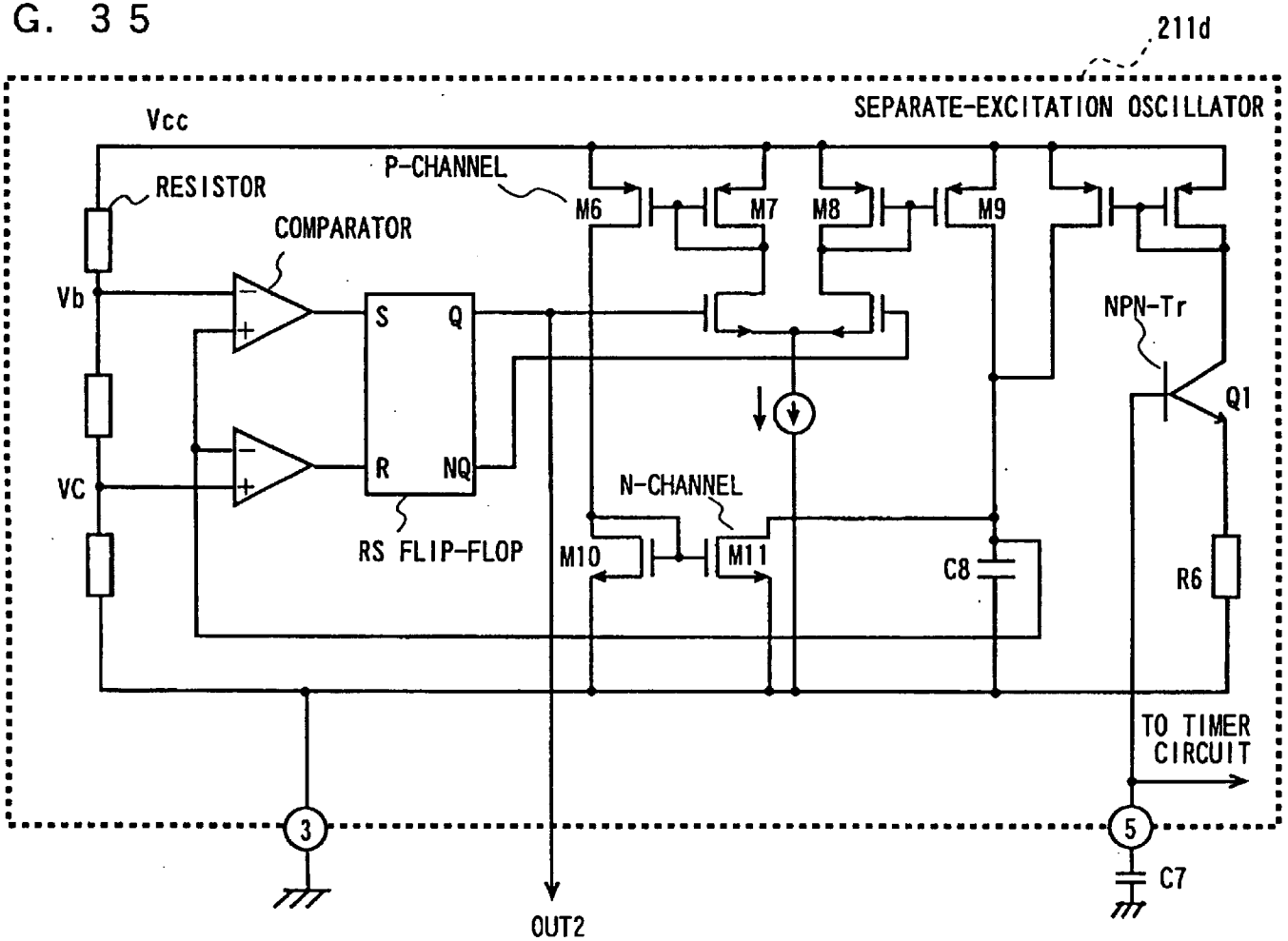
FIG. 35 is a circuit diagram of a separate-excitation oscillator of the semiconductor integrated circuit in Embodiment 7.

FIG. 33 is a diagram showing the circuit configuration in the bulb-type fluorescent lamp of Embodiment 7. FIG. 34 is a block diagram showing the configuration of the semiconductor integrated circuit in Embodiment 7. FIG. 35 is a circuit diagram of the separate-excitation oscillator (75 kHz) of the semiconductor integrated circuit in Embodiment 7.

As shown in FIG. 33, in the drive control circuit 30d of Embodiment 7, a capacitor C9 is provided between the coil L1 and the source of the power MOS transistor M2, and the drain of the MOS transistor M30 is connected to the connection point of the capacitor C9 and the coil L1. The timer signal from the timer terminal (pin terminal No. 2) of the semiconductor integrated circuit 21d is input to the gate of the MOS transistor M30.

As shown in FIG. 34, the output signal of the timer circuit 212d of the semiconductor integrated circuit 21d is configured to be output from the timer terminal of the pin terminal NO. 2. The separate-excitation oscillator 211d (FIG. 35) of Embodiment 7 is configured to output only the fixed frequency (75 kHz).

In the bulb-type fluorescent lamp of Embodiment 7, until a predetermined time passes after power on and the timer circuit 212d is switched, an L-level signal is output from the timer terminal (pin terminal No. 2). After the timer circuit is switched, an H-level signal is output from the timer terminal (pin terminal No. 2).

In the bulb-type fluorescent lamp shown in FIG. 33, the period during which the output of the timer terminal (pin terminal No. 2) after power on is an L-level signal is a preheating period, and the MOS transistor M30 is in an open state (off state). When the predetermined time has passed, the timer circuit 212d is switched, and an H-level signal is output from the timer terminal (pin terminal No. 2), the MOS transistor M30 becomes a closed state (on state), and a short-circuit state occurs across both terminals of the capacitor C9.

Figure 36:
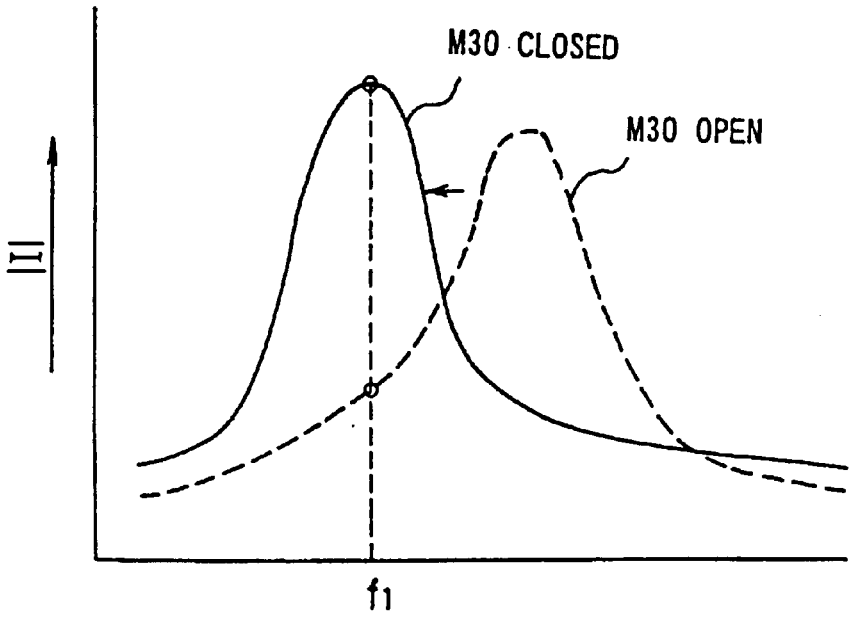
FIG. 36 shows frequency characteristic curves at the time of non-lighting in Embodiment 7.

FIG. 36 shows frequency characteristic curves at the time of the non-lighting of the light-emitting tube when the MOS transistor M30 is in the open and close operations. In FIG. 36, the curve shown in a broken line indicates the frequency characteristic at the time when the MOS transistor M30 is open (off state), and the curve shown in a solid line indicates the frequency characteristic at the time when the MOS transistor M30 is closed (on state).

The MOS transistor M30 becomes a closed state by the signal from the timer circuit 212d when a predetermined time has passed after power on. When a short-circuit occurs across the terminals of the capacitor C9, the MOS transistor M30 shifts to the characteristic curve shown in the solid line of FIG. 36. As a result, the current |I| flowing through the LC resonance circuit of the drive control circuit 30d at the fixed frequency f1 increases, and the fluorescent lamp lights.

In Embodiment 7, the output frequency of the separate excitation oscillator 211d is fixed at the resonance frequency f1 in the closed state of the MOS transistor M30. Therefore, the voltage applied across the filaments of the light-emitting tube is larger when the MS transistor M30 is closed than when it is open.

In Embodiment 7, the light-emitting tube is set not to light at the voltage across the filaments applied when the MOS transistor M30 is in the open state. Furthermore, the light-emitting tube is set to light without fail at the voltage across the filaments applied when the MOS transistor M30 is in the closed state. Therefore, when the MOS transistor M30 is in the open state, a preheating current securely flows through the filaments.

Since the bulb-type fluorescent lamp of Embodiment 7 is configured as described above, the preheating current flows constantly during the predetermined time after power on, and the MOS transistor M30 is switched by the signal from the timer circuit 212d. Simultaneously with the switching, the preheating of the filaments ends, and the light-emitting tube used as a fluorescent lamp lights.

EMBODIMENT 8

A bulb-type fluorescent lamp of Embodiment 8, an embodiment of a fluorescent lamp lighting apparatus in accordance with the present invention, will be described below. The bulb-type fluorescent lamp of Embodiment 8 is configured so that the output frequency of the separate-excitation oscillator is fixed, and so that the duty ratio increases when the voltage at the timer terminal of the pin terminal No. 5 of the semiconductor integrated circuit becomes higher.

Figure 37:
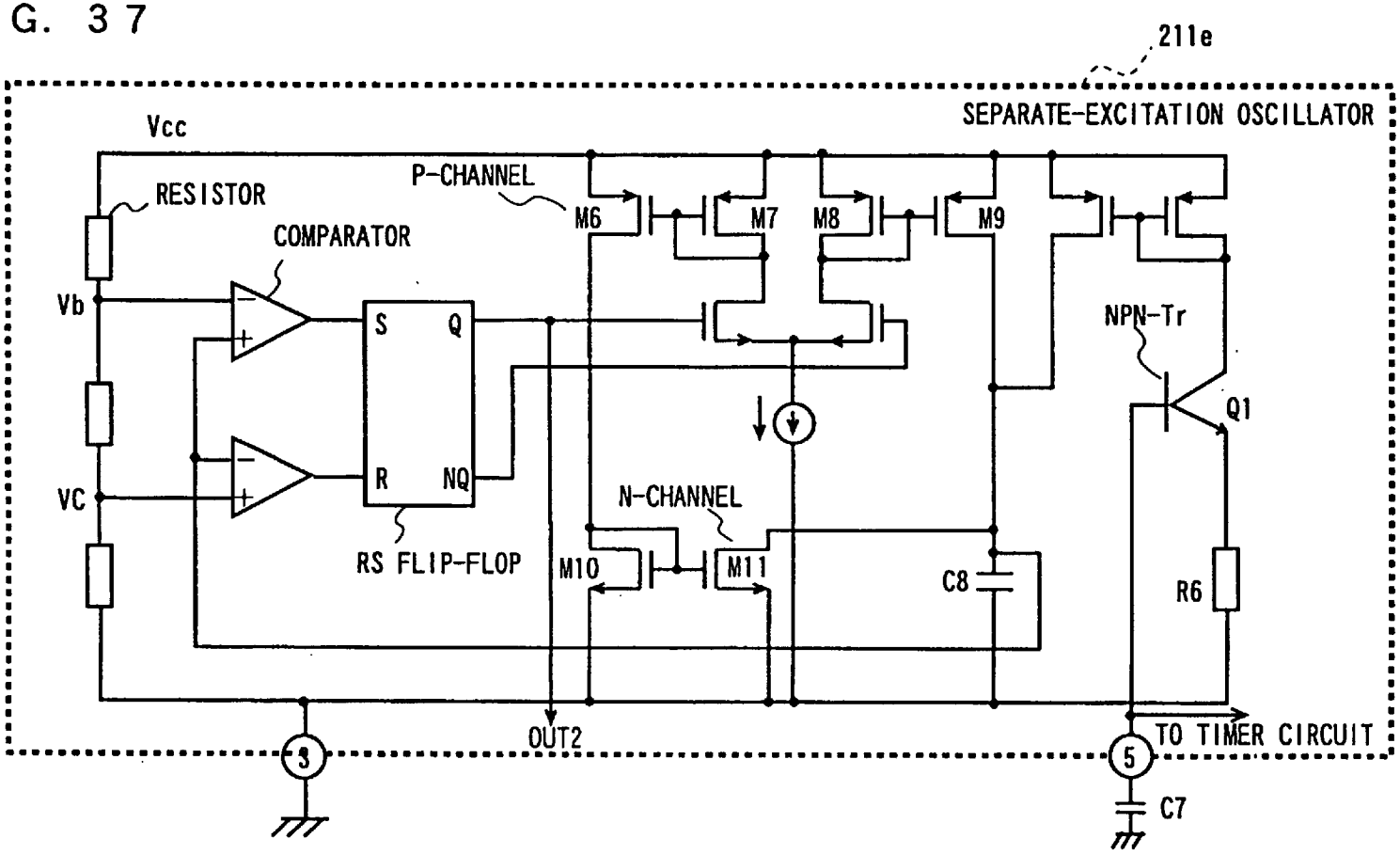
FIG. 37 is a circuit diagram showing a configuration of a separate-excitation oscillator 211e in a bulb-type fluorescent lamp of Embodiment 8 in accordance with the present invention.

FIG. 37 is a circuit diagram showing the configuration of the separate-excitation oscillator 211e in the bulb-type fluorescent lamp of Embodiment 8. The bulb-type fluorescent lamp of Embodiment 8 is configured so that the frequency of the separate-excitation oscillator 211e is fixed, and so that the duty increases as the voltage at the timer terminal of the pin terminal No. 5 becomes higher. With this configuration, the current flowing through the filaments of the light-emitting tube used as a fluorescent lamp before lighting increases as the duty ratio becomes larger, and the voltage applied across the filaments also becomes larger. Therefore, by using the configuration wherein the timer terminal voltage rises, it is possible to use a system similar to that used in the case where the frequency is swept.

Since the bulb-type fluorescent lamp of Embodiment 8 is configured as described above, it has the effect of carrying out preheating sufficiently without performing frequency modulations.

As another example of Embodiment 8, the light-emitting tube may be lit by raising the voltage across the filaments by using a system for making a selection between a duty ratio of 20% (the duty ratio for not attaining lighting) during preheating and a duty ratio of 50% (the duty ratio for attaining lighting) after preheating, for example.

Furthermore, as still another example of the bulb-type fluorescent lamp of Embodiment 8, even a system, wherein a separate-excitation oscillator is used as a trigger circuit for causing LC oscillation at the time of power on, and the duty ratio is swept (or selected between two stages) in the full self-excitation mode, can light the fluorescent lamp by raising the voltage across the filaments.

EMBODIMENT 9

A bulb-type fluorescent lamp of Embodiment 9, an embodiment of a fluorescent lamp lighting apparatus in accordance with the present invention, will be described below.

The bulb-type fluorescent lamp of Embodiment 9 has a configuration wherein a delay circuit, the delay amount of which changes depending on the timer terminal voltage of the semiconductor integrated circuit, is provided at the output of the trigger input circuit in the bulb-type fluorescent lamp of the above-mentioned Embodiment 1. Furthermore, in Embodiment 9, the separate-excitation oscillator is used as a trigger generation circuit for causing LC oscillation momentarily at the time of power on.

The bulb-type fluorescent lamp of Embodiment 9 has a system wherein phase sweep is performed in the full self-excitation mode to light the fluorescent lamp. The lighting system by using the phase sweep will be described below.

The separate-excitation oscillator in Example 9 outputs a trigger signal for causing LC oscillation momentarily at the time of power on. Therefore, the bulb-type fluorescent lamp of Embodiment 9 has a configuration wherein in the feedback loop from the terminal of the coil L1 to the gates of the power MOS transistors M1 and M2, the phase is swept in a delaying direction for a constant period after power on.

In the range wherein the phase delay in the above-mentioned feedback loop is less than 90° (in the range wherein the phase of the voltage at the terminal of the coil L1 advances ahead of that of the current, and the advanced phase is not canceled up to 0° at the end of the feedback loop), the preheating current flowing through the filaments before lighting increases as the phase of the feedback loop delays. Furthermore, the voltage applied across the filaments also increases.

Therefore, the bulb-type fluorescent lamp of Embodiment 9 can be obtained when a system, similar to that used in the case where the frequency is swept in the separate-excitation mode, performs phase sweep in the full self-excitation mode.

A signal being switched at short time intervals (100 msec, for example) after power on is output from the timer circuit. The reference voltage Va in the timer circuit is set low. In Embodiment 9, after the timer terminal voltage exceeds the reference voltage Va, the amount of delay increases as the timer terminal voltage rises.

Figure 38:
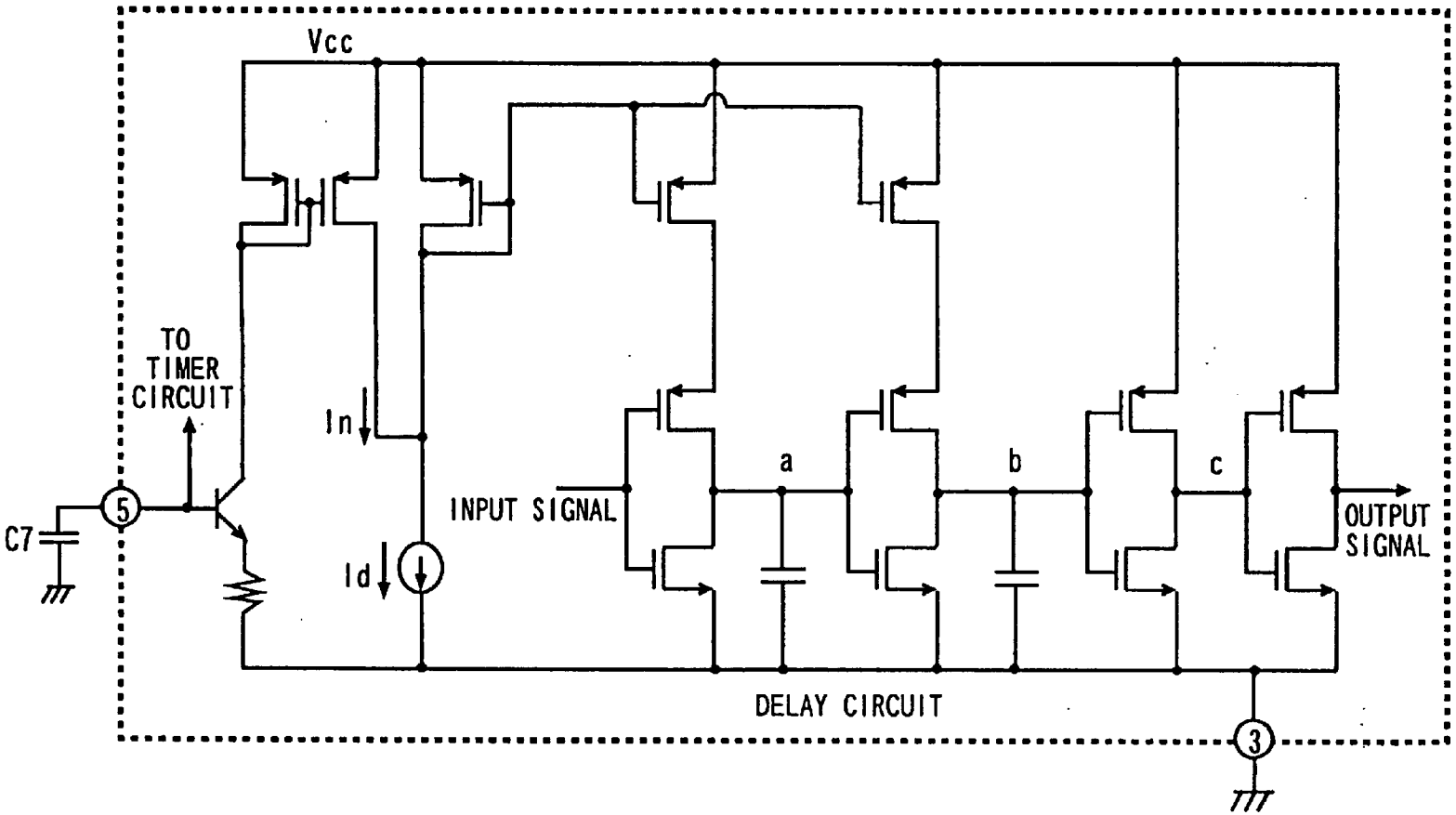
FIG. 38 is a concrete circuit diagram of a delay circuit 251 used for a bulb-type fluorescent lamp of Embodiment 9 in accordance with the present invention.

FIG. 38 is a concrete circuit diagram of the delay circuit 251 used for the bulb-type fluorescent lamp of Embodiment 9. The input signal in FIG. 38 is a signal from the trigger input circuit, and the output signal is input to the separate-excitation/self-excitation selection switch circuit.

In Embodiment 9, the separate-excitation oscillator is configured to output a fixed frequency as shown in FIG. 35 of the above-mentioned Embodiment 7.

In the above-mentioned Embodiment 9, an example wherein the delay circuit 251 is provided at the output of the trigger input circuit is described. However, the present invention is not limited to this configuration, it may be possible to use a configuration wherein a delay circuit is provided at the output of the separate-excitation/self-excitation selection switch circuit, and the amount of delay changes depending on the timer terminal voltage of the semiconductor integrated circuit.

Furthermore, it may be possible to use a system configuration so that a non-lighting phase is set at the time of preheating and a lighting phase is selected after preheating, as a system wherein phase sweep is performed in the full self-excitation mode to light the light-emitting tube used as a fluorescent lamp.

The IC used in the above-mentioned embodiments is a component mountable in an 8-pin DIP or SMD package generally used for monolithic ICs. Therefore, it can be used in such a restricted space as found near the base portion of the bulb-type fluorescent lamp, thereby being best suited to obtain a compact fluorescent lamp lighting apparatus.

EMBODIMENT 10

A bulb-type fluorescent lamp of Embodiment 10, an embodiment of a fluorescent lamp lighting apparatus in accordance with the present invention, will be described below by using the accompanying FIGS. 39 and 40.

Figure 39:
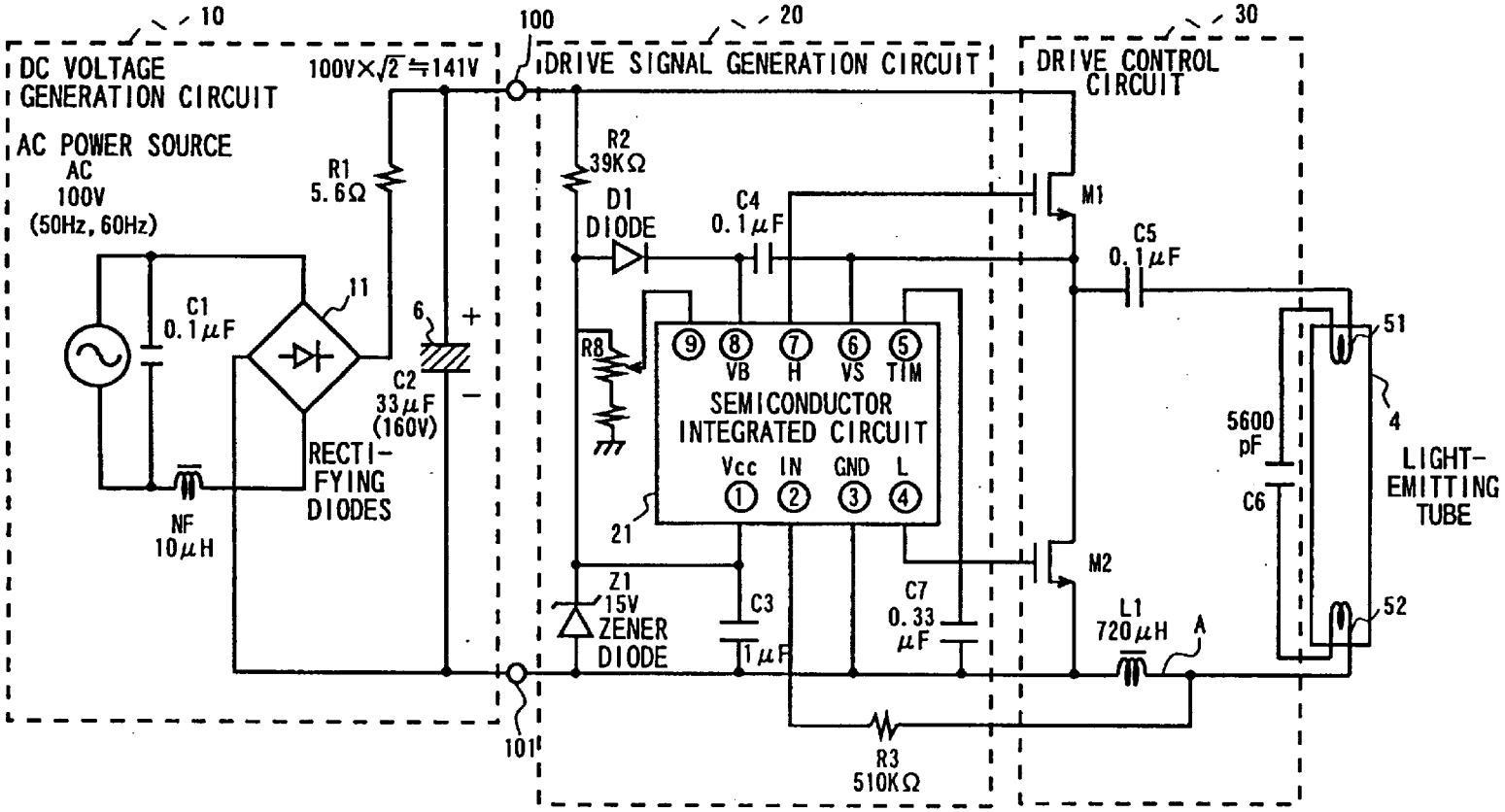
FIG. 39 is a circuit diagram showing a configuration of a bulb-type fluorescent lamp of Embodiment 10 in accordance with the present invention.
Figure 40:
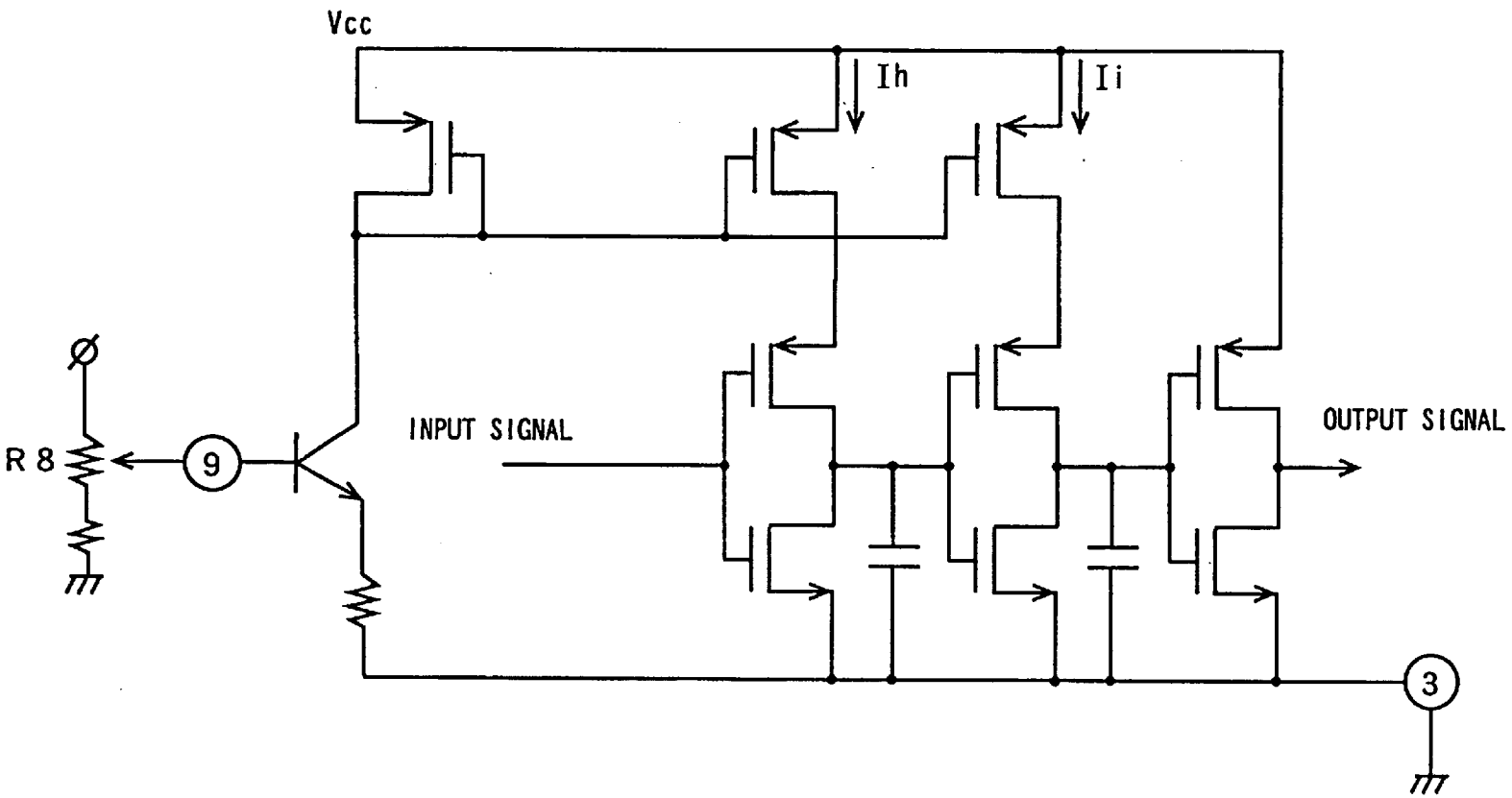
FIG. 40 is a circuit diagram showing a configuration of a delay circuit in Embodiment 10.

FIG. 39 is a circuit diagram showing the configuration of the bulb-type fluorescent lamp of Embodiment 10. FIG. 40 is a circuit diagram showing the configuration of the delay circuit in Embodiment 10. For the components of the bulb-type fluorescent lamp of Embodiment 10 having the same functions and configurations as those of the bulb-type fluorescent lamp of the above-mentioned Embodiment 1, the descriptions and numeral codes of Embodiment 1 are also applied, and their descriptions are omitted.

The bulb-type fluorescent lamp of Embodiment 10 is configured by adding a pin (pin terminal No. 9) to the semiconductor integrated circuit 21 in the bulb-type fluorescent-lamp of the above-mentioned Embodiment 1. Furthermore, Embodiment 10 has a configuration wherein a delay circuit is connected to the output of the trigger input circuit 213 or the output of the separate-excitation/self-excitation selection switch circuit 214 shown in FIG. 9 of the above-mentioned Example 1. An example of this delay circuit 500 is shown in the circuit diagram in FIG. 40.

In Embodiment 10, the delay amount of the delay circuit 500 can be controlled by the signal input to the pin terminal No. 9 of the semiconductor integrated circuit 21. The output signal from the trigger input circuit 213 or the separate-excitation/self-excitation selection switch circuit 214 is input to the delay circuit 500. The signal input from the trigger input circuit 213 or the separate-excitation/self-excitation selection switch circuit 214 is delayed by the delay circuit 500 and output to the next stage. The delay amount obtained at this time is controlled by the signal input to the pin terminal No. 9 of the semiconductor integrated circuit 21.

As shown in FIG. 39, a variable resistor R8 is connected to the pin terminal No. 9 of the semiconductor integrated circuit 21. When the voltage at the pin terminal No. 9 is raised by changing the resistance value of the variable resistor R8 is changed, the constant currents Ih and Ii of FIG. 40 increase, and the delay amount decreases. Conversely, when the voltage at the pin terminal No. 9 is lowered, the constant currents Ih and Ii decrease, and the delay-amount increases. Therefore, in bulb-type fluorescent lamp of Embodiment 10, by adjusting the voltage at the pin terminal No. 9 of the semiconductor integrated circuit 21 after lighting, the phase setting in the feedback loop in the self-excitation mode can be changed. As a result, the brightness of the light-emitting tube 4 in Embodiment 10 can be changed easily.

In Embodiment 10, when the phase is advanced from the reference setting, the light-emitting tube 4 becomes dark, and when the phase is delayed from the reference setting, the light-emitting tube 4 becomes bright. In this way, the light of the bulb-type fluorescent lamp of Embodiment 10 can be adjusted to desired brightness.

EMBODIMENT 11

A bulb-type fluorescent lamp of Embodiment 11, an embodiment of a fluorescent lamp lighting apparatus in accordance with the present invention, will be described below by using the accompanying FIGS. 41 to 44. For the components of the bulb-type fluorescent lamp of Embodiment 11 having the same functions and configurations as those of the bulb-type fluorescent lamp of the above-mentioned Embodiment 1, the descriptions and numeral codes of Embodiment 1 are also applied, and their descriptions are omitted.

The bulb-type fluorescent lamp of Embodiment 11 has a configuration wherein the frequency of the separate-excitation oscillator can be controlled after the light-emitting tube is lit.

Figure 41:
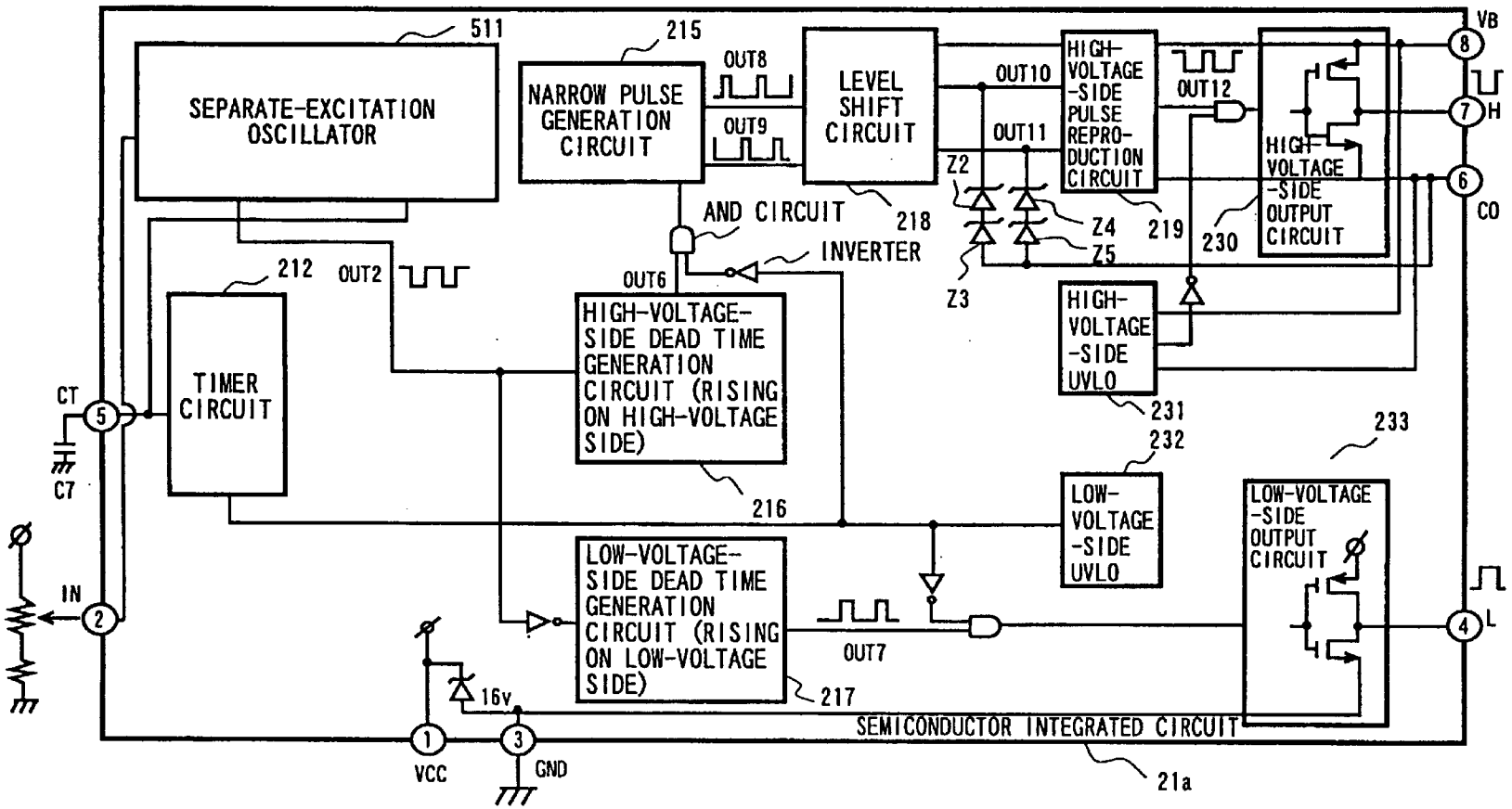
FIG. 41 is a block diagram showing a configuration of a first example of a semiconductor integrated circuit in Embodiment 11 in accordance with the present invention.
Figure 42:
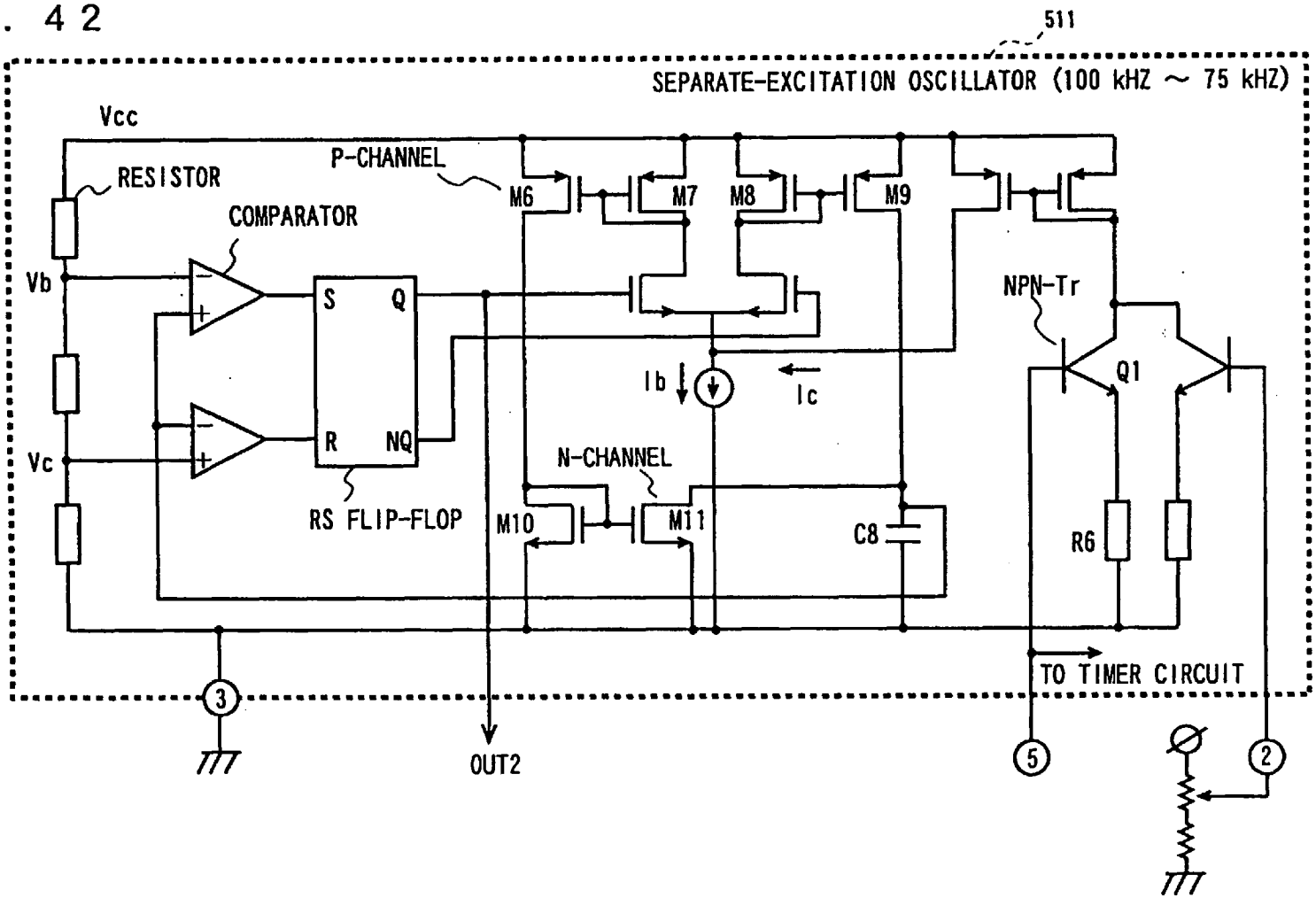
FIG. 42 is a circuit diagram showing a configuration of a separate-excitation oscillator 511 in Embodiment 11.

FIG. 41 is a block diagram showing the configuration of a first example of the semiconductor integrated circuit in Embodiment 11. The semiconductor integrated circuit of Embodiment 1 shown in FIG. 41 is the first example configured so that the frequency of the separate-excitation oscillator can be controlled after the light-emitting tube in the bulb-type fluorescent lamp of the above-mentioned Embodiment 6 is lit. FIG. 42 is a circuit diagram showing the configurations of the separate-excitation oscillator 511 and the like in Embodiment 11. The semiconductor integrated circuit of Embodiment 11 is a first circuit example having a configuration wherein the frequency of the separate-excitation oscillator 511 can be controlled after the light-emitting tube 4 is lit.

When the voltage at the pin terminal No. 2 is made larger than the reference voltage of the initial setting after the light-emitting tube 4 of Embodiment 11 is lit, the frequency of the separate-excitation oscillator 511 is lowered. Conversely, when the voltage at the pin terminal No. 2 is made smaller than the reference voltage of the initial setting, the frequency of the separate-excitation oscillator 511 is raised. Therefore, when the separate-excitation frequency is made close to the resonance frequency of the LC resonance circuit at the time of lighting by changing the voltage at the pin terminal No. 2, the light-emitting tube 4 becomes bright, and when the frequency is made away from the resonance frequency, the light-emitting tube 4 becomes dark. In this way, the light of the bulb-type fluorescent lamp of Embodiment 11 can be adjusted.

Figure 43:
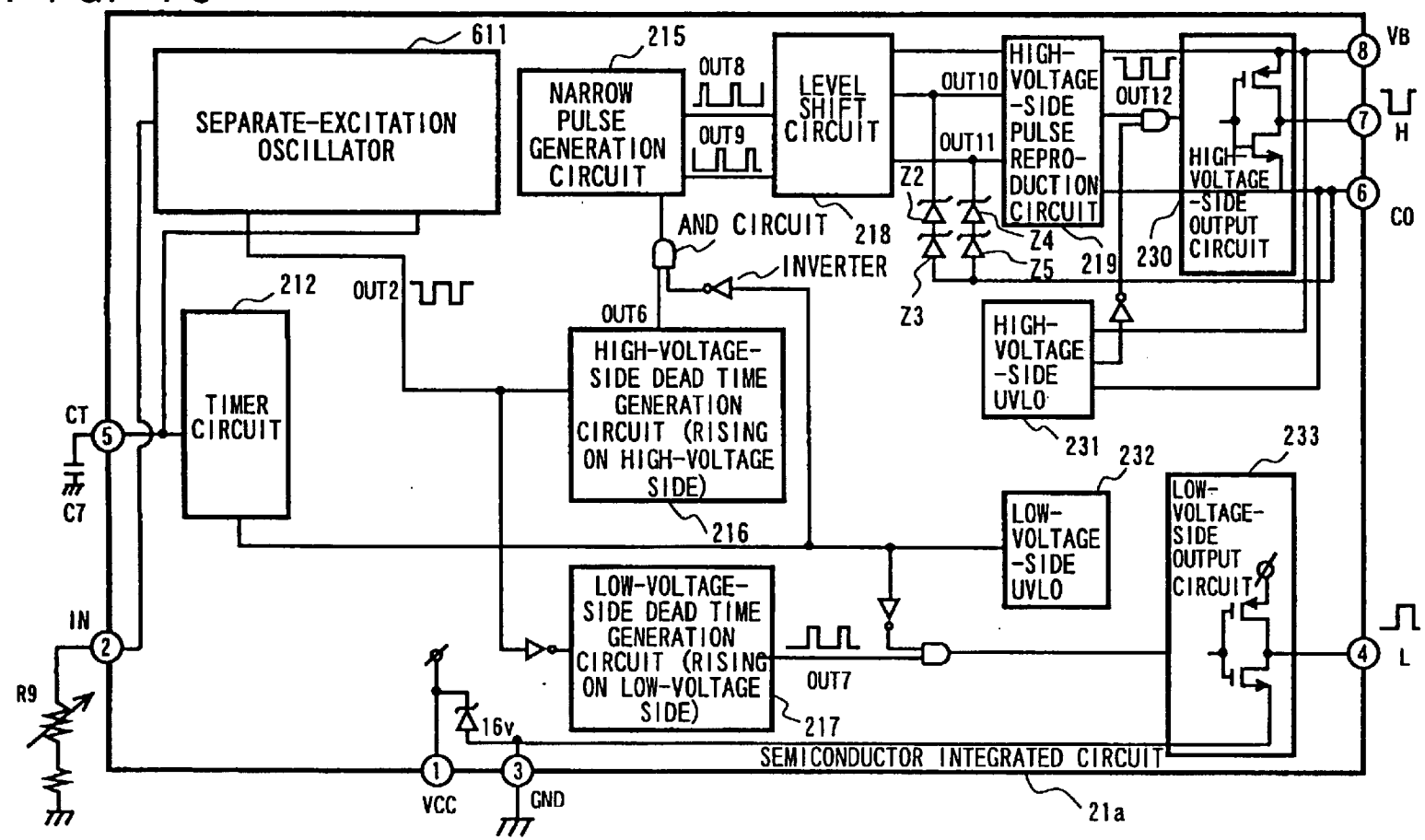
FIG. 43 is a block diagram showing a configuration of a second example of a semiconductor integrated circuit in Embodiment 11.
Figure 44:
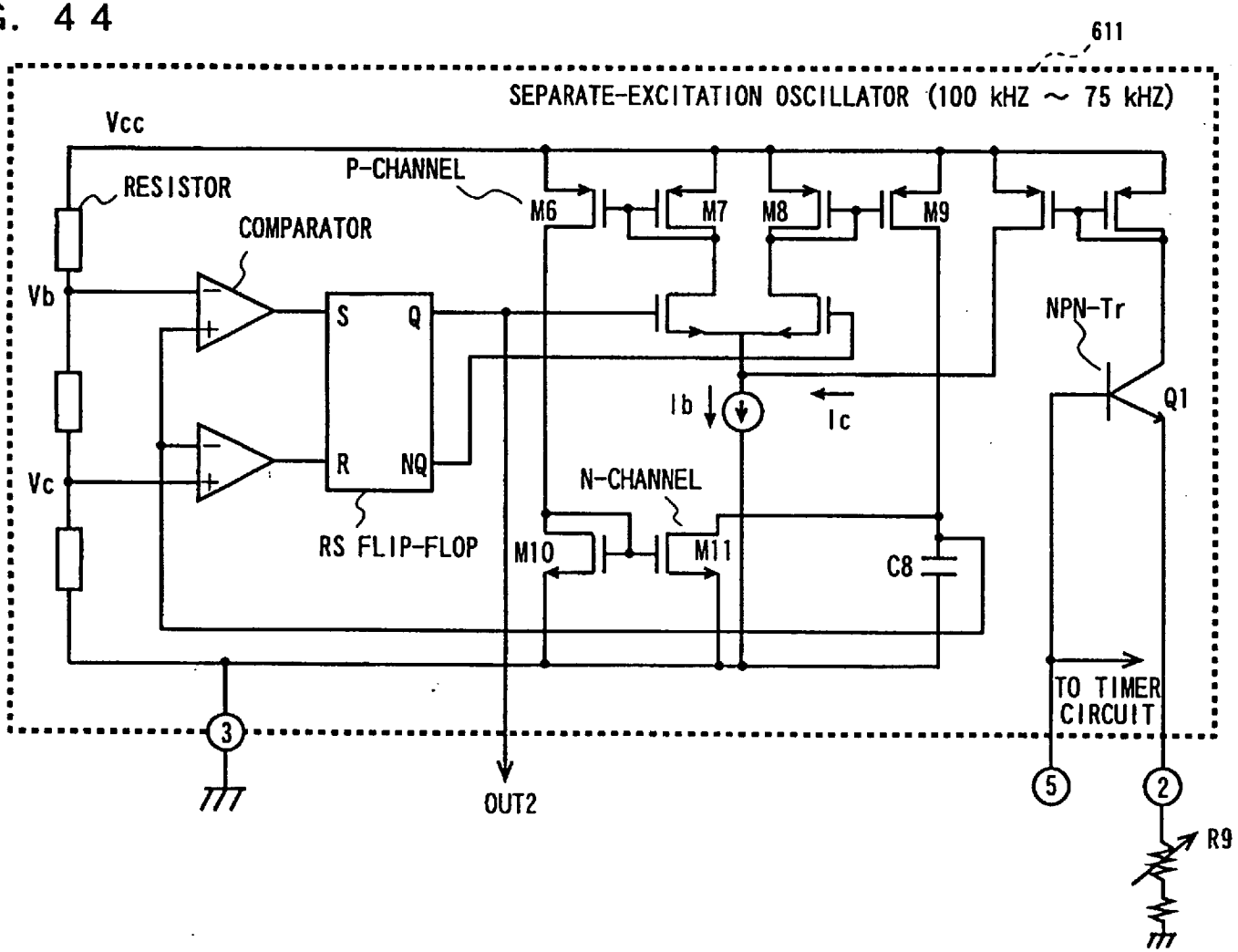
FIG. 44 is a circuit diagram showing a configuration of a separate-excitation oscillator 611 in Embodiment 11.

FIG. 43 is a block diagram showing the configuration of a second example of the semiconductor integrated circuit in Embodiment 11. The semiconductor integrated circuit of Embodiment 11 shown in FIG. 43 is the second example configured so that the frequency of the separate-excitation oscillator can be controlled after the light-emitting tube in the bulb-type fluorescent lamp of the above-mentioned Embodiment 6 is lit. FIG. 44 is a second circuit example showing a configuration wherein the frequency of the separate-excitation oscillator 611 can be controlled after the light-emitting tube 4 is lit.

After the light-emitting tube is lit, by making the value of the variable resistor R9 connected to the terminal of the pin terminal No. 2 smaller than the initial setting, the frequency of the separate-excitation oscillator 611 is lowered. Conversely, by making the value of the variable resistor R9 larger than the initial setting, the frequency of the separate-excitation oscillator 611 is raised.

Therefore, in the case of the semiconductor integrated circuit 21a of Embodiment 11 shown in FIG. 43, by making the separate-excitation frequency close to the resonance frequency of the LC resonance circuit at the time of lighting by changing the resistive value of the variable resistor R9, the light-emitting tube 4 becomes bright. Conversely, by making the separate-excitation frequency away from the resonance frequency, the light-emitting tube 4 becomes dark. In this way, in Embodiment 11, the light of the light-emitting tube 4 can be adjusted by adjusting the resistance value of the variable resistor R9.

EMBODIMENT 12

A bulb-type fluorescent lamp of Embodiment 12, an embodiment of a fluorescent lamp lighting apparatus in accordance with the present invention, will be described below by using the accompanying FIGS. 45 and 46. For the components of the bulb-type fluorescent lamp of Embodiment 12 having the same functions and configurations as those of the bulb-type fluorescent lamp of the above-mentioned Embodiment 1, the descriptions and numeral codes of Embodiment 1 are also applied, and their descriptions are omitted.

The bulb-type fluorescent lamp of Embodiment 12 has a configuration wherein the output duty of the separate-excitation oscillator can be controlled after the light-emitting tube is lit.

Figure 45:
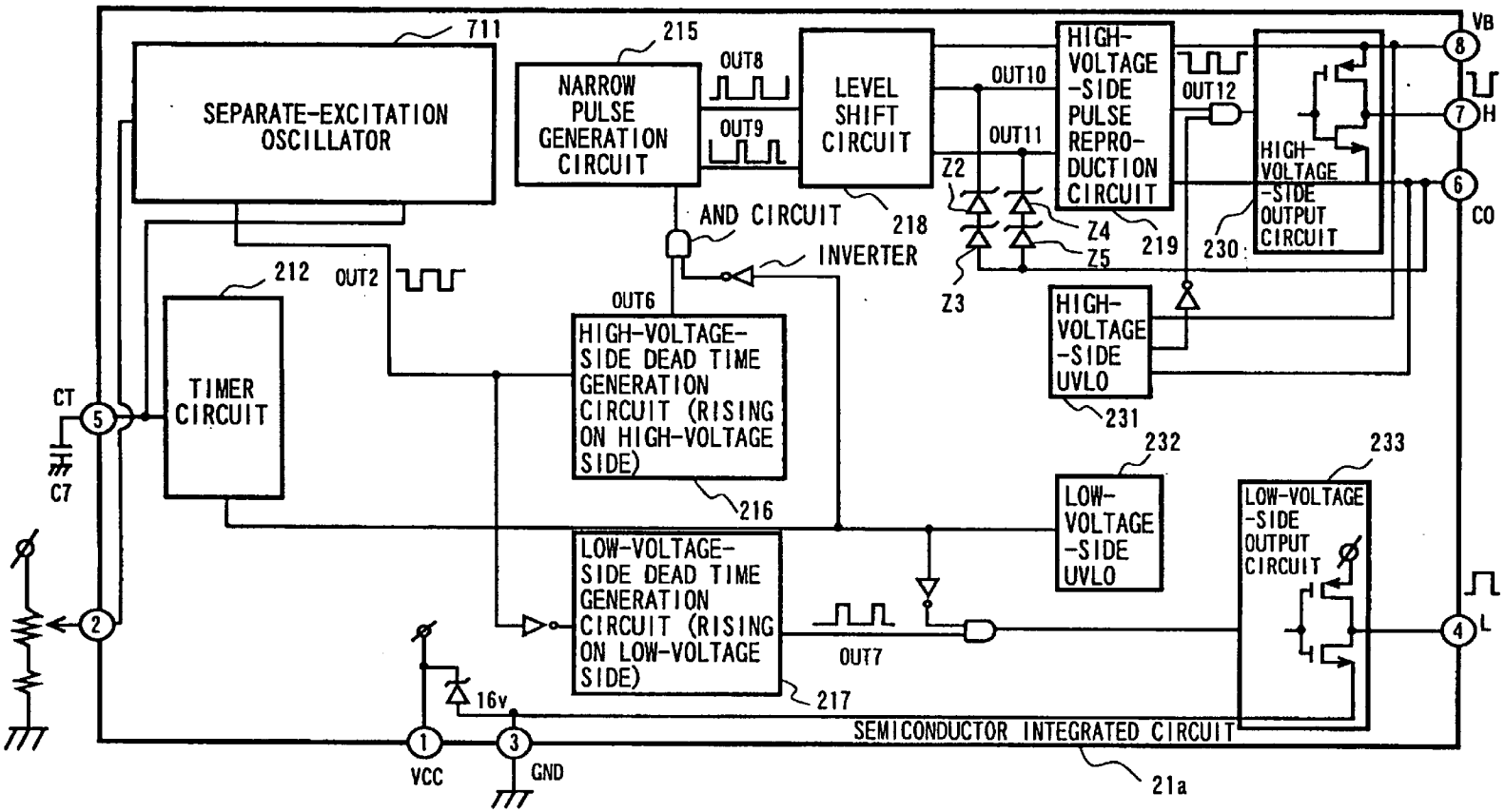
FIG. 45 is a block diagram showing a configuration of a semiconductor integrated circuit in Embodiment 12 in accordance with the present invention.
Figure 46:
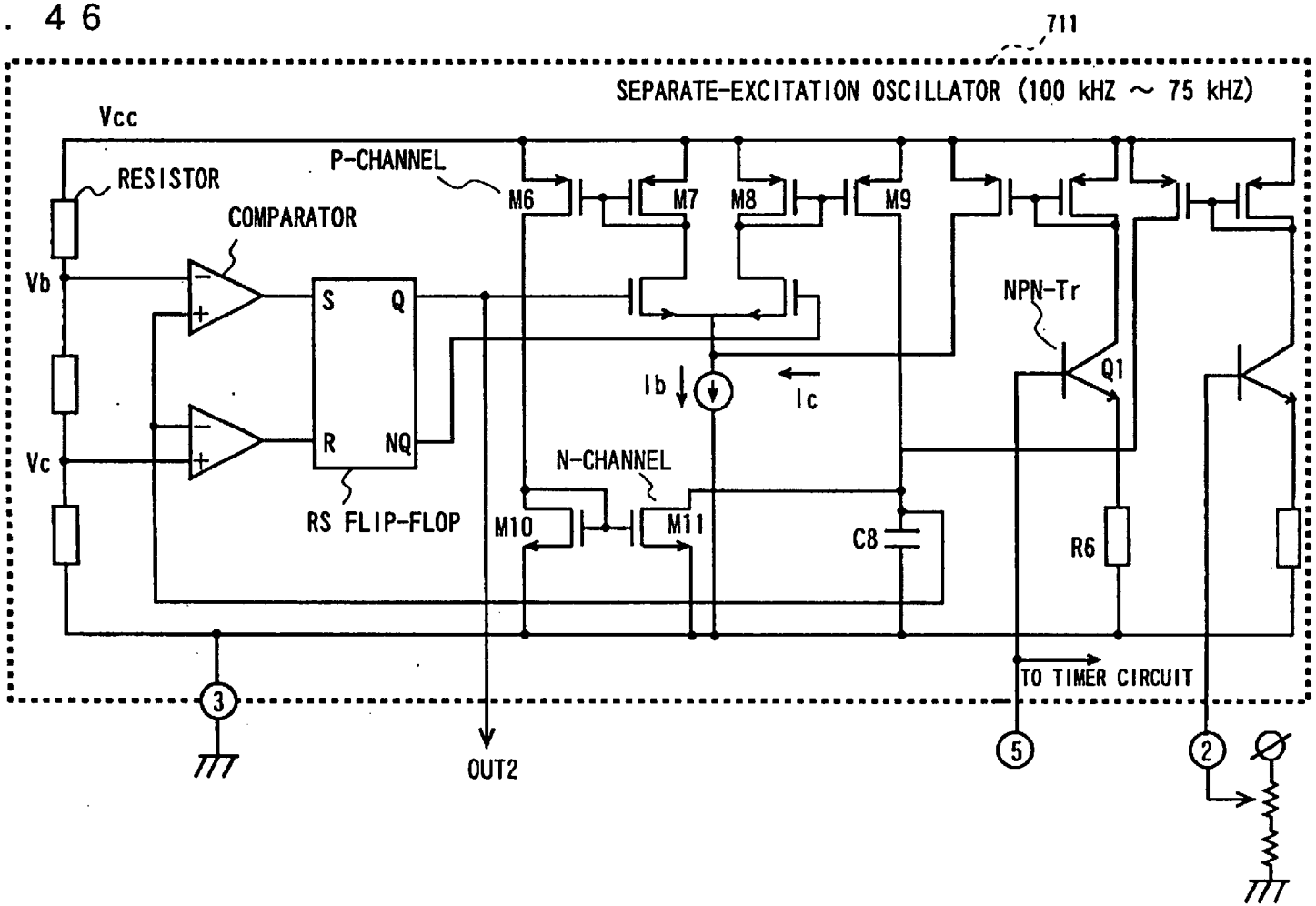
FIG. 46 is a circuit diagram showing a configuration of a separate-excitation oscillator 711 in a bulb-type fluorescent lamp of Embodiment 12.
Figure 47:
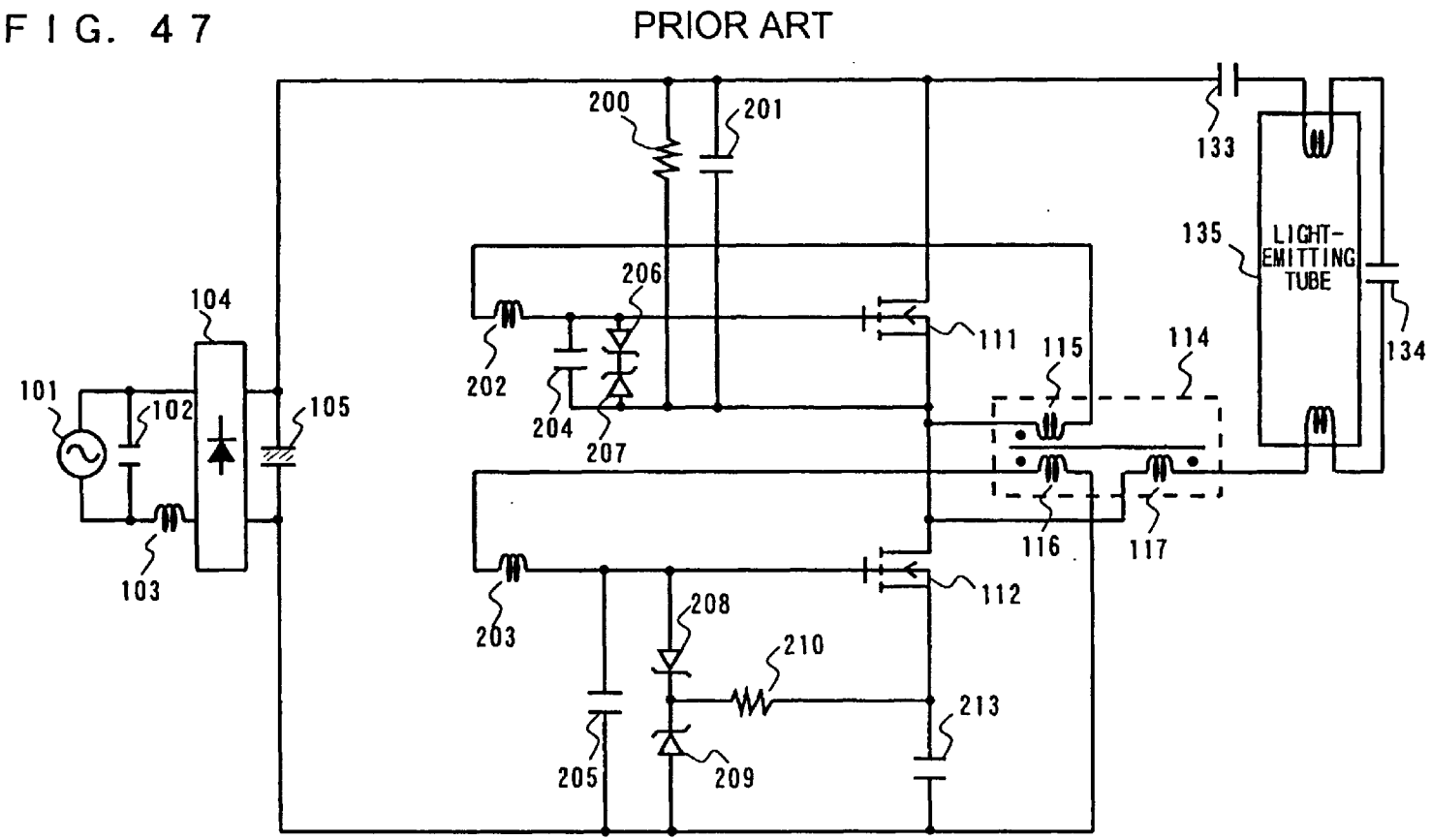
FIG. 47 is a circuit diagram of a conventional bulb-type fluorescent lamp.

FIG. 45 is a block diagram showing the configuration of the semiconductor integrated circuit of Embodiment 12. In the bulb-type fluorescent lamp of Embodiment 12, the semiconductor integrated circuit of Embodiment 6 shown in the above-mentioned FIG. 31 is configured so that the output duty of the separate-excitation oscillator can be controlled after the light-emitting tube is lit. FIG. 46 is a circuit diagram showing the configuration of the separate-excitation oscillator 711 in the bulb-type fluorescent lamp of Embodiment 12. The separate-excitation oscillator 711 shown in FIG. 46 is a circuit example of the configuration wherein the output duty of the separate-excitation oscillator 711 can be controlled after the light-emitting tube 4 is lit.

In Embodiment 12, by making the voltage of the pin terminal No. 2 of the semiconductor integrated circuit larger than the reference voltage of the initial setting after the light-emitting tube 4 is lit, the output duty (OUT2) of the separate-excitation oscillator 711 becomes large. Conversely, by making the voltage of the pin terminal No. 2 smaller than the reference voltage of the initial setting, the output duty (OUT2) of the separate-excitation oscillator 711 becomes small. In Embodiment 12, by increasing the output duty of the separate-excitation oscillator 711, the light-emitting tube 4 becomes bright. Conversely, by decreasing the output duty of the separate-excitation oscillator 711, the light-emitting tube 4 becomes dark.

Therefore, in the case of the semiconductor integrated circuit of Embodiment 12 shown in FIG. 45, by adjusting the voltage of the pin terminal No. 2 after the light-emitting tube is lit, the brightness of the light-emitting tube can be changed. In this way, in Embodiment 12, by adjusting the voltage of the pin terminal No. 2 of the semiconductor integrated circuit, the light of the light-emitting tube 4 can be adjusted.

As described above, in the fluorescent lamp lighting apparatus of the present invention, the power source circuit portion thereof has the DC-voltage generation circuit, the drive-signal generation circuit and the drive control circuit, and is provided with the semiconductor integrated circuit, thereby emitting the need for a transformer coil. Therefore, in the fluorescent lamp lighting apparatus of the present invention, the mounting area of the power source circuit portion is decreased significantly, and the number of components is reduced.

In addition, since the fluorescent lamp lighting apparatus of the present invention is configured just as in the case of the above-mentioned embodiments, the voltage applied to the filaments becomes large, and the rising characteristic of the fluorescent lamp is excellent, whereby lighting can be attained securely in a short time.

Furthermore, the fluorescent lamp lighting apparatus of the present invention can securely light the fluorescent lamp in a predetermined constant lighting time (time from power on to lighting).

Moreover, as indicated in the above-mentioned embodiments, in the fluorescent lamp lighting apparatus of the present invention, the portions connected to the power source are only the resistor and the drain of the power MOS transistor, and when the resistor has a small resistance value to some extent, the power source terminal voltage (Vcc) of the semiconductor integrated circuit does not change. Therefore, in the fluorescent lamp lighting apparatus of the present invention, even when the input power source voltage changes, the fluorescent lamp is lit securely, and no fluctuation occurs in the lighting state of the fluorescent lamp.

In addition, in the fluorescent lamp lighting apparatus of the present invention, the preheating time at the time of lighting can be secured sufficiently. And in the present invention, the number of components can be reduced significantly by using a one-chip IC including an oscillator for carrying out control to attain a level not causing stress to the filaments of the light-emitting tube, whereby the mounting area can be made smaller, and a constant luminous flux can be maintained immediately after lighting.

Furthermore, the fluorescent lamp lighting apparatus of the present invention is configured so that the preheating time for preheating the filaments of the light-emitting tube is made longer when the ambient temperature is low, and so that the preheating time at the time of re-lighting is made shorter when the ambient temperature immediately after the light-emitting tube turning is turned off or the like is high. Therefore, the service life of the light-emitting tube is made longer than those of conventional tubes. Besides, since the filaments are sufficiently heated by the separate-excitation oscillation control, the luminous flux can be maintained constant immediately after the light-emitting tube is lit.

Moreover, since the fluorescent lamp lighting apparatus of the present invention carries out self-excitation control when the light-emitting tube is lit and being lit, even if lighting is turned off because of the fluctuation in commercial power, re-lighting can be attained momentarily.

In addition, since the fluorescent lamp lighting apparatus of the present invention has a one-chip monolithic IC capable of directly driving switching devices having a half-bridge configuration, no current transformer is necessary, the number of components is reduced significantly, and the weight is decreased.

Furthermore, in the fluorescent lamp lighting apparatus of the present invention, the brightness of the light-emitting tubes can be adjusted as desired on the basis of commands and the like provided externally.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A fluorescent lamp lighting apparatus comprising:

a DC-voltage generation circuit for generating a DC voltage;

a drive-signal generation circuit for generating and outputting desired high-voltage-side and low-voltage-side pulse signals by using the DC voltage from said DC-voltage generation circuit; and a drive control circuit having switching means driven by the pulse signals input from said drive-signal generation circuit to output a drive signal across the output terminals thereof, wherein a resonance circuit and the filament electrodes of a fluorescent lamp light-emitting tube are connected across the output terminals of said switching means, and said drive-signal generation circuit having:

a timer circuit in which the output signal thereof is altered after a predetermined time from power on;

a separate-excitation oscillator for outputting a signal having a predetermined frequency;

a separate-excitation/self-excitation selection switch circuit for outputting one of two input signals depending on the output signal of said timer circuit;

a trigger input circuit for detecting the resonance frequency of said resonance circuit;

a high voltage-side pulse generation circuit having a high-voltage-side dead time generation circuit, a narrow pulse generation circuit, a level shift circuit, a pulse reproduction circuit and an output circuit;

a low-voltage-side pulse generation circuit having a low-voltage-side dead time generation circuit and an output circuit; and an under-voltage lockout circuit for outputting an output signal when the voltage of the power source is a predetermined voltage or less at the time of the rising and falling of the power source.

2. A fluorescent lamp lighting apparatus comprising:

a Dc-voltage generation circuit for generating a DC voltage;

a drive-signal generation circuit for generating and outputting desired high-voltage-side and low-voltage-side pulse signals by using the DC voltage from said DC-voltage generation circuit; and a drive control circuit having first switching means driven by the high-voltage-side pulse signal input from said drive-signal generation circuit, and second switching means connecting in series therewith and driven by the low-voltage-side pulse signal input from said drive-signal generation circuit, wherein an inductance device, the pair of filament electrodes of the fluorescent lamp light-emitting tube and a first capacitor are connected across both ends of said second switching means, and said drive-signal generation circuit having:

a timer circuit in which the output signal thereof is altered after a predetermined time from power on;

a separate-excitation oscillator for outputting a signal having a predetermined frequency;

a separate-excitation/self-excitation selection switch circuit for outputting one of two input signals depending on the output signal of said timer circuit;

a trigger input circuit for detecting the resonance frequency of a resonance circuit, wherein said resonance circuit comprises said inductance device and said first capacitor;

a high voltage-side pulse generation circuit having a high-voltage-side dead time generation circuit, a narrow pulse generation circuit, a level shift circuit, a pulse reproduction circuit and an output circuit;

a low-voltage-side pulse generation circuit having a low-voltage-side dead time generation circuit and an output circuit; and an under-voltage lockout circuit for outputting an output signal when the voltage of the power source is a predetermined voltage or less at the time of the rising and falling of the power source.

3. A fluorescent lamp lighting apparatus in accordance with claim 1 or 2, wherein said drive-signal generation circuit has an under-voltage lockout circuit for outputting an output signal when the voltage of the power source is a predetermined voltage or less at the time of the rising and falling of the power source, the output of said separate-excitation oscillator and the output of said trigger input circuit are connected to said separate-excitation/self-excitation selection switch circuit, said separate-excitation/self-excitation selection switch circuit outputs the output signal from said separate-excitation oscillator in a state before the output signal of said timer circuit is switched, and outputs the output signal of said trigger input circuit in a state after the output signal of said timer circuit is switched, the output of said separate-excitation/self-excitation selection switch circuit is input to said high-voltage-side pulse generation circuit and said low-voltage-side pulse generation circuit, respectively, to drive said first and second switching means, thereby to oscillate said drive control circuit, and said separate-excitation oscillator and said timer circuit are reset by the output signal of said under-voltage lockout circuit at the time of the rising and falling of the power source.

4. A fluorescent lamp lighting apparatus in accordance with claim 1 or 2, wherein said drive-signal generation circuit further comprises a delay circuit connected to the output of said trigger input circuit or the output of said separate-excitation/self-excitation selection switch circuit so that the amount of delay can be controlled depending on an external input voltage.

5. A fluorescent lamp lighting apparatus in accordance with claim 2, wherein said first and second switching means are each configured by a MOS transistor that outputs a power-amplified signal across the source and the drain by using a signal supplied to the gate.

6. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched.

7. A fluorescent lamp lighting apparatus in accordance with claim 2, further comprising a timer circuit configured so that the period from power on to the switching of the output signal is shortened as the ambient temperature rises, and extended as the ambient temperature lowers.

8. A fluorescent lamp lighting apparatus in accordance with claim 2, wherein said separate-excitation oscillator is configured to output a signal wherein the frequency of the output signal is gradually changed from either the low-frequency range or the high-frequency range of the resonance frequency of the resonance circuit at the time of non-lighting of said light-emitting tube.

9. A fluorescent lamp lighting apparatus in accordance with claim 2, wherein said drive-signal generation circuit has a low-voltage-side under-voltage lockout circuit and a high-voltage-side under-voltage lockout circuit, and is configured so that said low-voltage-side under-voltage lockout circuit operates earlier than said high-voltage-side under-voltage lockout circuit at the time of power off.

10. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched, wherein:

said separate-excitation oscillator is configured to output a signal for changing the frequency of lighting from a frequency higher than the resonance frequency of said LC resonance circuit at the time of non-lighting of said light-emitting tube to a frequency lower than said resonance frequency depending on the voltage across the terminals of the capacitor of said timer circuit.

11. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched, wherein:

a resistor is inserted between one terminal of said capacitor, the other terminal of which is grounded, and the power source, or between one terminal of said capacitor, the other terminal of which is grounded, and ground, said separate-excitation oscillator is configured to output a signal for changing the frequency of lighting from a frequency higher than the resonance frequency of said resonance circuit at the time of non-lighting of said light-emitting tube to a frequency lower than said resonance frequency.

12. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched, wherein said timer circuit is configured so that the switching time is extended as the temperature lowers.

13. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched, wherein a diode is connected in series with a circuit for determining the setting voltage in said timer circuit, and said timer circuit is configured so that the switching time is extended as the temperature lowers because of the temperature dependence characteristic of the resistance value of the diode.

14. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched, wherein said separate-excitation oscillator is configured so that the duty ratio of the output frequency is switched by the signal from said timer circuit to set the preheating state and the lighting state of the filaments of said light-emitting tube.

15. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched, wherein a delay circuit is connected to the output of said trigger input circuit or the output of said separate-excitation/self-excitation selection switch circuit, and the amount of delay increases after the output signal of said timer circuit exceeds the reference voltage for switching.

16. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched, wherein said separate-excitation oscillator is configured to stop oscillation after the output signal of said timer circuit is switched.

17. A fluorescent lamp lighting apparatus in accordance with claim 2, wherein said trigger input circuit has a comparator and at least three diodes, the reference voltage (threshold voltage) with respect to the input signal of said comparator is set so that the voltage of the input signal at the time of rising is higher than the voltage at the time of falling, the cathode of the first diode is connected to the anode of the second diode, the cathode of the second diode is connected to the anode of the third diode, and the anode of the first diode is connected to the cathode of the third diode.

18. A fluorescent lamp lighting apparatus in accordance with claim 17, wherein the output of said trigger input circuit is canceled after the input signal exceeds the reference voltage (threshold voltage) of said comparator, and even when the input signal exceeds the reference voltage with respect to the input of said comparator again in a period having been set shorter than the half period of the resonance frequency of said resonance circuit.

19. A fluorescent lamp lighting apparatus in accordance with claim 17, wherein a capacitor for delaying the input signal of said comparator is connected to the input portion of said comparator to attain phase alignment at the time of detecting the resonance frequency of said resonance circuit.

20. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched, wherein said separate-excitation oscillator is configured to output a signal having a frequency gradually decreasing from a frequency higher than the resonance frequency of said resonance circuit at the time of non-lighting of said light-emitting tube, and then to output a signal having the resonance frequency of said resonance circuit at the time of lighting of said light-emitting tube.

21. A fluorescent lamp lighting apparatus in accordance with claim 2, further comprising a timer circuit configured so that a capacitor, one terminal of which is grounded, is charged with a constant current at the rising of the power source, and so that when the voltage across the terminals of said capacitor reaches a setting voltage, the output signal is switched, wherein said separate-excitation oscillator is configured so that the duty ratio of the output frequency is switched by the signal from said timer circuit.

22. A fluorescent lamp lighting apparatus in accordance with claim 20, wherein the frequency of said separate-excitation oscillator is controlled after the lighting of said light-emitting tube.

23. A fluorescent lamp lighting apparatus in accordance with claim 20 or 21, wherein the output duty of said separate-excitation oscillator is controlled after the lighting of said light-emitting tube.

24. A fluorescent lamp lighting apparatus comprising a light-emitting portion having a light-emitting tube excited by a pair of filaments electrodes and a power source circuit portion for outputting a signal for driving said pair of filament electrodes, wherein said power source circuit portion comprises:

a DC-voltage generation circuit for outputting a smoothened DC voltage from an externally supplied AC power source, a drive-signal generation circuit operated by the application of the DC voltage of said DC-voltage generation circuit to output a signal, and a drive control circuit, having a resonance circuit network connected across the terminals for outputting a signal driven by the signal from said drive-signal generation circuit, for detecting the signal of this resonance circuit network and outputting the signal to a signal detection terminal, wherein said drive-signal generation circuit is configured to output a signal having a frequency, which is determined inside said drive-signal generation circuit, changes with the passage of time, and at least passes through the resonance frequency of said resonance circuit network in the non-lighting state of said light-emitting tube within a predetermined time from the application of said DC voltage, and to output a signal having the phase corresponding to the signal of said signal detection terminal after said predetermined time has passed.

25. A fluorescent lamp lighting apparatus comprising a light-emitting portion having a light-emitting tube excited by a pair of filament electrodes and a power source circuit portion for outputting a signal for driving said pair of filament electrodes, wherein:

said power source circuit portion comprises:

a DC-voltage generation circuit for outputting a smoothened DC voltage from an externally supplied AC power source, a drive-signal generation circuit operated by the application of said DC voltage to output from first and second drive signals individually, first switching means wherein the conduction between two terminals, that is, between one terminal and one of the pair of output terminals of said DC-voltage generation circuit, is turned on and off by said first drive signal, second switching means wherein the conduction between two terminals, that is, between one terminal and the other of the pair of output terminals of said Dc-voltage generation circuit, is turned on and off by said second drive signal, and a resonance circuit network connected between the common connection portion of said first and second switching means and at least one of the pair of output terminals of said DC-voltage generation circuit, wherein said first and second drive signals are each configured to output a signal having a frequency, which is determined inside said drive-signal generation circuit, changes with the passage of time, and at least passes through the resonance frequency of said resonance circuit network in the non-lighting state of said light-emitting tube within a predetermined time from the application of said DC voltage, and to output a signal having the phase corresponding to the signal of said signal detection terminal after said predetermined time has passed.

26. A fluorescent lamp lighting apparatus in accordance with claim 25, wherein said drive-signal generation circuit comprises:

a trigger input circuit for taking and converting the signal of said resonance circuit network into a pulse signal, a separate-excitation oscillator for outputting an oscillation signal having a frequency changing with the passage of time after the application of said DC voltage and at least passing through the resonance frequency of said resonance circuit network in the non-lighting state of said light-emitting tube, a timer circuit for switching the output state of the output terminal at a constant time after the application of said DC voltage, a separate-excitation/self-excitation selection switch for inputting the output signal of said separate-excitation oscillator and the output signal of said trigger input circuit and outputting one of the two input signals depending on the signal at the output terminal of said timer circuit, a first drive-signal generation circuit for generating and outputting a first drive signal from the output signal of said separate-excitation/self-excitation selection switch, and a second drive-signal generation circuit for inputting the output signal of said separate-excitation/self-excitation selection switch and for generating and outputting a second drive signal.

27. A fluorescent lamp lighting apparatus in accordance with claim 26, wherein said first drive-signal generation circuit comprises:

a high-voltage-side dead time generation circuit for inputting the output signal of said separate-excitation/self-excitation selection switch, and in synchronization with one edge of this signal, for outputting a signal delayed by a predetermined value, and a high-voltage-side pulse generation circuit for inputting the output signal of said high-voltage-side dead time generation circuit, and for outputting a pulse signal in response to an edge of this input signal and on the basis of the voltage applied to the common connection portion of said first and second switching means, and wherein said second drive-signal generation circuit comprises:

a low-voltage-side dead time generation circuit for inputting the output signal of said separate-excitation/self-excitation selection switch, and in synchronization with the other edge of this signal, for outputting a signal delayed by said predetermined value, and a low-voltage-side pulse generation circuit for inputting the output signal of said low-voltage-side dead time generation circuit, and for outputting a pulse signal in response to an edge of this input signal and on the basis of the low-voltage-side voltage of said DC-voltage generation circuit.

28. A fluorescent lamp lighting apparatus in accordance with claim 27, wherein said high-voltage-side pulse generation circuit comprises:

a narrow pulse generation circuit for inputting the output signal of said high-voltage-side dead time generation circuit, and for outputting a pulse signal having a relatively narrow width in response to an edge of this input signal, a level shift circuit for inputting the output signal of said narrow pulse generation circuit and for outputting a signal having a different peak value, a high-voltage-side pulse reproduction circuit for inputting the output signal of said level shift circuit and for outputting a pulse signal on the basis of the voltage at the common connection portion of said first and second switching means, and a high-voltage-side output circuit for inputting the output signal of said high-voltage-side pulse reproduction circuit and for outputting a drive signal on the basis of the voltage at the common connection portion of said first and second switching means.

*29. A signal generation apparatus for lighting a fluorescent lamp outputting a signal for driving a pair of filament electrodes of a light-emitting tube comprises:*

*a terminal for inputting a smoothened DC-voltage from an externally supplied AC power source,*

*a drive-signal generation circuit operated by the application of the DC voltage to output a signal, and*

*a signal detection terminal for inputting a signal of a resonance circuit network connected across terminals for outputting a signal driven by the signal from said drive-signal generation circuit,*

*wherein said drive-signal generation circuit is configured to output a signal having a frequency, which is determined inside said drive-signal generation circuit, changes with the passage of time, and at least passes through the resonance frequency of said resonance circuit network in the non-lighting state of said light-emitting tube within a predetermined time from the application of said DC voltage, and to output a signal having the phase corresponding to the signal of said signal detection terminal after said predetermined time has passed.*

*30. A signal generation apparatus for lighting a fluorescent lamp outputting a signal for driving a pair of filament electrodes of a light-emitting tube comprises:*

*a terminal for inputting a smoothened DC-voltage from an externally supplied AC power source,*

*a drive-signal generation circuit operated by the application of the DC voltage to output first and second drive signals individually,*

*first switching means wherein the conduction between two terminals, that is, between one terminal and one of the pair of output terminals of said DC-voltage generation circuit, is turned on and off by said first drive signal,*

*second switching means wherein the conduction between two terminals, that is, between one terminal and the other of the pair of output terminals of said DC-voltage generation circuit, is turned on and off by said second drive signal, and*

*a signal detection terminal for detecting a signal of a resonance circuit network connected between the common connection portion of said first and second switching means and at least one of the pair of output terminals of said DC-voltage generation circuit,*

*wherein said first and second drive signals are each configured to output a signal having a frequency, which is determined inside said drive-signal generation circuit, changes with the passage of time, and at least passes through the resonance frequency of said resonance circuit network in the non-lighting state of said light-emitting tube within a predetermined time from the application of said DC voltage, and to output a signal having the phase corresponding to the signal of said signal detection terminal after said predetermined time has passed.*

*31. A signal generation apparatus for lighting a fluorescent lamp in accordance with claim 30, wherein said drive-signal generation circuit comprises:*

*a trigger input circuit for taking and converting the signal of said resonance circuit network into a pulse signal,*

*a separate-excitation oscillator for outputting an oscillation signal having a frequency changing with a passage of time after the application of said DC voltage and at least passing through a resonance frequency of the resonance circuit network in a non-limiting state of a light-emitting tube,*

*a timer circuit for switching an output state of an output terminal at a constant time after the application of said DC voltage,*

*a separate-excitation/self-excitation selection switch for inputting the output signal of said separate-excitation oscillator and the output signal of said trigger input circuit and outputting one of the two input signals depending on the signal at the output terminal of said timer circuit,*

*a first drive-signal generation circuit for generating and outputting a first drive signal from the output signal of said separate-excitation/self excitation selection switch, and*

*a second drive-signal generation circuit for inputting the output signal of said separate-excitation/self-excitation selection switch and for generating and outputting a second drive signal.*

*32. A signal generation apparatus for lighting a fluorescent lamp in accordance with claim 31, wherein said first drive-signal generation circuit comprises:*

*a high-voltage-dead time pulse generation circuit for inputting the output signal of said separate-excitation/self-excitation selection switch, and in synchronization with one edge of this signal, for outputting a signal delayed by a predetermined value, and*

*a high-voltage-side pulse generation circuit for inputting the output signal of said high-voltage-side dead time generation circuit, and for outputting a pulse signal in response to an edge of this input signal and on the basis of the voltage applied to the common connection portion of said first and second switching means,*

*wherein said second drive-signal generation circuit comprises:*

*a low-voltage-side dead time generation circuit for inputting the output signal of said separate-excitation/self-excitation selection switch, and in synchronization with the other edge of this signal, for outputting a signal delayed by said predetermined value, and*

*a low-voltage-side pulse generation circuit for inputting the output signal of said low-voltage-side dead time generation circuit, and for outputting a pulse signal in response to an edge of this input signal and on the basis of the low-voltage-side voltage of said DC-voltage generation circuit.*

*33. A signal generation apparatus for lighting a fluorescent lamp in accordance with claim 32, wherein said high-voltage-side pulse generation circuit comprises:*

*a narrow pulse generation circuit for inputting the output signal of said high-voltage-side dead time generation circuit, and for outputting a pulse signal having a relatively narrow width in response to an edge of this input signal,*

*a level shift circuit for inputting the output signal of said narrow pulse generation circuit and for outputting a signal having a different peak value,*

*a high-voltage-side pulse reproduction circuit for inputting the output signal of said level shift circuit and for outputting a pulse signal on the basis of the voltage at the common connection portion of said first and second switching means, and*

*a high-voltage-side output circuit for inputting the output signal of said high-voltage-side pulse reproduction circuit and for outputting a drive signal on the basis of the voltage at the common connection portion of said first and second switching means.*

* * * * *

UNITED STATES PATENT AND TRADEMARK OFFICE

CERTIFICATE OF CORRECTION

PATENT NO. : RE 39,341 E
APPLICATION NO. : 10/654857
DATED : October 17, 2006
INVENTOR(S) : Kataoka et al.

It is certified that error appears in the above-identified patent and that said Letters Patent is hereby corrected as shown below:

1. In Claim 1, column 32, line 57, the words “high voltage-side” should be hyphenated to read --high-voltage-side--.
2. In Claim 1, column 32, lines 61 through 67 the paragraphs beginning with “a low-voltage-side” and “an under-voltage lockout” should be indented so as to correspond to the indenting of the paragraph starting at line 57 with the phrase “a high voltage-side”.
3. In Claim 2, column 33, line 2, the word “Dc-voltage” should be deleted and the word --DC-voltage-- substituted therefore.
4. In Claim 2, column 33, line 29, the words “high voltage-side” should be hyphenated to read --high-voltage-side--.
5. In Claim 24, column 36, line 39, the word “filaments” should be deleted and the singular word --filament-- substituted therefore.
6. In Claim 25, column 37, line 9, the word “from” should be deleted.
7. In Claim 25, column 37, line 19, the word “Dc-voltage” should be deleted and the word --DC-voltage-- substituted therefore.
8. In Claim 30, column 39, line 20, the word “portion” should be deleted and the word --portions-- substituted therefore.
9. In Claim 31, column 39, line 43, the word “non-limiting” should be deleted and the word --non-lighting-- substituted therefore.
10. In Claim 31, column 39, line 56, the words “self excitation” should be hyphenated to read --self-excitation--.
11. In Claim 32, column 40, line 8, the word “high-voltage-dead” should be deleted and the words --high-voltage-side dead-- substituted therefore.
12. In Claim 32, column 40, line 8, the word “pulse” should be deleted.

Signed and Sealed this

Nineteenth Day of August, 2008

JON W. DUDAS
*Director of the United States Patent and Trademark Office*